US012726934B2

(12) United States Patent
Fischer et al.

(10) Patent No.: US 12,726,934 B2
(45) Date of Patent: Sep. 1, 2026

(54) SIDELINK POSITIONING PROTOCOL (SLPP) PROCEDURES

(71) Applicant: QUALCOMM Incorporated, San Diego, CA (US)

(72) Inventors: Sven Fischer, Nuremberg (DE); Stephen William Edge, Escondido, CA (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 18/366,472

(22) Filed: Aug. 7, 2023

(65) Prior Publication Data

US 2024/0057015 A1 Feb. 15, 2024

Related U.S. Application Data

(60) Provisional application No. 63/377,530, filed on Sep. 28, 2022, provisional application No. 63/370,917, filed on Aug. 9, 2022.

(51) Int. Cl.
*H04W 64/00* (2009.01)
*H04W 8/22* (2009.01)

(52) U.S. Cl.
CPC ............. *H04W 64/00* (2013.01); *H04W 8/22* (2013.01)

(58) Field of Classification Search
None
See application file for complete search history.

(56) References Cited

U.S. PATENT DOCUMENTS 9,763,050 B2 9/2017 Belghoul et al.
2022/0116906 A1 4/2022 Gummadi et al.
(Continued)

FOREIGN PATENT DOCUMENTS

CN 114222931 A 3/2022
WO 2021225696 11/2021
(Continued)

OTHER PUBLICATIONS

3GPP: "3rd Generation Partnership Project, Technical Specification Group Radio Access Network, Evolved Universal Terrestrial Radio Access Network (E-UTRAN), Stage 2 Functional Specification of User Equipment (UE) Positioning in E-UTRAN (Release 17)", 3GPP Standard, Technical Specification, 3GPP TS 36.305, 3GPP, Mobile Competence Centre, 650, Route Des Lucioles, F-06921 Sophia-Antipolis Cedex, France, vol. RAN WG2, No. V17.1.0, Jul. 15, 2022, pp. 1-96, XP052183773, chapters 8.1.2.2, 8.2.2.3, 8.3.2.2, 8.6.2.1, 8.7.2.1, 8.8.2.1, 8.9.2.1, 8.10.2.1 with, ch4-7.
(Continued)

*Primary Examiner* — Suhail Khan
(74) *Attorney, Agent, or Firm* — QUALCOMM Incorporated

(57) ABSTRACT

In some implementations, a user equipment (UE) may exchange a plurality of sidelink (SL) positioning protocol (SLPP) messages with other UEs in a plurality of UEs, where the plurality of SLPP messages are exchanged via direct wireless SL communications. At least one message of the plurality of SLPP messages may comprise a Request Capabilities message, a Provide Capabilities message, a Request Assistance Data message, a Provide Assistance Data message, a Request Location Information message, or a Provide Location Information message. The UE may perform the positioning based, at least in part, on the plurality of SLPP messages. The UE may further exchange
(Continued)

SLPP messages with a location server (e.g. LMF) which may assist the UE to perform the positioning and may enable the location server to obtain location results for the plurality of UEs. SLPP procedures may be defined to manage the SL positioning.

73 Claims, 21 Drawing Sheets

(56) References Cited

U.S. PATENT DOCUMENTS

| | | | | |
|---|---|---|---|---|
| 2022/0236365 | A1* | 7/2022 | Ko | G01S 7/006 |
| 2024/0236653 | A1 | 7/2024 | Manolakos et al. | |

FOREIGN PATENT DOCUMENTS

| | | | |
|---|---|---|---|
| WO | 2021226616 | A1 | 11/2021 |
| WO | 2023087150 | A1 | 5/2023 |
| WO | 2023197311 | A1 | 10/2023 |
| WO | 2024036132 | | 2/2024 |

OTHER PUBLICATIONS

3GPP: "3rd Generation Partnership Project, Technical Specification Group Radio Access Network, NG Radio Access Network (NG-RAN), Stage 2 Functional Specification of User Equipment (UE) Positioning in NG-RAN (Release 17)", 3GPP Standard, Technical Specification, 3GPP TS 38.305, 3GPP, Mobile Competence Centre, 650, Route Des Lucioles, F-06921 Sophia-Antipolis Cedex, France, vol. RAN WG2, No. V17.1.0, Jul. 18, 2022, pp. 1-133, XP052183737, chapters 8.1.2.2, 8.2.2.3, 8.3.2.4, 8.4.2.2, 8.5.2.2, 8.6.2.2, 8.7.2.2, 8.8.2.2, 8.9.2.2, 8.10.2.2, 8.11.2.2,w/ch4-7.

3GPP: "3rd Generation Partnership Project, Technical Specification Group Services and System Aspects, Study on Architecture Enhancement to Support Ranging Based Services and Sidelink Positioning (Release 18)", 3GPP Standard, Technical Report, 3GPP TR 23.700-86, 3GPP, Mobile Competence Centre, 650, Route Des Lucioles, F-06921 Sophia-Antipolis Cedex, France, No. V1.0.0, Sep. 1, 2022, pp. 1-133, XP052210632, chapters 6.12, 6.21, 6.29, 6.32.

3GPP: "3rd Generation Partnership Project, Technical Specification Group Services and System Aspects, Study on Enhancement to the 5GC LoCation Services (LCS), Phase 3 (Release 18)", 3GPP Standard, Technical Report, 3GPP TR 23.700-71, 3GPP, Mobile Competence Centre, 650, Route Des Lucioles, F-06921 Sophia-Antipolis Cedex, France, No. V1.0.0, Sep. 2, 2022, pp. 1-146, XP052210658, chapters 6.13.3.2, 6.20, 6.23.

Ericsson: "Defining Indoor/Outdoor Classification for Enhanced Indoor Positioning", 3GPP TSG RAN WG1 Meeting #86bis, R1-1610387, 3rd Generation Partnership Project, Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016, Oct. 1, 2016, pp. 1-4, XP051160048, chapters 1-5.

Interdigital Inc: "Discussion on Procedures and Signalling for GNSS Positioning Integrity", 3GPP RAN WG2 Meeting #114-e, R2-2105308, 3rd Generation Partnership Project, Mobile Competence Centre, 650, Route Des Lucioles, F-06921 Sophia-Antipolis Cedex, France, vol. RAN WG2, No. Electronic, May 19, 2021-May 27, 2021, May 10, 2021, 6 Pages, XP052003822, 3rd page, paragraph before proposal 7—4th page, proposal 8, 4th page, proposal 7-8.

Qualcomm Incorporated: "Signalling Protocol Options for WiFi, BT and Barometric Sensor Positioning", 3GPP TSG-RAN WG2 Meeting #91, R2-153130, 3rd Generation Partnership Project, Mobile Competence Centre, 650, Route Des Lucioles, F-06921 Sophia-Antipolis Cedex, France, vol. RAN WG2, No. Beijing, P.R. China, Aug. 24, 2015-Aug. 28, 2015, Aug. 14, 2015, pp. 1-28, XP050991581, pp. 3 and 25 with chapter 3-5, 7.2.2-7.2.4.

Qualcomm Incorporated: "IMU Positioning", 3GPP TSG-RAN WG2 Meeting #99, R2-1708521, 3rd Generation Partnership Project, Mobile Competence Centre, 650, Route Des Lucioles, F-06921 Sophia-Antipolis Cedex, France, vol. RAN WG2, No. Berlin, Germany, Aug. 21, 2017-Aug. 25, 2017, Aug. 20, 2017, pp. 1-5, XP051318375, chapters 1-5.

3GPP TR 23.700-86 V0.3.0: "3rd Generation Partnership Project, Technical Specification Group Services and System Aspects, Study on Architecture Enhancement to support Ranging based services and sidelink positioning (Release 18)", 23700-86-030, 3rd Generation Partnership Project, Mobile Competence Centre, 650, Route Des Lucioles, F-06921, Sophia-Antipolis Cedex, France, May 24, 2022, 107 Pages, XP052159045, XP052182536, pp. 30-34, Chapters 6.3-6.8, 6.17-6.19, 6.24.

International Search Report and Written Opinion—PCT/US2023/071819—ISA/EPO—Nov. 28, 2023.

Mediatek Inc: "The Potential Solutions for Sidelink Positioning", 3GPP TSG-RAN WG1 #109, R1-2203752, 3rd Generation Partnership Project, Mobile Competence Centre, 650, Route Des Lucioles, F-06921 Sophia-Antipolis Cedex, France vol. RAN WG1, No. e-Meeting, May 9, 2022-May 20, 2022, Apr. 29, 2022, 5 Pages, XP052153168, Chapters 2-6.

ZTE: "Discussion on Potential Solutions for SL Positioning", R1-2203624, 3GPP TSG RAN WG1 #109-e e-Meeting, May 9-20, 2022, pp. 1-11.

* cited by examiner

FIG. 13

SIDELINK POSITIONING PROTOCOL (SLPP) PROCEDURES

RELATED APPLICATIONS

This application claims the benefit of U.S. Provisional Application No. 63/370,917, filed Aug. 9, 2022, entitled "SIDELINK POSITIONING PROTOCOL (SLPP) PROCEDURES", and U.S. Provisional Application No. 63/377,530, filed Sep. 28, 2022, entitled "SIDELINK POSITIONING PROTOCOL (SLPP) PROCEDURES", both of which are assigned to the assignee hereof, and incorporated by reference herein in their entirety.

BACKGROUND

1. Field of Disclosure

The subject matter disclosed herein relates to wireless communications systems, and more particularly to systems, methods, and devices that support positioning.

2. Description of Related Art

Wireless communication systems are widely deployed to provide various telecommunication services such as telephony, video, data, messaging, positioning, and broadcasts. Typical wireless communication systems may employ multiple-access technologies capable of supporting communication with multiple users by sharing available system resources (e.g., bandwidth, transmit power). Examples of such multiple-access systems include fourth-generation (4G) systems such as Long-Term Evolution (LTE) systems, LTE-Advanced (LTE-A) systems, or LTE-A Pro systems, and fifth-generation (5G) systems which may be referred to as New Radio (NR) systems.

In some examples, a wireless multiple-access communication system may include a number of base stations, each simultaneously supporting communication for multiple communication devices, otherwise known as user equipment (UEs). A base station may communicate with a set of UEs on downlink channels (e.g., for transmissions from a base station to a UE) and uplink channels (e.g., for transmissions from a UE to a base station). Additionally, UEs may communicate directly with each other using sidelink channels.

A location of a UE may be useful or essential to a number of applications including emergency calls, navigation, direction finding, asset tracking and Internet service. In a cellular network, for example, a base station may send downlink reference signals with which positioning measurements are obtained by a UE and/or the UE may send uplink reference signals with which positioning measurements are obtained by the base stations. The UE may compute an estimate of its own location using the positioning measurements in UE-based positioning or may send the positioning measurements to a network entity, e.g., location server, which may compute the UE location based on the positioning measurements in UE-assisted positioning.

There are a number of other applications where the location of one UE or of multiple UEs may be needed and where traditional UE-based positioning and UE-assisted positioning may be less useful. Examples of such other applications include Vehicle-to-everything (V2X) communication and coordination, Public Safety first responder scenarios and control and coordination of automated environments like factories and warehouses. In these applications, it may be more effective for UEs to communicate using sidelink signaling and for UEs to be located using sidelink related positioning measurements and/or sidelink related control signaling. Further, procedures may be established to enable two or more UEs to perform positioning (including ranging) using sidelink communications. However, many aspects of these sidelink-based procedures are not yet formalized.

BRIEF SUMMARY

An example method of positioning a plurality of user equipments (UEs) using sidelink (SL) communications, according to this disclosure, may comprise exchanging a plurality of SL positioning protocol (SLPP) messages with other UEs in the plurality of UEs, the plurality of SLPP messages exchanged via direct wireless SL communications, wherein: at least one message of the plurality of SLPP messages comprises a Request Capabilities message in which a first UE of the plurality of UEs requests, from one or more additional UEs of the plurality of UEs, capabilities for supporting positioning using SL communications; at least one message of the plurality of SLPP messages comprises a Provide Capabilities message in which at least one of the one or more additional UEs indicates capabilities for supporting positioning using SL communications; at least one message of the plurality of SLPP messages comprises a Provide Assistance Data message including data for the one or more additional UEs of the plurality of UEs, the data assisting the one or more additional UEs to perform positioning using SL communications; at least one message of the plurality of SLPP messages comprises a Request Location Information message in which the first UE requests, from the one or more additional UEs of the plurality of UEs, location measurements for positioning using SL communications; and at least one message of the plurality of SLPP messages comprises a Provide Location Information message in which at least one of the one or more additional UEs provides the location measurements for positioning using SL communications. The method also may comprise performing the positioning based, at least in part, on the plurality of positioning messages.

An example method of positioning using sidelink (SL) communications at a first user equipment (UE), according to this disclosure, may comprise sending, from the first UE to one or more additional UEs via direct wireless SL communication, one or more Request Capabilities messages, each Request Capabilities message comprising a request of one or more capabilities for supporting SL position reference signal (SL-PRS) configurations and SL-PRS measurements. The method also may comprise receiving, at the first UE from one or more additional UEs via the direct wireless SL communication, one or more Provide Capabilities messages in which the one or more additional UEs respond to the one or more Request Capabilities messages. The method also may comprise obtaining an SL-PRS configuration for each UE of the one or more additional UEs based, at least in part, on the one or more Provide Capabilities messages. The method also may comprise sending, from the first UE to one or more additional UEs via the direct wireless SL communication, one or more Provide Assistance Data messages including the SL-PRS configuration for each UE of the one or more additional UEs.

An example method of enabling a first user equipment (UE) to coordinate positioning using sidelink (SL) communications, according to this disclosure, may comprise receiving, at a second UE from the first UE via direct wireless SL communication, a Request Capabilities message comprising a request of one or more capabilities for supporting SL position reference signal (SL-PRS) configurations and SL-PRS measurements, wherein the second UE is one of one or more additional UEs, other than the first UE, used for positioning using SL communications. The method also may comprise sending, to the first UE from the second UE via the direct wireless SL communication, a Provide Capabilities message in response to the Request Capabilities message. The method also may comprise receiving, at a second UE from the first UE via direct wireless SL communication, a Provide Assistance Data message including an SL-PRS configuration for the second UE, the SL-PRS configuration based, at least in part, on the Provide Capabilities message.

An example user equipment (UE), according to this disclosure, may comprise: one or more transceivers; one or more memories; and one or more processors communicatively coupled with the one or more transceivers and the one or more memories, wherein the one or more processors are configured to: exchange a plurality of sidelink (SL) positioning protocol (SLPP) messages, via the one or more transceivers, with other UEs in a plurality of UEs, the plurality of SLPP messages exchanged via direct wireless SL communications, wherein: at least one message of the plurality of SLPP messages comprises a Request Capabilities message in which a first UE of the plurality of UEs requests, from one or more additional UEs of the plurality of UEs, capabilities for supporting positioning using SL communications; at least one message of the plurality of SLPP messages comprises a Provide Capabilities message in which at least one of the one or more additional UEs indicates capabilities for supporting positioning using SL communications; at least one message of the plurality of SLPP messages comprises a Provide Assistance Data message including data for the one or more additional UEs of the plurality of UEs, the data assisting the one or more additional UEs to perform positioning using SL communications; at least one message of the plurality of SLPP messages comprises a Request Location Information message in which the first UE requests, from the one or more additional UEs of the plurality of UEs, location measurements for positioning using SL communications; and at least one message of the plurality of SLPP messages comprises a Provide Location Information message in which at least one of the one or more additional UEs provides the location measurements for positioning using SL communications. The one or more processors also may be configured to perform the positioning based, at least in part, on the plurality of positioning messages.

An example first UE, according to this disclosure, may comprise: one or more transceivers; one or more memories; and one or more processors communicatively coupled with the one or more transceivers and the one or more memories, wherein the one or more processors are configured to: send, via the one or more transceivers to one or more additional UEs via direct wireless SL communication, one or more Request Capabilities messages, each Request Capabilities message comprising a request of one or more capabilities for supporting SL position reference signal (SL-PRS) configurations and SL-PRS measurements. The one or more processors further may be configured to receive, via the one or more transceivers from one or more additional UEs via the direct wireless SL communication, one or more Provide Capabilities messages in which the one or more additional UEs respond to the one or more Request Capabilities messages. The one or more processors further may be configured to obtain an SL-PRS configuration for each UE of the one or more additional UEs based, at least in part, on the one or more Provide Capabilities messages. The one or more processors further may be configured to send, via the one or more transceivers to one or more additional UEs via the direct wireless SL communication, one or more Provide Assistance Data messages including the SL-PRS configuration for each UE of the one or more additional UEs.

An example second UE, according to this disclosure, may comprise: one or more transceivers; one or more memories; and one or more processors communicatively coupled with the one or more transceivers and the one or more memories, wherein the one or more processors are configured to: receive, via the one or more transceivers from the first UE via direct wireless SL communication, a Request Capabilities message comprising a request of one or more capabilities for supporting SL position reference signal (SL-PRS) configurations and SL-PRS measurements, wherein the second UE is one of one or more additional UEs, other than the first UE, used for positioning using SL communications. The one or more processors further may be configured to send, to the first UE via the one or more transceivers via the direct wireless SL communication, a Provide Capabilities message in response to the Request Capabilities message. The one or more processors further may be configured to receive, via the one or more transceivers from the first UE via direct wireless SL communication, a Provide Assistance Data message including an SL-PRS configuration for the second UE, the SL-PRS configuration based, at least in part, on the Provide Capabilities message.

An example user equipment, according to the disclosure, may comprise one or more transceivers, one or more memories, and one or more processors communicatively coupled with the one or more transceivers and one or more memories and configured to perform any of the previously-described methods.

An example apparatus, according to the disclosure, may comprise means for performing any of the previously-described methods.

According to this disclosure, an example non-transitory computer-readable medium stores instructions that comprise code for performing the method of any of the previously-described methods.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

FIG. 13 is a flow diagram of a method of positioning a plurality of UEs using SL communications, according to an embodiment.

Figure 1:
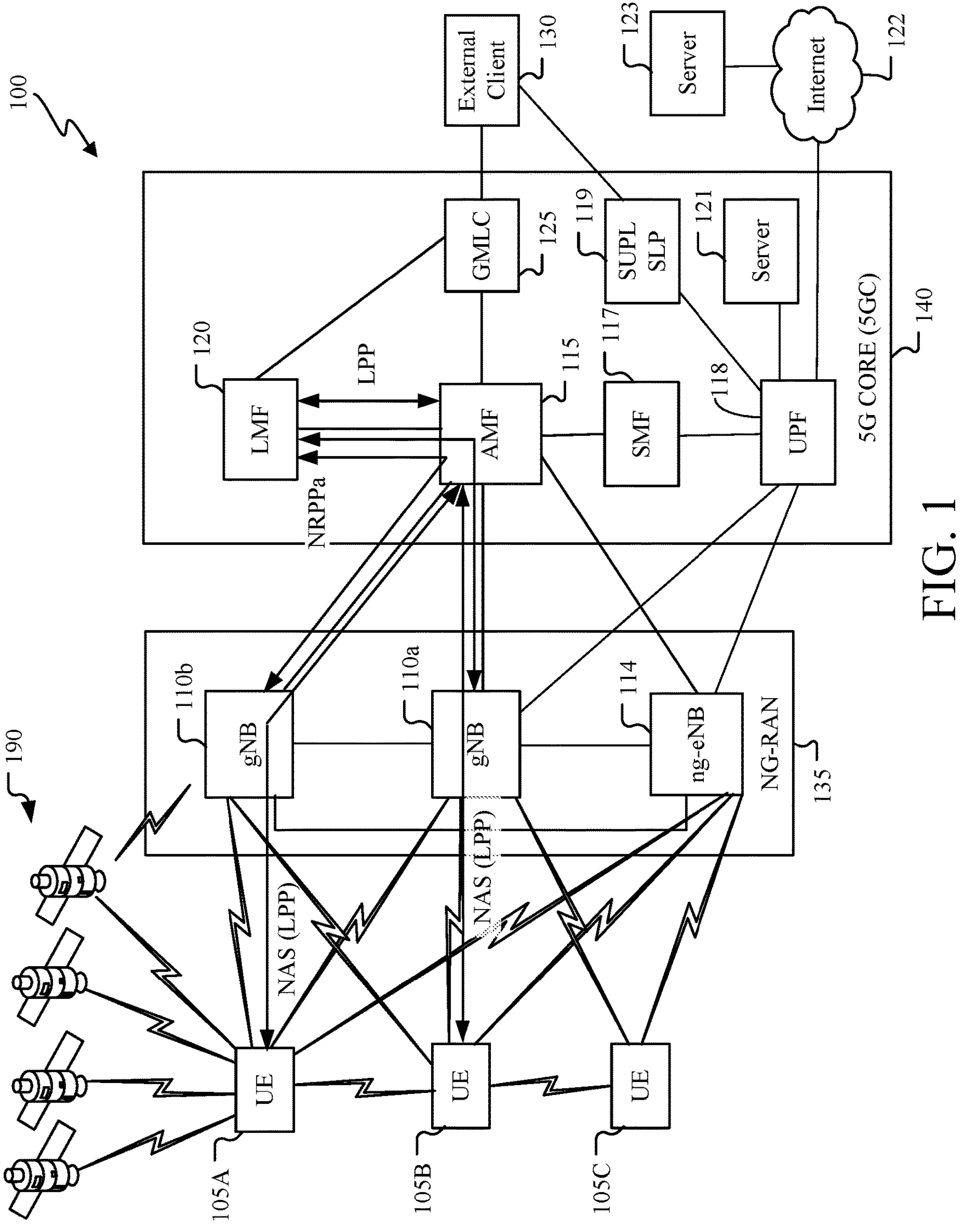
FIG. 1 shows an architecture of a communication system including a number of UEs, a Radio Access Network (RAN), and a 5G Core Network (5GC).

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

Techniques and apparatus are discussed herein for supporting sidelink positioning (SL) between UEs. A Sidelink positioning protocol (SLPP) may be used for supporting sidelink positioning of UEs in pairwise positioning, group operation, as well as network-supported SLPP.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, tracking device, Internet of Things (IoT) device, Industrial IoT (IIoT) device, In Vehicle System (IVS), etc.) used to communicate over a wireless communications network. A UE may be mobile or may (e.g., at certain times) be stationary, and may communicate with a Radio Access Network (RAN). For example, as used herein, a UE may be an infrastructure node, such as a roadside unit (RSU), Positioning Reference Unit (PRU), etc. As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," RSU, PRU, IVS, or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, Wi-Fi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). A communication link through which UEs can send signals to other UEs is called a sidelink channel. As used herein the term traffic channel (TCH) can refer to either an uplink/reverse or downlink/forward or sidelink traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Further, unless otherwise specified, the term "positioning" as used herein may include absolute location determination, relative location determination, ranging, or a combination thereof. Thus, positioning measurements as discussed herein may include range measurements. Such positioning may include and/or be based on timing, angular, phase, or power measurements, or a combination thereof (which may include RF sensing measurements) for the purpose of location or sensing services.

As noted, SL-based signaling between two or more UEs potentially can be used to perform positioning (including ranging) of at least one of the UEs. However, the many procedural aspects of such positioning have yet to be defined or formalized. Embodiments herein address these and other issues by providing for message types, transactions, and procedures that may be used in a protocol for SL-based positioning, referred to herein as SL positioning protocol, or SLPP. According to some aspects, advantages may include expanding the positioning range and capabilities beyond that of traditional LPP positioning of a UE in which the UE exchanges uplink and/or downlink signals with one or more base stations.

FIG. 1 shows an example of a communication system 100 that includes a first UE 105A, a second UE 105B, a third UE 105C, a Radio Access Network (RAN) 135, here a Fifth Generation (5G) Next Generation (NG) RAN (NG-RAN), and a 5G Core Network (5GC) 140. The 5GC 140, for example, may be a public land mobile network (PLMN). The UEs 105A, 105B, and 105C may be sometimes referred to herein as UE 105 individually or UEs 105 collectively. The UE 105 may be, e.g., an IoT device, a location tracker device, a cellular telephone, a vehicle, an On-Board Unit (OBU), or other similar type of device. The UE 105 may additionally be considered an RSU or PRU. A 5G network may also be referred to as a New Radio (NR) network; NG-RAN 135 may be referred to as a 5G RAN or as an NR RAN; and 5GC 140 may be referred to as an NG Core network (NGC). The RAN 135 may be another type of RAN, e.g., a 3G RAN, a 4G Long Term Evolution (LTE) RAN, etc. The communication system 100 may utilize a constellation of satellite vehicles (SVs) 190 which may support a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). In some embodiments, a UE 105 may communicate via an SV 190 and an Earth station (not shown in FIG. 1) with a RAN node (e.g. a gNB 110) or a 5GC 140 node, in which case the UE 105 may not communicate directly with a RAN node but only via the SV 190. This may be used to increase the coverage and/or the capacity of the NG-RAN 135. Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125, a User Plane Function (UPF) 118, and a Secure User Plane Location (SUPL) Location Platform (SLP) 119. The gNBs 110*a*, 110*b*, and the ng-eNB 114 are communicatively coupled to each other, are each configured wirelessly to communicate bi-directionally with the UEs 105, and are each communicatively coupled to, and configured to bi-directionally communicate with, the AMF 115 and the UPF 118. The gNBs 110*a*, 110*b*, and the ng-eNB 114 may be referred to as base stations (BSs) or RAN nodes. The AMF 115, the SMF 117, the LMF 120, and the GMLC 125 are communicatively coupled to each other, and the GMLC 125 is communicatively coupled to an external client 130. The AMF 115, the SMF 117, the UPF 118, and the SLP 119 are communicatively coupled to each other, and the SLP 119 is communicatively coupled to the external client 130. Server 121, the Internet 122, and server 123 may be communicatively coupled with the UPF 118 and may facilitate SL positioning, according to some embodiments. The SMF 117 may further serve as an initial contact point of a Service Control Function (SCF) (not shown) to create, control, and delete media sessions. The base stations 110*a*, 110*b*, 114 may be a macro cell (e.g., a high-power cellular base station), or a small cell (e.g., a low-power cellular base station), or an access point (e.g., a short-range base station configured to communicate with short-range technology such as WI-FI, WI-FI DIRECT (Wi-Fi D), BLUETOOTH, Bluetooth-Low Energy (BLE), ZIGBEE, etc. One or more of the base stations 110*a*, 110*b*, 114 may be configured to communicate with the UEs 105 via multiple carriers. Each of the base stations 110*a*, 110*b*, 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted, as necessary. Specifically, although only UEs 105 are illustrated, many UEs (e.g., hundreds, thousands, millions, etc.) may be utilized in the communication system 100. Similarly, the communication system 100 may include a larger (or smaller) number of SVs (i.e., more or fewer than the four SVs 190 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UEs 105) or at base stations 110*a*, 110*b*, 114 and/or provide location assistance to the UEs 105 (via the LMF 120 or SLP 119 or other location server) and/or compute a location for one or both of the UEs 105 at a location-capable device such as the UEs 105, the base stations 110*a*, 110*b*, the LMF 120, or SLP 119 based on measurement quantities received at the UEs 105 or the base stations 110*a*, 110*b*, 114 for such directionally-transmitted signals. The GMLC 125, the LMF 120, the AMF 115, the SMF 117, the UPF 118, the SLP 119, the ng-eNB (eNodeB) 114, and the gNBs (gNodeBs) 110*a*, 110*b* are examples and may, in various embodiments, be replaced by or include various other entities, including location server functionality and/or base station functionality.

The communication system 100 is capable of wireless communication in that components of the system 100 can communicate with one another (at least sometimes using wireless connections) directly or indirectly, e.g., via the base stations 110*a*, 110*b*, 114 and/or the network 140 (and/or one or more other devices not shown, such as one or more other base transceiver stations). For indirect communications, the communications may be altered during transmission from one entity to another, e.g., to alter header information of data packets, to change format, etc. The UEs 105 may include multiple UEs and may be a mobile wireless communication device but may communicate wirelessly and via wired connections. The UEs 105 may be any of a variety of devices, e.g., a smartphone, a tablet computer, a vehicle-based device, etc., but these are examples only as the UEs 105 is not required to be any of these configurations, and other configurations of UEs may be used. Other UEs may include wearable devices (e.g., smart watches, smart jewelry, smart glasses, or headsets, etc.). Still other UEs may be used, whether currently existing or developed in the future. Further, other wireless devices (whether mobile or not) may be implemented within the system 100 and may communicate with each other and/or with the UEs 105, the base stations 110*a*, 110*b*, 114, the core network 140, and/or the external client 130. For example, such other devices may include IoT or IIoT devices, medical devices, home entertainment and/or automation devices, etc. The core network 140 may communicate with the external client 130, the server 123, or the server 121 (e.g., which may each be a computer system), e.g., to allow the external client 130, the server 123 or the server 121 to request and/or receive location information regarding the UEs 105 (e.g., via the GMLC 125, SLP 119 or UPF 118).

The UEs 105 or other devices may be configured to communicate in various networks and/or for various purposes and/or using various technologies (e.g., 5G, Wi-Fi communication, multiple frequencies of Wi-Fi communication, satellite positioning, satellite communication, one or more types of communications (e.g., GSM (Global System for Mobiles), CDMA (Code Division Multiple Access), LTE (Long-Term Evolution), V2X (e.g., V2P (Vehicle-to-Pedestrian), V2I (Vehicle-to-Infrastructure), V2V (Vehicle-to-Vehicle), etc.), IEEE 802.11p etc.). V2X communications may be cellular (Cellular-V2X (C-V2X)) and/or Wi-Fi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105 may communicate with each other through UE-to-UE sidelink (SL) communications by transmitting over one or more sidelink channels, such as a physical sidelink synchronization channel (PSSCH), a physical sidelink broadcast channel (PSBCH), a physical sidelink control channel (PSCCH), Synchronization Signal Block (SSB), sidelink channel state information reference signal (SL-CSIRS), physical sidelink feedback channel (PSFCH), or sidelink sounding reference signals (SL-SRS).

The UEs 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UEs 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UEs 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 Wi-Fi (also referred to as Wi-Fi), Bluetooth (BT), Worldwide Interoperability for Microwave Access (WiMAX), 5G new radio (NR) (e.g., using the NG-RAN 135 and the 5GC 140), etc. The UEs 105 may support wireless communication using a Wireless Local Area Network (WLAN) which may connect to other networks (e.g., the Internet) using a Digital Subscriber Line (DSL) or packet cable, for example. The use of one or more of these RATs may allow the UEs 105 to communicate with the external client 130, the server 121, and/or the server 123 (e.g., via elements of the 5GC 140 and possibly the Internet 122) and/or allow the external client 130, the server 121 and/or the server 123 to receive location related information regarding the UEs 105 (e.g., via the GMLC 125, SLP 119 or UPF 118).

Each of the UEs 105 may include a single entity or may include multiple entities such as in a personal area network where a user may employ audio, video, and/or data I/O (input/output) devices and/or body sensors and a separate wireline or wireless modem. An estimate of a location of a UE, e.g., UE 105, may be referred to as a location, location estimate, location fix, fix, position, position estimate, or position fix, and may be geographic, thus providing location coordinates for the UE (e.g., latitude and longitude) which may or may not include an altitude component (e.g., height above sea level, height above or depth below ground level, floor level, or basement level). Alternatively, a location of the UE may be expressed as a civic location (e.g., as a postal address or the designation of some point or small area in a building such as a particular room or floor). A location of the UE may be expressed as an area or volume (defined either geodetically or in civic form) within which the UE is expected to be located with some probability or confidence level (e.g., 67%, 95%, etc.). A location of the UE may be expressed as a relative location comprising, for example, a distance and direction from a known location. The relative location may be expressed as relative coordinates (e.g., X, Y (and Z) coordinates) defined relative to some origin at a known location which may be defined, e.g., geodetically, in civic terms, or by reference to a point, area, or volume, e.g., indicated on a map, floor plan, or building plan. In the description contained herein, the use of the term location may comprise any of these variants unless indicated otherwise.

When sidelink positioning is used, an absolute (e.g. global) or relative location of a UE may not always be obtained. Instead, location results may be obtained for a UE which may include a range or distance between the UE and each of one or more other UEs, a direction from the UE to each of one or more other UEs, a location of the UE relative to the location of some other UE, a location of one or more other UEs relative to the location of the UE, a velocity of the UE, and/or a velocity of each of one or more other UEs. A velocity of a UE may be absolute (e.g. relative to the Earth) or may be relative to some other UE, and may then be referred to as a “relative velocity”. A relative velocity of a UE B relative to another UE A may include a “radial velocity” component, which may be equal to a rate of change of a range from the UE A to the UE B, and a “transverse velocity” component which may be at right angles to the radial velocity component as seen by the UE A and may be equal to a rate of angular change of a direction to the UE B from the UE A multiplied by the range from the UE A to the UE B. In the description contained herein, the use of the term “location result” or “location results” for sidelink positioning of a UE or a group of UEs may comprise any of these variants unless indicated otherwise.

The UEs 105 may be configured to communicate with other entities using one or more of a variety of technologies. The UEs 105 may be configured to communicate with one or more other UEs (e.g. other UEs 105) via one or more device-to-device (D2D) peer-to-peer (P2P) links. The D2D P2P links may be an example of (or may be supported by) sidelink signaling and be supported with any appropriate D2D radio access technology (RAT), such as LTE Direct (LTE-D), Wi-Fi Direct (Wi-Fi D), Bluetooth, and so on. One or more of a group of UEs utilizing D2D communications may be within a geographic coverage area of a Transmission/Reception Point (TRP) such as one or more of the gNB s 110*a*, 110*b*, and/or the ng-eNB 114. Other UEs in such a group may be outside such geographic coverage areas or may be otherwise unable to receive transmissions from a base station. Groups of UEs communicating via D2D communications may utilize a one-to-many (1: M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas or be otherwise unable to receive transmissions from a base station. Groups of UEs communicating via D2D communications may utilize a one-to-many (1: M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UEs 105 via wireless communication between the UEs and one or more of the gNBs 110*a*, 110*b*, which may provide wireless communications access to the 5GC 140 on behalf of the UE using 5G. In FIG. 1, the serving gNB for the UE 105A is assumed to be the gNB 110*b*, while the serving gNB for the UE 105B is assumed to be the gNB 110*a*, although another gNB may act as a serving gNB if the UEs 105 move to another location or may act as a secondary gNB to provide additional throughput and bandwidth to the UEs 105 and the UEs 105 may share the same serving gNB.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UEs 105. One or more of the gNBs 110*a*, 110*b*, and/or the ng-eNB 114 may be configured to function as positioning-only beacons which may transmit signals to assist with determining the position of the UEs 105 but may not receive signals from the UEs 105 or from other UEs.

The base stations 110*a*, 110*b*, 114 may transmit one or more downlink reference signals, including a positioning reference signal (PRS) transmission. The PRS transmission may be configured for a specific UE 105 to measure and report one or more report parameters (for example, report quantities) associated with positioning and location information. The PRS transmission and report parameter feedback may support various location services (for example, navigation systems and emergency communications). In some examples, the report parameters supplement one or more additional location systems supported by the UE 105 (such as global positioning system (GPS) technology).

A base station 110*a*, 110*b*, 114 may configure a PRS transmission on one or more PRS resources of a channel. A PRS resource may span resource elements of multiple physical resource blocks (PRB s) within one or more OFDM symbols of a slot depending on a configured number of ports. For example, a PRS resource may span one symbol of a slot and contain one port for transmission. In any OFDM symbol, the PRS resources may occupy consecutive PRBs. In some examples, the PRS transmission may be mapped to consecutive OFDM symbols of the slot. In other examples, the PRS transmission may be mapped to interspersed OFDM symbols of the slot. Additionally, the PRS transmission may support frequency hopping within PRBs of the channel.

The one or more PRS resources may span a number of PRS resource sets according to a PRS resource setting of the base station 110*a*, 110*b*, 114. The structure of the one or more PRS resources, PRS resource sets, and PRS resource settings within a PRS transmission may be referred to as a multi-level resource setting. For example, a multi-level PRS resource setting of the base station 110*a*, 110*b*, 114 may include multiple PRS resource sets and each PRS resource set may contain a set of PRS resources (such as a set of 4 PRS resources).

The UEs 105 may receive the PRS transmission over the one or more PRS resources of the slot. The UEs 105 may determine a report parameter for at least some PRS resources included in the transmission. The report parameter (which may include a report quantity) for each PRS resource may include one or more of a time of arrival (TOA), a reference signal time difference (RSTD), a reference signal receive power (RSRP), an angle, a PRS identification number, a reception to transmission difference (UE Rx-Tx), a signal-to-noise ratio (SNR), or a reference signal receive quality (RSRQ).

Similarly, the UEs 105 may be configured to transmit one or more additional uplink reference signals that may be received by base stations 110*a*, 110*b*, 114 and used for positioning. For example, UEs 105 may transmit a sounding reference signal (SRS) for positioning. Base stations 110*a*, 110*b*, 114 that receive uplink reference signals from a UEs

105 may perform positioning measurements, such as one or more of a time of arrival (TOA), reception to transmission difference (UE Rx-Tx).

A position estimation of the UE may be determined using reference signals, such as PRS signals or SRS for positioning signals, or other reference signals, from one or more base stations 110*a*, 110*b*, 114 or the UE. Positioning methods, such as downlink (DL) Time Difference of Arrival (DL-TDOA), DL Angle of Departure (DL AOD), Enhanced Cell ID (ECID) are position methods that may be used to estimate the position of the UE using reference signals from base stations. DL-TDOA, for example, relies on measuring Reference Signal Time Differences (RSTDs) between downlink (DL) signals received from a base station for a reference cell and base station(s) for one or more neighbor cells. The DL signals for which RTSDs may be obtained comprise a Cell-specific Reference Signal (CRS) and a Positioning Reference Signal (PRS).

Other positioning methods may use reference signals transmitted by the UE including uplink based positioning methods and downlink and uplink based positioning methods. For example, uplink based positioning methods include, e.g., UL Time Difference of Arrival (UL-TDOA), UL Angle of Arrival (UL AOA), UL Relative Time of Arrival (UL-RTOA) and downlink and uplink based positioning methods, e.g., multi cell Round-trip time (RTT) with one or more neighboring base stations. Additionally, sidelink based positioning may be used in which UEs transmit and/or receive sidelink positioning reference signals that are measured and used for positioning.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UEs 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UEs 105, including cell change and handover, and may participate in supporting a signaling connection to the UEs 105 and possibly data and voice bearers for the UEs 105. The LMF 120 may communicate directly or indirectly with the UEs 105, e.g., through wireless communications, or directly or indirectly with the base stations 110*a*, 110*b*, 114. The LMF 120 may support positioning of the UEs 105 when the UEs 105 access the NG-RAN 135 and may support position procedures/methods such as Assisted GNSS (A-GNSS), Time Difference of Arrival (TDOA) (e.g., Downlink (DL) TDOA or Uplink (UL) TDOA), Real Time Kinematic (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UEs 105, e.g., received from the AMF 115 or from the GMLC 125. The LMF 120 may be connected to the AMF 115 and/or to the GMLC 125. A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE) may be performed at the UE (e.g., using signal measurements obtained by the UE for signals transmitted by wireless nodes such as the gNBs 110*a*, 110*b* and/or the ng-eNB 114, and/or assistance data provided to the UE, e.g., by the LMF 120). At least part of the positioning functionality (including derivation of the location of the UE) alternatively may be performed at the LMF 120 (e.g., using signal measurements obtained by the gNBs 110*a*, 110*b* and/or the ng-eNB 114. The AMF 115 may serve as a control node that processes signaling between the UEs 105 and the core network 140, and provides QoS (Quality of Service) flow and session management. The AMF 115 may support mobility of the UEs 105 including cell change and handover and may participate in supporting signaling connection to the UEs 105.

The GMLC 125 may support a location request for the UEs 105 received from the external client 130 and may forward such a location request to the AMF 115 for forwarding by the AMF 115 to the LMF 120 or may forward the location request directly to the LMF 120. A location response from the LMF 120 (e.g., containing a location estimate or sidelink location results for the UEs 105) may be returned to the GMLC 125 either directly or via the AMF 115 and the GMLC 125 may then return the location response (e.g., containing the location estimate or sidelink location results) to the external client 130. The GMLC 125 is shown as connected to both the AMF 115 and LMF 120, though only one of these connections may be supported by the 5GC 140 in some implementations.

A User Plane Function (UPF) 118 may support voice and data bearers for UE 105 and may enable UE 105 voice and data access to other networks such as the Internet 122 and to servers such as server 121 and server 123. The UPF 118 may be connected to gNBs 110 and ng-eNB 114. UPF 118 functions may include: external Protocol Data Unit (PDU) session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. UPF 118 may be connected to the SLP 119 to enable support of positioning of UE 105 using SUPL. SLP 119 may be further connected to or accessible from external client 130.

As illustrated, a Session Management Function (SMF) 117 connects to the AMF 115 and the UPF 118. The SMF 117 may have the capability to control both a local and a central UPF within a PDU session. SMF 117 may manage the establishment, modification, and release of PDU sessions for UE 105, perform IP address allocation and management for UE 105, act as a Dynamic Host Configuration Protocol (DHCP) server for UE 105, and select and control a UPF 118 on behalf of UE 105.

As further illustrated in FIG. 1, the LMF 120 may communicate with the gNBs 110*a*, 110*b* and/or the ng-eNB 114 using a New Radio Position Protocol A (NRPPa), which may be defined in 3GPP Technical Specification (TS) 38.455. NRPPa messages may be transferred between the gNB 110*a* (or the gNB 110*b*) and the LMF 120, and/or between the ng-eNB 114 and the LMF 120, via the AMF 115. As further illustrated in FIG. 1, the LMF 120 and the UEs 105 may communicate using an LTE Positioning Protocol (LPP), which may be defined in 3GPP TS 37.355. Here, LPP messages may be transferred between the UEs 105 and the LMF 120 via the AMF 115 and the serving gNB 110*a*, 110*b* or the serving ng-eNB 114 for the UEs 105. For example, LPP messages may be transferred between the LMF 120 and the AMF 115 using service operations based on the Hypertext Transfer Protocol (HTTP) and may be transferred between the AMF 115 and the UEs 105 using a 5G Non-Access Stratum (NAS) protocol.

The LPP protocol may be used to support positioning of the UEs 105 using UE-assisted and/or UE-based position methods such as A-GNSS, RTK, TDOA, AOA, AOD, and/or E-CID. The NRPPa protocol may be used to support positioning of the UEs 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional Synchronization Signal (SS) transmissions from the gNBs 110*a*, 110*b*, and/or the ng-eNB 114. The LMF 120 is illustrated in FIG. 1 as being located in the core network 140, but may be external to the core network 140, e.g., in an NG-RAN. For example, the LMF 120 may be co-located or integrated with a gNB, or may be disposed remote from the gNB and configured to communicate directly or indirectly with the gNB.

With a UE-assisted position method, the UE, e.g., UE 105A or UE 105B may obtain location measurements and send the measurements to a location server (e.g., the LMF 120) for computation of a location estimate for the UE. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ), AOA, AOD, for the gNBs 110*a*, 110*b*, the ng-eNB 114, and/or a WLAN AP. The location measurements may also or instead include measurements of GNSS pseudorange, code phase, and/or carrier phase for the SVs 190.

With a UE-based position method, the UE, e.g., UE 105A or UE 105B, may obtain location measurements (e.g., which may be the same as or similar to location measurements for a UE-assisted position method) and may compute a location of the UE (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114), may obtain location measurements (e.g., measurements of RSSI, RTT, RSRP, RSRQ, AOA, AOD, or Time of Arrival (ToA) for signals transmitted by the UE, e.g., UE 105A or UE 105B) and/or may receive measurements obtained by the UE. The one or more base stations or APs may send the measurements to a location server (e.g., the LMF 120) for computation of a location estimate for the UE.

As noted, while the communication system 100 is described in relation to 5G technology, the communication system 100 may be implemented to support other communication technologies, such as GSM, WCDMA, LTE, etc., that are used for supporting and interacting with mobile devices such as the UEs 105 (e.g., to implement voice, data, positioning, and other functionalities). For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125.

Positioning for UEs in a radio network, such as communication system 100 shown in FIG. 1, typically uses Uu interfaces, i.e., a radio interface between a UE 105 and the radio access network, for DL PRS and/or UL PRS. Positioning for UEs may also or instead use sidelink PRS (SL-PRS), which may be a specific sidelink defined reference signal for positioning or may reuse Uu PRS, e.g., UL PRS, sometimes referred to as Sounding Reference Signal for positioning (SRSPos), or other reference signals may be transmitted in the sidelink channel. Sidelink positioning may enhance UE positioning by providing additional transmission (or reception) nodes. A UE, such as UE 105B, with a known position may be used to support position determination of another target UE, such as UE 105A, where the UE 105B is sometimes referred to as an anchor node.

With a sidelink positioning method, a UE 105A for example may transmit a sidelink PRS or sidelink SRS signal which is received and measured by another UE 105B. In addition or instead, the UE 105B for example may transmit a sidelink PRS or sidelink SRS signal which is received and measured by the UE 105A. A sidelink PRS may be similar to a PRS (e.g. DL PRS) transmitted by a gNB 110, e.g. as described previously. A sidelink SRS may be similar to an SRS (e.g. uplink) SRS transmitted by a UE 105 for measurement by a gNB 110, e.g. as described previously. Measurements of SL PRS or SL SRS signals may include a reception to transmission time difference (Rx-Tx), time of arrival (TOA), reference signal receive power (RSRP), reference signal receive quality (RSRQ), angle of arrival (AOA) and reference signal time difference (RSTD). SL position methods may include SL round trip signal propagation time (RTT) (also referred to as ranging), SL AOA, SL AOD, or any combination thereof.

In some scenarios, a group of UEs (not shown in FIG. 1) may support SL positioning. In this case, one UE in the group may transmit an SL PRS or SL SRS signal which may be measured by some or all of the other UEs in the group. Some or all of the other UEs in the group may also each transmit an SL PRS or SL SRS signal (e.g. with each UE transmitting SL SRS or SL PRS at a different time or times than times at which other UEs in the group transmit SL PRS or SL SRS) which may be measured by some or all other UEs in the group different to the UE transmitting the UL PRS or ULS SRS. Measurements made by UEs applicable to the transmission of SL PRS or SL SRS by a group of UEs may include Rx-Tx, TOA, RSTD, AOA, RSRP, RSRQ, or any combination thereof. Position methods supported by these measurements may include sidelink RTT (e.g. ranging), sidelink AOA, sidelink AOD, sidelink TDOA (SL-TDOA), or any combination thereof. Based on the measurements and the position methods(s), each UE may determine location results for itself and/or for one or more other UEs in the group. As described previously, the location results for a UE may include a range or distance between the UE and each of one or more other UEs in the group, a direction from the UE to each of one or more other UEs in the group, a direction to the UE from each of one or more other UEs in the group, a location of the UE relative to a location of some other UE in the group, a location of the UE relative to some other known location, an absolute location of the UE, a velocity of the UE or a velocity of the UE relative to some other UE.

Sidelink positioning may be used for positioning of UEs independently of a core network (e.g. 5GC 140) or a serving PLMN. One example implementation of sidelink positioning may be found in vehicular communication systems, such as V2X, which may be used for safety related applications, such as safety warnings, traffic congestion (e.g., automated traffic control), and coordinated or automated vehicle maneuvering. One aspect of sidelink positioning that may require a solution for standardization is a sidelink positioning protocol (SLPP) that can be used between UEs, including between an RSU and UEs, and location servers. The SLPP, for example, may support sidelink positioning between UEs, RSUs, and PRUs with network access independence. The SLPP may provide support for sidelink positioning for a pair of UEs (e.g., ranging), groups of UEs (V2X), and for UEs that are members of multiple different groups. By way of example, SLPP may provide support for various position techniques currently standardized for UE-based and UE-assisted support by a location server (e.g. LMF 120) such as PRS RTT, AOA, Differential AOA (DAOA), AOD, Differential AOD (DAOD), but may also enable the support of other PRS and SRS based position methods and non-PRS methods such as RTK at a later time. By enabling the addition of new capabilities and methods at a later time, the SLPP may avoid the need to define separate new positioning protocols different to SLPP. By way of example, additional position methods that may be included in SLPP at a later time may include RTK, Wi-Fi, Ultra-Wideband (UWB), BT positioning methods. The SLPP may enable direct sidelink operation initially (where UEs communicate and coordinate positioning by exchanging SLPP messages using sidelink signaling), and may be extended later to sidelink operation via relays and operation via a network, where UEs may exchange SLPP messages via a network or via intermediate relay UEs. For example, this might be used to coordinate positioning of two vehicles on a collision course at a corner where direct SL signaling between the two vehicles is not possible. Thus, SLPP may define support for SL PRS based positioning initially in a generic manner to simplify extension to support of other position methods later. For example, SLPP may define generic SLPP messages similar to generic LPP messages defined for LPP in 3GPP TS 37.355. SLPP may support separate position methods (e.g. SL PRS RTT, SL PRS AOA, SL PRS AOD) using common procedures and common parameters where feasible. SLPP may define procedures that can be reused for multiple position methods and are not limited to just one or a few position methods. SLPP may be enabled to be transferred and used by various entities, such as UEs, RSUs, PRUs, and location servers, such as LMFs and SUPL SLPs. The location server (e.g., LMF and SUPL SLP) usage may transfer SLPP messages inside LPP messages to enable UE-assisted positioning by an LMF or SUPL SLP. Alternatively, the location server (e.g., LMF and SUPL SLP) usage may transfer SLPP messages not in association with LPP messages to enable UE-assisted positioning by an LMF or SUPL SLP. SLPP may further support relative (local) and global positioning.

Figure 2:
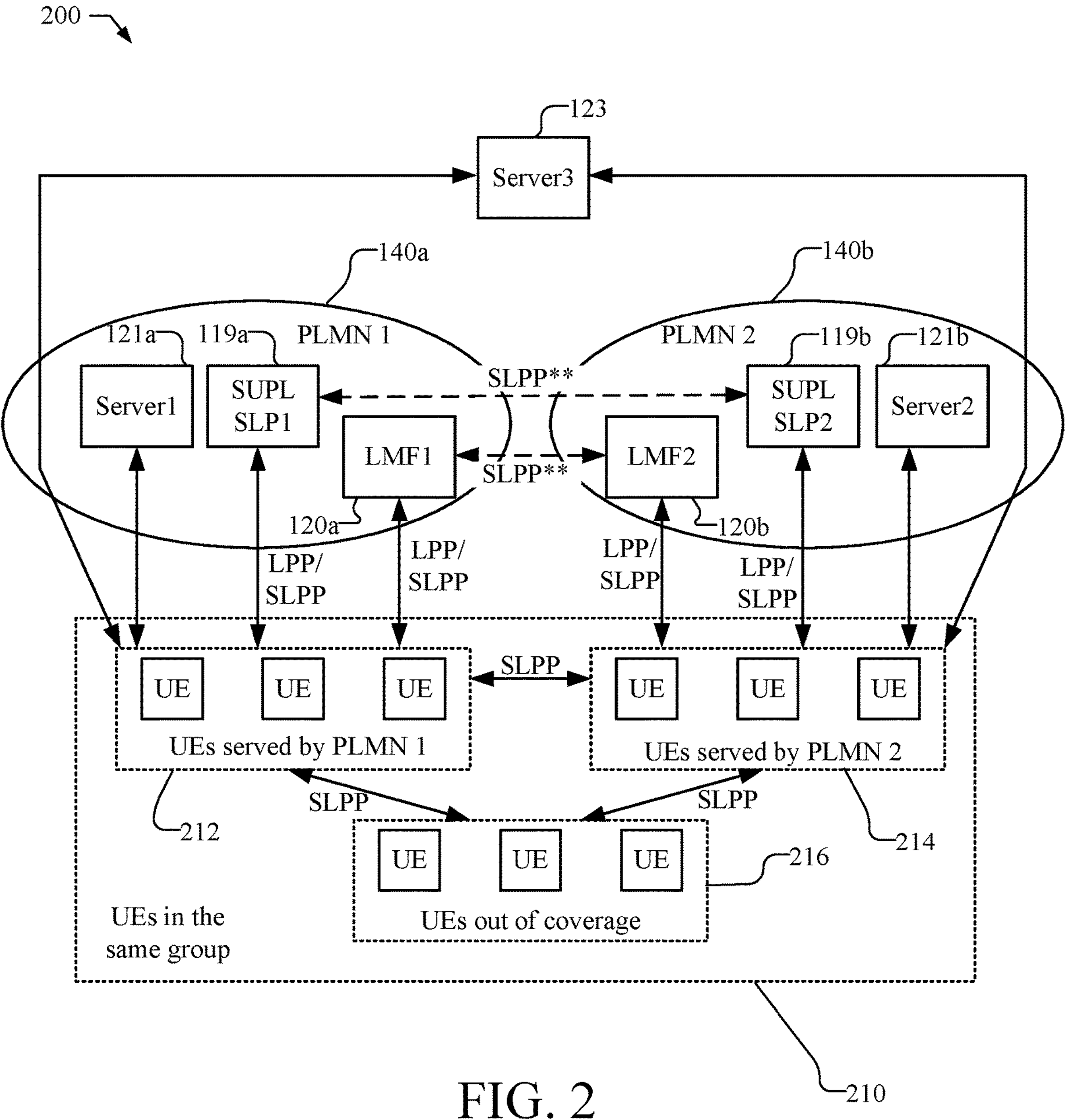
FIG. 2 shows an architecture of a communication system for network-supported sidelink positioning.

FIG. 2, by way of example, shows an architecture of a communication system 200 capable of network-supported sidelink positioning. As illustrated in FIG. 2, a number of UEs may be combined within a same group 210 for sidelink positioning. Within the group 210, various subgroups of UEs may be present. For example, the group 210 of UEs may include a first subgroup 212 of UEs that is served by a first network (PLMN1 140*a*), while a second subgroup 214 of UEs is served by a second (different) network (PLMN2 140*b*), and a third subgroup 216 of UEs is out of coverage of and is not served by either network. One or more of the UEs served by a network, e.g., the UEs in subgroup 212 served by PLMN1 140*a*, or the UEs in subgroup 214 served by PLMN2 140*b*, may include RSUs.

A location server in a serving network, e.g., LMF1 120*a*, SUPL SLP1 119*a*, or Server1 121*a* in the serving PLMN1 140*a*, LMF2 120*b*, SUPL SLP2 119*b*, or Server2 121*b* in the serving PLMN2 140*b*, and Server3 123 (communicating to UEs via PLMN1 140*a* and/or PLMN2 140*b*), may assist some or all UEs in a group that is served by the network (PLMN), e.g., subgroups 212 and 214, respectively. As illustrated, the location servers may support UEs by communicating with the UEs using "LPP/SLPP," which represents communicating using LPP, SLPP, embedding SLPP in LPP, or a combination thereof. For example, LMF1 120*a* and LMF2 120*b* may embed SLPP in LPP while supporting UEs in subgroups 212 and 214, respectively (e.g. where each SLPP message transferred between a UE and LMF1 120*a* or LMF2 120*b* is embedded in one LPP message and where one LPP message may include one or more than one embedded SLPP messages). Similarly, SUPL SLP1 119*a* and SUPL SLP2 119*b* may embed SLPP in LPP with LPP messages embedded in SUPL UserPlane Location Protocol (ULP) messages while supporting UEs in subgroups 212 and 214, respectively. Additionally or alternatively, LPP messages and/or SLPP messages may be used, where SLPP messages are not embedded in LPP messages (though LPP messages or SLPP messages may still be embedded in SUPL ULP messages). Additionally, the UEs within each subgroup, and UEs in different subgroups may exchange SLPP messages with one another to support and coordinate SL positioning.

The location server (e.g., LMF/SUPL SLP/Server1/Server2/Server3) support for a particular UE or UEs may not be visible to other UEs in the group. For example, the location server support from the PLMN1 140*a* for UEs in subgroup 212 may not be visible to UEs in subgroup 214 and may not be visible to the out of coverage UEs in subgroup 216. The support provided by location servers to the UEs may include determination or verification of SL PRS configurations and calculation of location results for UEs, including for UEs that are supported and for UEs that are not supported (e.g. such as calculating location results for UEs within a supported subgroup and for UEs within an unsupported subgroup, e.g. if position information for the UEs in the unsupported subgroup is provided to the location server). In some implementations, signaling between location servers in separate networks may be used to provide more complete network support. As illustrated, LMF-LMF or SUPL SLP-SUPL SLP signaling may use an extension of SLPP (referred to as SLPP in FIG. 2**) to enable more complete network support.

The SLPP message types may align with LPP message types to enable LPP messages to contain embedded SLPP messages and/or to enable SLPP procedures to align with LPP procedures which may reduce implementation and/or testing. FIG. 2 shows signaling (e.g. SLPP messages or SLPP messages embedded in LPP messages) between LMF1 120*a* and one or more of the UEs of subgroup 212 and signaling between LMF2 120*b* and one or more of the UEs of subgroup 214. FIG. 2 also shows SLPP messages, or LPP messages that contain embedded SLPP messages, and that are embedded in SUPL ULP messages that are exchanged between SUPL SLP1 119*a* and one or more of the UEs of subgroup 212 and between SUPL SLP2 119*b* and one or more of the UEs of subgroup 214. SLPP may include messages that are analogous to an LPP Request Capabilities message and an LPP Provide Capabilities message, which, for example, in SLPP may be called "Request Capabilities and Resources" and "Provide Capabilities and Resources". The Request/Provide Capabilities and Resources in SLPP may be restricted to NR SL PRS capabilities and resources initially, but may be extended later to capabilities and resources for LTE SL PRS, RTK, Wi-Fi, BT, etc.

In another example, SLPP may include a message that is analogous to an LPP Provide Assistance Data message, which, for example, in SLPP may be called a "Provide Positioning Signal Configuration" (or just a "Provide Assistance Data"). The Provide Positioning Signal Configuration in SLPP may include one or more of, e.g., the SL PRS Configuration to be transmitted by each UE and measured by other UEs, a start time and duration of the transmission, and conditions for termination of the transmission, and the types of SL PRS measurements requested, such as Rx-Tx, AOA, RSRP, RSRD, TOA, TDOA. In some implementations, the Provide Positioning Signal Configuration in SLPP may be extended to define other types of signals, such as RTK signals to be measured, Wi-Fi signal to be transmitted and measured, etc. The Provide Positioning Signal Configuration in SLPP may include additional information, for example, to assist UEs in acquiring and measuring signals (e.g. SL PRS signals) and to determine times of transmission and measurement.

In another example, SLPP may include a message such as a "Confirm Positioning Signal Configuration" (or a "Provide Assistance Data Confirm"), which does not have an analogous LPP message. The Confirm Positioning Signal Configuration in SLPP, for example, may confirm whether a Provide Positioning Signal Configuration (or a Provide Assistance Data) is agreeable. If the Provide Positioning Signal Configuration is (partly) not agreeable, a different configuration may be provided as a Provide Positioning Signal Configuration. Because LPP does not have an analogous message, a new LPP message type may be added to carry the Confirm Positioning Signal Configuration SLPP message in the case that SLPP messages are embedded in LPP messages. However, such a new LPP message type may not be needed when SLPP messages are not embedded in LPP messages.

In another example, SLPP may include a message that is analogous to an LPP Provide Location Information message, which, for example, in SLPP may be called a "Provide Location Information" message. The Provide Location Information message in SLPP may include and provide SL PRS measurements obtained by a UE for SL PRS transmitted by one or more other UEs and/or may include and provide location results obtained for the UE and/or for other UEs. The Provide Location Information in SLPP may be extended to include and provide other measurements, such as measurements of RTK, Wi-Fi, BT, etc.

As illustrated in FIG. 2, UEs within each subgroup and UEs in different subgroups may signal each other using SLPP (e.g. where a UE sends an SLPP message to one or more other UEs). Additionally, location servers (e.g., LMF, SUPL SLP, or Server1-3) may support UEs using SLPP (as discussed above). As previously noted, SLPP may be embedded in LPP or embedded in both LPP and SUPL, or may be sent without embedding in LPP according to some embodiments. Accordingly, a first UE may receive a first SLPP message from a second UE and may send the first SLPP message to a location server that supports the first UE. The first UE may receive a second SLPP message from the location server in response to the first SLPP message and may send the second SLPP message to the second UE.

Figure 3:
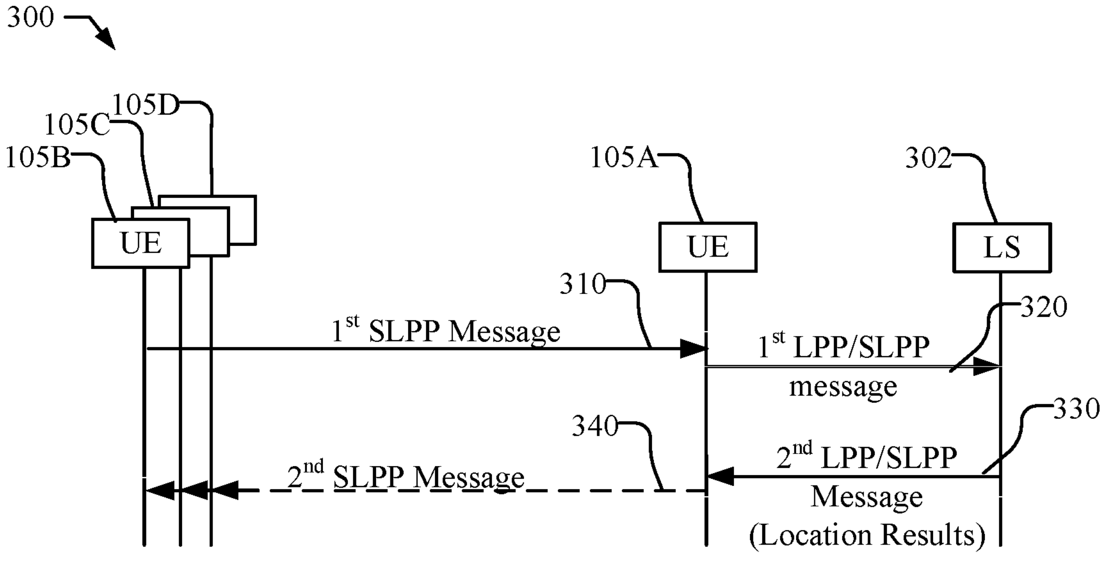
FIG. 3 is a signal flow illustrating signaling between UEs and a location server for network-supported sidelink positioning.

FIG. 3, by way of example, is a signal flow 300 illustrating the signaling between a UE 105A and UEs 105B, 105C, and 105D and a location server 302 for network supported sidelink positioning, as discussed herein. The UEs 105A, 105B, 105C, and 105D, may belong to the same group, and may be, e.g., the UEs 105 illustrated in FIG. 1 or any of the UEs illustrated within network supported subgroups 212 and 214 in FIG. 2. The location server 302 may be any of the LMF 120, SUPL SLP 119, Server 121, or Server 123 shown in FIG. 1 or the LMF1 120*a* or SUPL SLP1 119*a* shown in FIG. 2.

As shown in FIG. 3, at 310, the UE 105A receives a first sidelink positioning message from the UE 105B. The first sidelink positioning message, for example, may be an SLPP message, as discussed above, and may be any of the message types discussed above. The first sidelink positioning message may be sent based on SL multicasting (also referred to as SL groupcasting) if the group contains more than two UEs, e.g., as illustrated in FIG. 3, or may be sent based on SL unicasting. With SL multicasting (also referred to as SL groupcasting), a sidelink positioning message (e.g. an SLPP message) may be transmitted containing a group destination address (e.g. which may be partly or completely included in a layer 1 protocol header and/or in a layer 2 protocol header in the sidelink positioning message). A recipient UE (e.g. UE 105A) that belongs to a group which has this group destination address then recognizes the group destination address in the sidelink positioning message and receives, decodes, and processes the sidelink positioning message. With SL unicasting, the sidelink positioning message may be transmitted containing a UE destination address (e.g. a layer 2 address assigned to UE 105A) and is received, decoded, and processed only by the UE (e.g. UE 105A) whose destination address is included.

In 320, the UE 105A sends a first LPP/SLPP message (e.g., a first SLPP message or the first SLPP message embedded in an LPP message, as previously noted) to the location server 302, where the first SLPP message is based on or comprises the first sidelink positioning message.

In 330, the UE 105A receives a second LPP/SLPP message from the location server 302 in response to the first LPP/SLPP message from 320. The second LPP/SLPP message may be a second SLPP message or the second SLPP message embedded in an LPP message, as discussed above, and may be any of the message types discussed above. The second LPP/SLPP message (e.g. the second SLPP message) may include location results for at least one UE in the group (e.g. UE 105A or UE 105B). For example, location results for at least one UE in the group may comprise at least one of a range between the at least one UE and another UE, a direction from the at least one UE to another UE, a location of the at least one UE relative to the location of another UE, a velocity of the at least one UE, a relative velocity of the at least one UE relative to the velocity of another UE, or some combination of these.

In 340, the UE 105A may send a second sidelink positioning message to one or more of the UEs 105B, 105C, and 105D in the group. The second sidelink positioning message may be an SLPP message and may be based on or may comprise the second SLPP message received at 330. The second sidelink positioning message may be sent based on SL multicasting if the group contains more than two UEs, e.g., as illustrated in FIG. 3.

The sidelink positioning messages in signal flow 300 may be any of the message types as discussed above. For example, the first sidelink positioning message at 310 and the first LPP/SLPP message at 320 may include sidelink positioning capabilities, sidelink positioning resources or both for at least one UE in the group, e.g., UE 105B. The first LPP/SLPP message at 320 may include an LPP Provide Capabilities message and/or an SLPP Provide Capabilities message (e.g. where the SLPP Provide Capabilities message may be embedded in the LPP Provide Capabilities message). The second LPP/SLPP message at 330 and the second sidelink positioning message at 340 may include sidelink positioning capabilities, sidelink positioning resources or both for the UE 105A. The second LPP/SLPP message at 330 may include an LPP Provide Capabilities message and/or an SLPP Provide Capabilities message.

In another example, the first sidelink positioning message at 310 and the first LPP/SLPP message at 320 may include an SL Positioning Reference Signal (PRS) configuration for at least one UE in the group, e.g., UE 105A and/or UE 105B. The first LPP/SLPP message at 320 may include an LPP Request Assistance Data message, an LPP Provide Assistance Data message, an SLPP Request Assistance Data message and/or an SLPP Provide Assistance Data message (e.g. where an SLPP message may be embedded in an LPP message of the same type). The second LPP/SLPP message at 330 and the second sidelink positioning message at 340 may include an SL Positioning Reference Signal (PRS) configuration for at least one UE in the group, e.g., UE 105A or UE 105B. The second LPP/SLPP message at 330 may include an LPP Provide Assistance Data message and/or an SLPP Provide Assistance Data message (e.g. where the SLPP Provide Assistance Data message may be embedded in the LPP Provide Assistance Data message).

In another example, the first sidelink positioning message at 310 and the first LPP/SLPP message at 320 may include sidelink positioning measurements obtained by at least one UE in the group, e.g., UE 105B. The first LPP/SLPP message at 320 may include an LPP Provide Location Information message and/or an SLPP Provide Location Information message (e.g. where the SLPP Provide Location Information message may be embedded in the LPP Provide Location Information message). The second LPP/SLPP message at 330 may include the location results for the at least one UE in the group, where the second LPP/SLPP message includes an LPP Provide Location Information message and/or an SLPP Provide Location Information message (e.g. where the SLPP Provide Location Information message may be embedded in the LPP Provide Location Information message).

The location server 302 may be an LMF or a SUPL SLP. If the location server 302 is a SUPL SLP, the first LPP/SLPP message is sent by the UE 105A to the location server 302 at 320 as part of a first SUPL message, and the second LPP/SLPP message is received by the UE 105A at 330 from the location server 302 as part of a second SUPL message. The first SUPL message and the second SUPL message may each include a SUPL POS message.

Figure 4A:
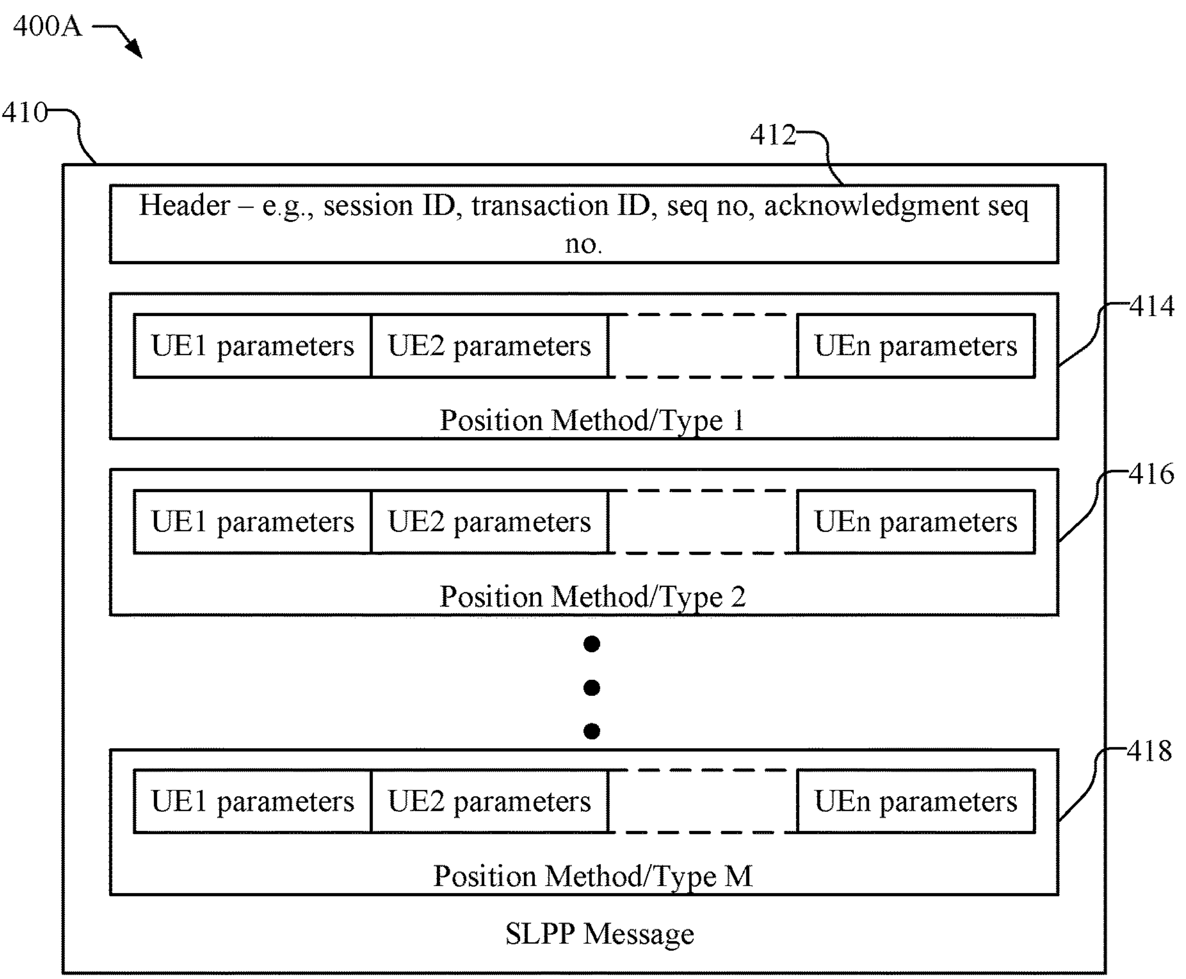
FIGS. 4A and 4B are block diagrams illustrating implementations of the structure of a sidelink positioning protocol (SLPP) message.

FIG. 4A, by way of example, is a block diagram 400A illustrating one implementation of the structure of an SLPP message 410. As illustrated, the SLPP message 410 includes a header 412, which may include a session ID, a transaction ID, a sequence number (seq no), an acknowledge (or acknowledgment) sequence number (acknowledgment seq no), etc. The SLPP message 410 allows for one or more position methods or position method types. For example, the SLPP message 410 includes, as entries, a position method/type 1 414, a position method/type 2 416, and a position method/type M 418 (e.g. where M could be equal to three or more). A position method, for example, may use a specific signal type or types (e.g., SL NR PRS, SL LTE PRS, Wi-Fi, GPS L1-L5, or any combination thereof) and supports one method of determining location for that specific signal type (e.g. one of RTT, AOA, RSRP, or TDOA). A position method type, on the other hand, uses a specific signal type or types and supports multiple position methods for that signal type or types. For example, a position method type could use SL PRS signals (e.g. either SL NR PRS signals or both SL NR PRS and SL LTE PRS signals) and support multiple position methods that use these SL PRS signals (e.g. could support all of RTT, AOA, RSRP, and TDOA). Another position method type could use GNSS signals and support multiple position methods that use GNSS signals (e.g. could support GNSS code phase based positioning and GNSS carrier phase based positioning such as RTK).

The SLPP message 410 may be configured to support position methods or position method types (also referred to as position types), or both position methods and position method types. As illustrated, each position method/type 414, 416, and 418 in the SLPP message 410 may include parameters for each UE in a group, which are illustrated as being identified by member IDs, e.g. UE1, UE2, . . . UEn. It is possible that not all UEs in a group support the same position methods/types, which could mean that parameters for a UE not supporting a position method/type 414, 416, or 418 might not be present for that position method/type in the SLPP message 410. Support for multiple position methods or position method types in the SLPP message 410 may be advantageous when UEs do not all support the same position methods or same position method types. e.g. where some UEs may support positioning using RTK and SL PRS, while some other UEs only support RTK. In some implementations, however, the SLPP message 410 may provide support for only one position method (e.g. NR SL PRS RTT) or one position method type (e.g., NR SL PRS).

Figure 4B:
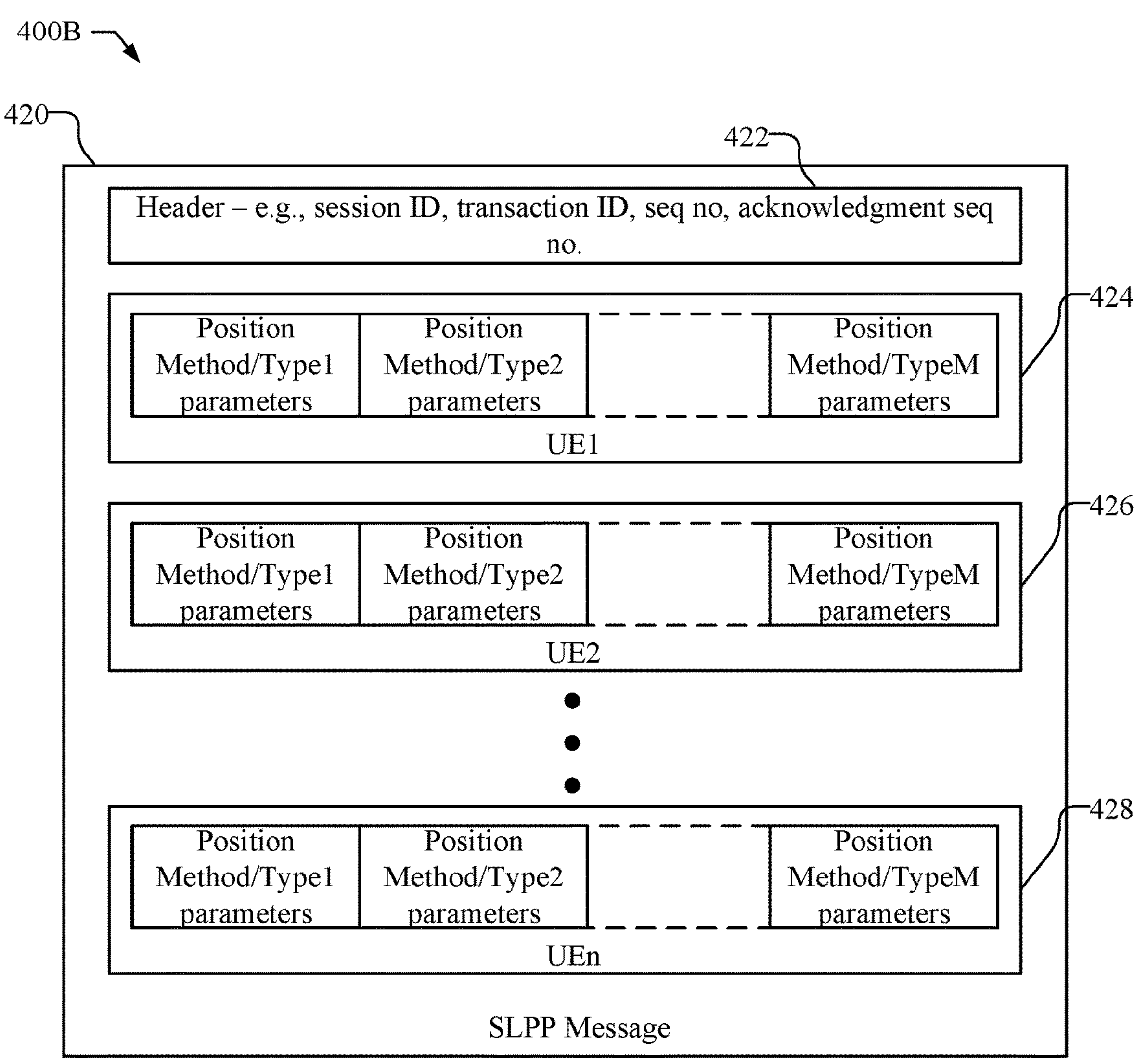

FIG. 4B is a block diagram 400B illustrating another implementation of the structure of an SLPP message 420. Similar to the block diagram 400A of FIG. 4A, the SLPP message 420 includes a header 422, which may include similar information to the header 412 in FIG. 4A. Here, however, data may be structured such that each UE in a group of n UEs has a separate message portion 424, 426, and 428 in the SLPP message 420 that each include parameters for that UE for each position method/type 1-M supported by that UE.

Figure 5:
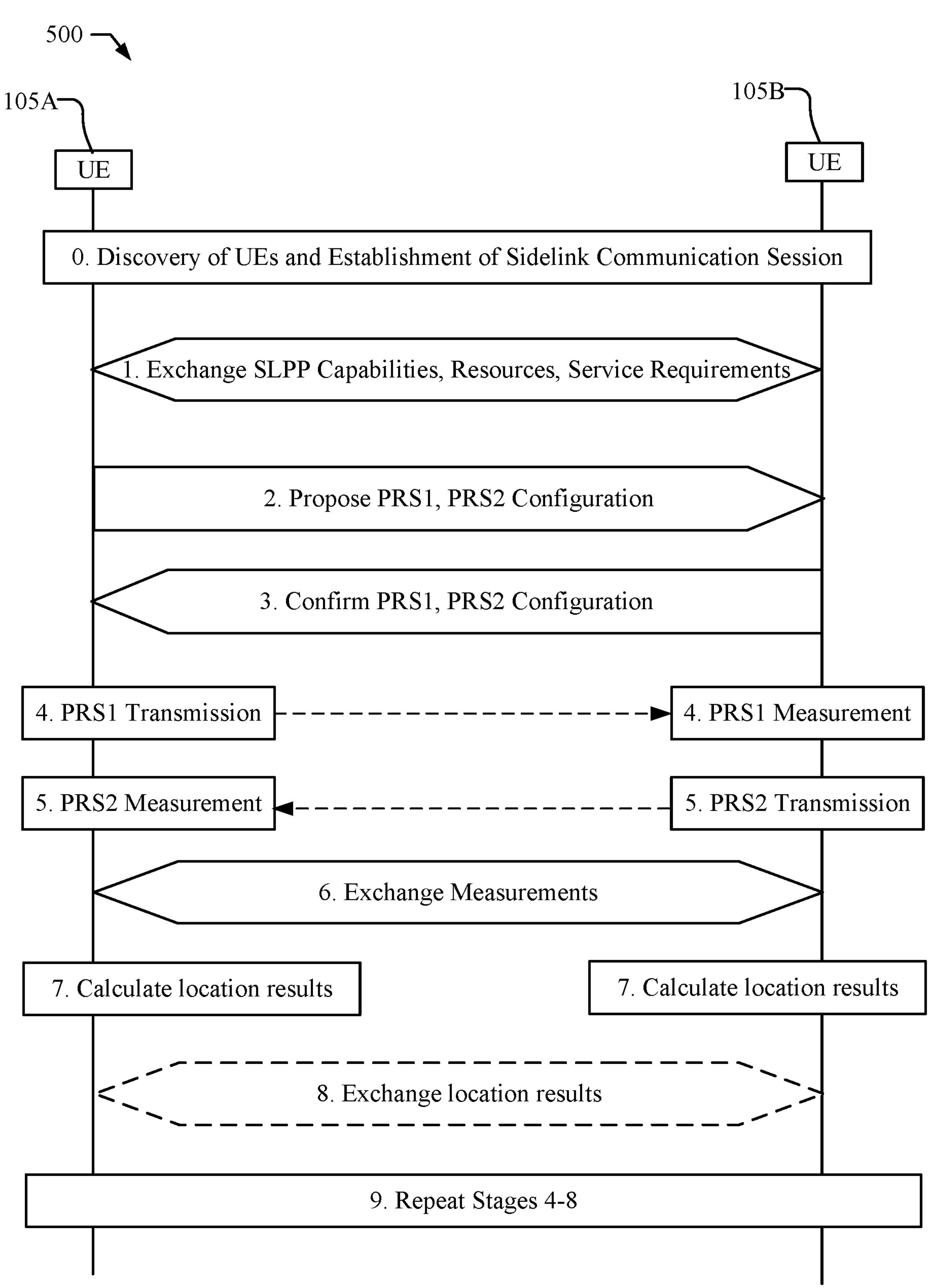
FIG. 5 is a signal flow illustrating the signaling between a pair of UEs for pairwise sidelink positioning.

FIG. 5 by way of example, is a signal flow 500 illustrating the signaling between UE 105A and UE 105B for pairwise sidelink positioning involving just two UEs. The UE 105A and UE 105B, for example, may be, e.g., the UEs illustrated in FIG. 1 or any two of the UEs illustrated in group 210 shown in FIG. 2. The sidelink positioning illustrated in FIG. 5 can be independent of a network and thus, the UEs shown in FIG. 5 may be the out-of-coverage UEs in subgroup 216. The signaling performed in signal flow 500 may be similar to or the same as the SLPP signaling discussed above in reference to FIG. 2.

At stage 0 of FIG. 5, the discovery of UEs and establishment of a sidelink communication session or sidelink positioning session is performed. The discovery process may be request-response or announcement based. The discovery phase, for example, may be implemented by one or both of UEs 105A and 105B to detect other UEs that are available for sidelink positioning. For example, discovery messages may be exchanged between UE 105A and/or UE 105B to determine nearby UEs that are available to participate in sidelink positioning. For example, UE 105A may broadcast a discovery based message using sidelink signaling which UE 105B may receive and respond to by transmitting a similar discovery based response message back to UE 105A using sidelink signaling. Additional messages may be exchanged between UE 105A and UE 105B to establish a sidelink communication or positioning session between UEs 105A and 105B. For example, UE 105A may send a request (e.g. an SLPP request) to UE 105B to start an SLPP positioning session and UE 105B may return a response (e.g. an SLPP response) to UE 105A agreeing to start the SLPP positioning session.

At stage 1, the UEs 105A and 105B may exchange SLPP capabilities, resources and service requirements, which may include Quality of Service (QoS), for example, using SLPP Request Capabilities and Resources and SLPP Provide Capabilities and Resources messages as discussed above. Exchanging SLPP capabilities, resources and service requirements may include both of UE 105A and UE 105B sending their capabilities, resources, and service requirements to the other UE or just one of UE 105A or UE 105B sending its capabilities, resources, and service requirements to the other UE. The capabilities that are exchanged may define what each of the UEs 105A and 105B is implemented to support. The resources that are exchanged may define what capabilities each of the UEs 105A and 105B is permitted to support, and/or what capabilities each of the UEs 105A and 105B is not permitted to support, or both. The sidelink positioning capabilities that a UE is permitted to support or not permitted to support may include permission or restrictions on one or more of a sidelink PRS transmission time, sidelink PRS measurement time, sidelink PRS transmission duration, sidelink PRS measurement duration, bandwidth of sidelink PRS that can be transmitted, bandwidth of sidelink PRS that can be measured, RF frequency of sidelink PRS that can be transmitted, RF frequency of sidelink PRS that can be measured, signal coding of sidelink PRS that can be transmitted, signal coding of sidelink PRS that can be measured, periodicity of sidelink PRS transmissions, periodicity of sidelink PRS that is measured, transmission power for sidelink PRS transmission, transmission power for sidelink PRS that is measured, or any combination thereof.

Sidelink positioning capabilities may be fixed and static (e.g. dependent on UE implementation which may never change or may be changed infrequently via a software upgrade to the UE). Sidelink positioning resources may depend on available spectrum for SL PRS (e.g. whether PLMN licensed spectrum, unlicensed spectrum or Intelligent Transportation System (ITS) spectrum for V2X is available and permitted to be used) and/or on pre-existing positioning sessions and/or positioning procedures that a UE may already be supporting or part of. The pre-existing positioning sessions and/or positioning procedures may mean that a UE is not able to transmit and/or measure SL PRS at certain times for a new SL positioning session because at these times the UE needs to be transmitting and/or measuring SL PRS for the pre-existing positioning sessions and/or positioning procedures. Similarly, certain SL PRS characteristics like frequency or coding that are already in use for the pre-existing positioning sessions may not be available to be used for the new SL (or SLPP) positioning session. For example, usage of certain SL PRS characteristics for a new positioning sessions that are already in use for the pre-existing positioning sessions might prevent SL PRS transmissions for the new positioning session or pre-existing positioning sessions from being uniquely identified by UEs involved in the new positioning session or pre-existing positioning sessions which could then cause errors in location measurements and location results. Controlling the usage of SL PRS characteristics for a new positioning session by exchanging sidelink positioning resources that are allowed and/or not allowed may prevent such errors from occurring.

The service requirements that are exchanged at stage 1 may include an indication of at least one of an immediate (e.g. single) location at a current time, a deferred location (e.g. at a later time), a periodic location, a triggered location, a type or types of location result (e.g. relative location, global location, range, direction), a QoS of location results (e.g. location result accuracy, location result response time or latency, location periodicity, location reliability), or some combination of these. The service requirements that are exchanged may define the type(s) of location (e.g., single or periodic), accuracy, latency, periodicity, reliability, or any combination thereof, that each UE requires or expects in the sidelink positioning session.

At stage 2, the UE 105A may send to UE 105B a proposed sidelink positioning signal configuration, e.g., PRS1, PRS2 configuration, e.g., using an SLPP Provide Positioning Signal Configuration message or SLPP Provide Assistance Data message, as discussed above. The PRS1 configuration (in this example) may define SL PRS to be transmitted later by UE 105A, while the PRS2 configuration (in this example) may define SL PRS to be transmitted later by UE 105B, The PRS1 and PRS2 configurations, for example, may be defined and proposed by UE 105A based on the capabilities, resources and service requirements exchanged at stage 1 which may include QoS of UE 105A and 105B. The PRS1 and PRS2 configurations, for example, may be the same as or similar to PRS configurations defined in 3GPP TS 37.355 for LPP except that they may refer to SL PRS transmission on a sidelink communication channel between UEs 105A and 105B. For example, the PRS1 and PRS2 configurations may each include specifications of SL PRS transmission starting time, SL PRS transmission duration, SL PRS bandwidth, SL PRS RF frequency (or frequencies), SL PRS signal coding, SL PRS transmission periodicity, SL PRS transmission power, SL PRS muting and/or SL PRS frequency hopping. Rules and guidelines may be standardized to ensure that the proposed PRS configurations PRS1 and PRS2 are compatible with the capabilities, resources, and service requirements of UEs 105A and 105B, which may include QoS of both UEs.

At stage 3, the UE 105B may send a message to the UE 105A to confirm the proposed positioning signal configuration, e.g., the PRS1, PRS2 configurations, e.g., using an SLPP Confirm Positioning Signal Configuration or SLPP Provide Assistance Data Confirm, as discussed above. In some implementations, the UE 105B may instead reject the proposed positioning signal configuration at stage 3 and UE 105A may then propose a different positioning signal configuration until the UE 105A confirms the positioning signal configuration. In some implementations, the UE 105B may send to the UE 105A a modified proposed positioning signal configuration and the UE 105A may confirm the modified positioning signal configuration or may send another modified proposed positioning signal configuration to UE 105B. In some implementations, stage 3 may be omitted when the PRS1, PRS2 configurations sent at stage 2 are acceptable to UE 105B, which may reduce signaling.

At stage 4, the UE 105A transmits SL positioning signals corresponding to the PRS1 configuration and the UE 105B measures these positioning signals (e.g. based on UE 105B already knowing the PRS1 configuration). The UE 105B, for example, may measure one or more of RTT, Rx-Tx, RSRP, RSRQ, AOA, AOD, or TOA of the PRS1 transmitted by UE 105A.

At stage 5, the UE 105B transmits SL positioning signals corresponding to the PRS2 configuration and the UE 105A measures these positioning signals (e.g. based on UE 105A already knowing the PRS2 configuration). The UE 105A, for example, may measure one or more of RTT, Rx-Tx, RSRP, RSRQ, AOA, AOD, or TOA of the PRS2 transmitted by UE 105B.

At stage 6, the UE 105A and UE 105B exchange measurements obtained at stage 4 and stage 5. The exchange of measurements, for example, may indicate an exact SL PRS configuration used at stage 4 or stage 5 for transmission of SL PRS if there was any difference to the PRS1 and/or PRS2 configuration (e.g. concerning an exact time or duration of SL PRS transmission) and may further provide the measurements generated at stage 4 or stage 5. As an example, if the SL positioning signals (SL PRS) transmitted by UE 105A at stage 4 corresponding to the PRS1 configuration sent by UE 105A at stage 2 do not exactly match the PRS1 configuration (e.g. because UE 105A slightly delayed the SL PRS transmission because some other UE was transmitting at the transmission time(s) indicated in the PRS1 configuration), then UE 105A may include as part of the measurements sent by UE 105A at stage 6, the transmission time(s) actually used by UE 105A at stage 4. The UE 105B may then use the correct transmission time(s) for UE 105A received at stage 6 later when calculating any location results (e.g. at stage 7). Exchanging measurements at stage 6 may include both of UE 105A and UE 105B sending their measurements to the other UE or just one of UE 105A or UE 105B sending its measurements to the other UE.

At stage 7, the UE 105A and UE 105B may each calculate location results, e.g., range and/or direction between UE 105A and 105B, relative locations, absolute locations, velocities, relative velocities, or any combination thereof, based on the measurements generated at stages 4 and 5 and received at stage 6. For example, the UEs may determine a range between UE 105A and UE 105B based on Rx-Tx measurements of the PRS signals or based on equivalent TODi and TOAi measurements for the PRSi signals (where i=1 for PRS transmitted by UE 105A in stage 4 and i=2 for PRS transmitted by UE 105B in stage 5, and c represents the speed of transmission of an electromagnetic wave, e.g., speed of light) as:

$$\text{Range} = \left|\frac{(TOA_2 - TOD_1) + (TOA_1 - TOD_2)}{2c}\right| \quad \text{Eq. 1}$$

The location result(s) determined at stage 7 may then be exchanged, at stage 8. Exchanging location results at stage 8 may include both of UE 105A and UE 105B sending their location results to the other UE or just one of UE 105A or UE 105B sending its location results to the other UE. In the latter case, just the UE which sends its location results to the other UE may calculate its location results at stage 7.

As illustrated in stage 9, stages 4-8 may be repeated as desired by UE 105A and UE 105B. For example, stages 4-8 may be repeated at stage 9 to enable periodic or triggered location results for UE 105A and UE 105B.

Figure 6A:
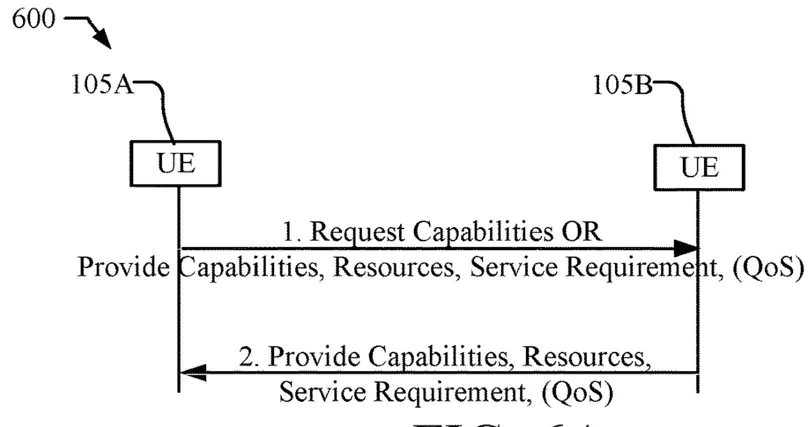
FIG. 6A is a signal flow illustrating the signaling between UEs for a sidelink positioning capabilities exchange, including the exchange of capabilities, resources, and service requirements.

FIG. 6A is a signal flow 600 illustrating the signaling between UE 105A and UE 105B for a sidelink positioning capabilities exchange, including the exchange of capabilities, resources, and service requirements, which may include QoS, which may correspond to stage 1 of FIG. 5. As illustrated in signal flow 600, at stage 1, the UE 105A may send to the UE 105B a (e.g. SLPP) Request Capabilities message, a (e.g. SLPP) Provide Capabilities message or a (e.g. SLPP) Provide Capabilities, Resources, and Service Requirements message, which may include QoS. At stage 2, and in response to the Request Capabilities, the Provide Capabilities or the Provide Capabilities, Resources, and Service Requirements message, the UE 105B may send a (e.g. SLPP) Provide Capabilities message or a (e.g. SLPP) Provide Capabilities, Resources, and Service Requirements message, which may include QoS, to the UE 105A.

Figure 6B:
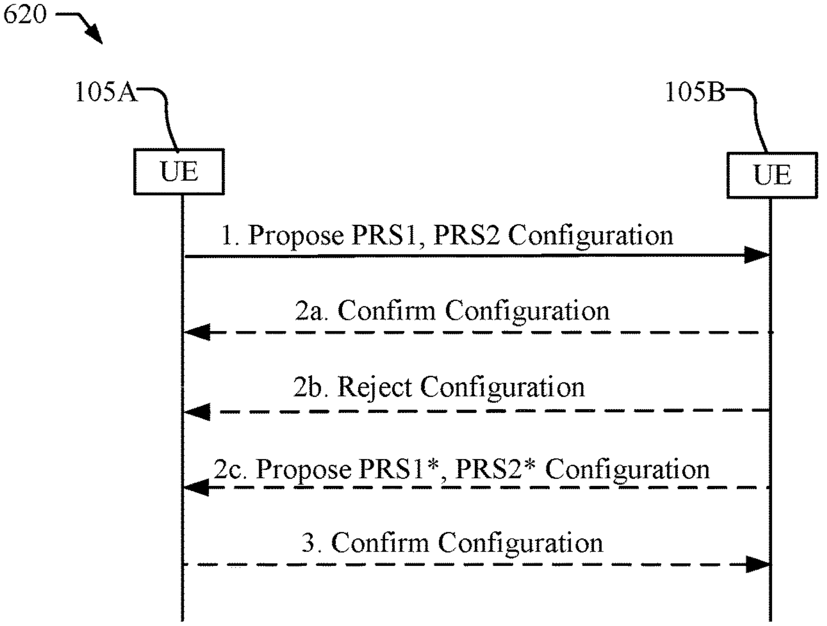
FIG. 6B is a signal flow illustrating the signaling between UEs for a positioning signal configuration and confirmation exchange.

FIG. 6B is a signal flow 620 illustrating the signaling between UE 105A and UE 105B for a positioning signal configuration and confirmation exchange and may correspond to stages 2 and 3 of FIG. 5. As illustrated, at stage 1 of signal flow 620, the UE 105A sends to UE 105B a proposed positioning signal configuration, e.g., PRS1, PRS2 configuration, which corresponds to stage 2 of FIG. 5 and may be included in an SLPP Provide Assistance Data message or an SLPP Provide Positioning Signal Configuration message. At stage 2*a*, the UE 105B may send to UE 105A a confirm configuration message, which corresponds to stage 3 of FIG. 5 and may be an SLPP Confirm Positioning Signal Configuration message or an SLPP Provide Assistance Data Confirm message. Alternatively, at stage 2*b*, the UE 105B may send to UE 105A a reject configuration message which may be an SLPP Reject Positioning Signal Configuration message or an SLPP Provide Assistance Data Reject message. In response to the reject configuration message from stage 2*b*, the UE 105A may prepare another positioning signal configuration, and stages 1 and 2*a* or 2*b* are repeated. In another implementation, at stage 2*c*, the UE 105B may send to UE 105A a modified positioning signal configuration, e.g., with proposed modified PRS1*, PRS2* configurations, which may be included in an SLPP Provide Assistance Data message or an SLPP Provide Positioning Signal Configuration message. In response to stage 2*c*, the UE 105A may send a confirm configuration message to UE 105B at stage 3, which may be an SLPP Confirm Positioning Signal Configuration message or an SLPP Provide Assistance Data Confirm message. Alternatively, the UE 105A may further modify the positioning signal configuration by repeating stages 1 and 2*a* or 2*b*.

Figure 6C:
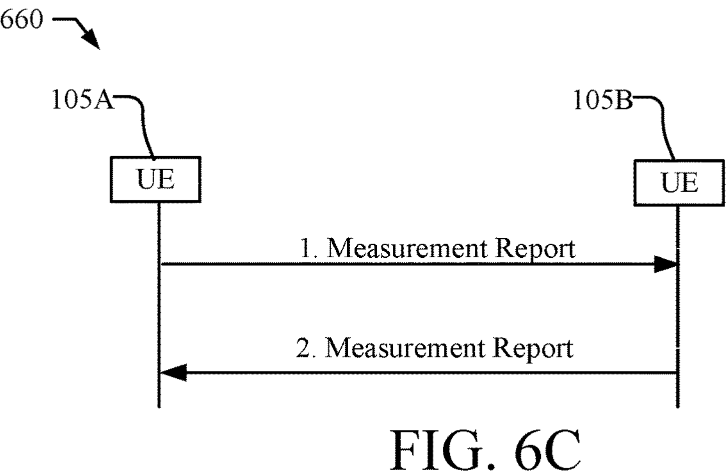
FIG. 6C is a signal flow illustrating the signaling between UEs for a measurement exchange.

FIG. 6C is a signal flow 660 illustrating the signaling between UE 105A and UE 105B for a measurement exchange, and may correspond to stage 6 of FIG. 5. As illustrated in signal flow 660, at stage 1, the UE 105A may send to the UE 105B a measurement report, which may include information related to the PRS transmitted by the UE 105A at stage 4 of FIG. 5, such as an exact time or times of transmission, etc. and may further include measurements generated by the UE 105A of the PRS transmitted by the UE 105B at stage 5 of FIG. 5. The measurement report for stage 1 may be an SLPP Provide Location Information message.

Similarly, at stage 2, the UE 105B may send to the UE 105A a measurement report, which may include information related to the PRS transmitted by the UE 105B at stage 5 of FIG. 5, such as an exact time or times of transmission, etc. and may further include measurements generated by the UE 105B of the PRS transmitted by the UE 105A at stage 4 of FIG. 5. The measurement report for stage 2 may be an SLPP Provide Location Information message.

Thus, as discussed for stage 1 of FIG. 5, as well as discussed for stage 1 shown in FIG. 6A, a sidelink positioning message sent by the UE 105A may include sidelink positioning capabilities and sidelink positioning resources of the UE 105A. The sidelink positioning message may further include the sidelink positioning Service Requirement of the UE 105A as discussed for stage 1 of FIG. 5 and FIG. 6A.

Moreover, the UE 105A may receive a second sidelink positioning message from the UE 105B. For example, as discussed for stage 1 of FIG. 5, as well as discussed for stage 2 shown in FIG. 6A, the second sidelink positioning message received from UE 105B may include the sidelink positioning capabilities and sidelink positioning resources of UE 105B. The second sidelink positioning message received from UE 105B may further include the sidelink positioning Service Requirement of UE 105B as discussed for stage 1 of FIG. 5 and stage 2 of FIG. 6A.

As illustrated for stages 2-8 of FIG. 5, the UE 105A may exchange additional sidelink positioning messages with UE 105B, which may be based on the sidelink positioning capabilities and the sidelink positioning resources of UE 105B. Each of the additional sidelink positioning messages may be further based on the sidelink positioning Service Requirement of the UE 105B. For example, as discussed for stages 2-8 of FIG. 5, as well as discussed in signal flows 620 and 660 of FIGS. 6B and 6C, the additional sidelink positioning messages exchanged with UE 105B may include proposed positioning signal configurations, confirmation (or rejection or modification) of the proposed positioning signal configurations, requests for measurements and/or measurements of sidelink positioning PRS and location results determined from the measurements of sidelink positioning PRS.

As illustrated by stage 7 of FIG. 5, the UE 105A may determine the location of the UE 105B based on the additional sidelink positioning messages.

The pairwise sidelink positioning illustrated in FIGS. 5, 6A, 6B, and 6C may be expanded and extended for group operation, e.g., with a group of UEs, e.g., as illustrated by the UE group 210 in FIG. 2. The group of UEs, for example, may be sufficiently small that direct discovery and direct sidelink signaling are possible between UEs in the group of UEs. Various sidelink positioning messages sent by the UEs in the group may be transmitted using groupcast or multicast so that each sidelink positioning message is broadcast once using sidelink signaling to all recipient UEs.

Figure 7:
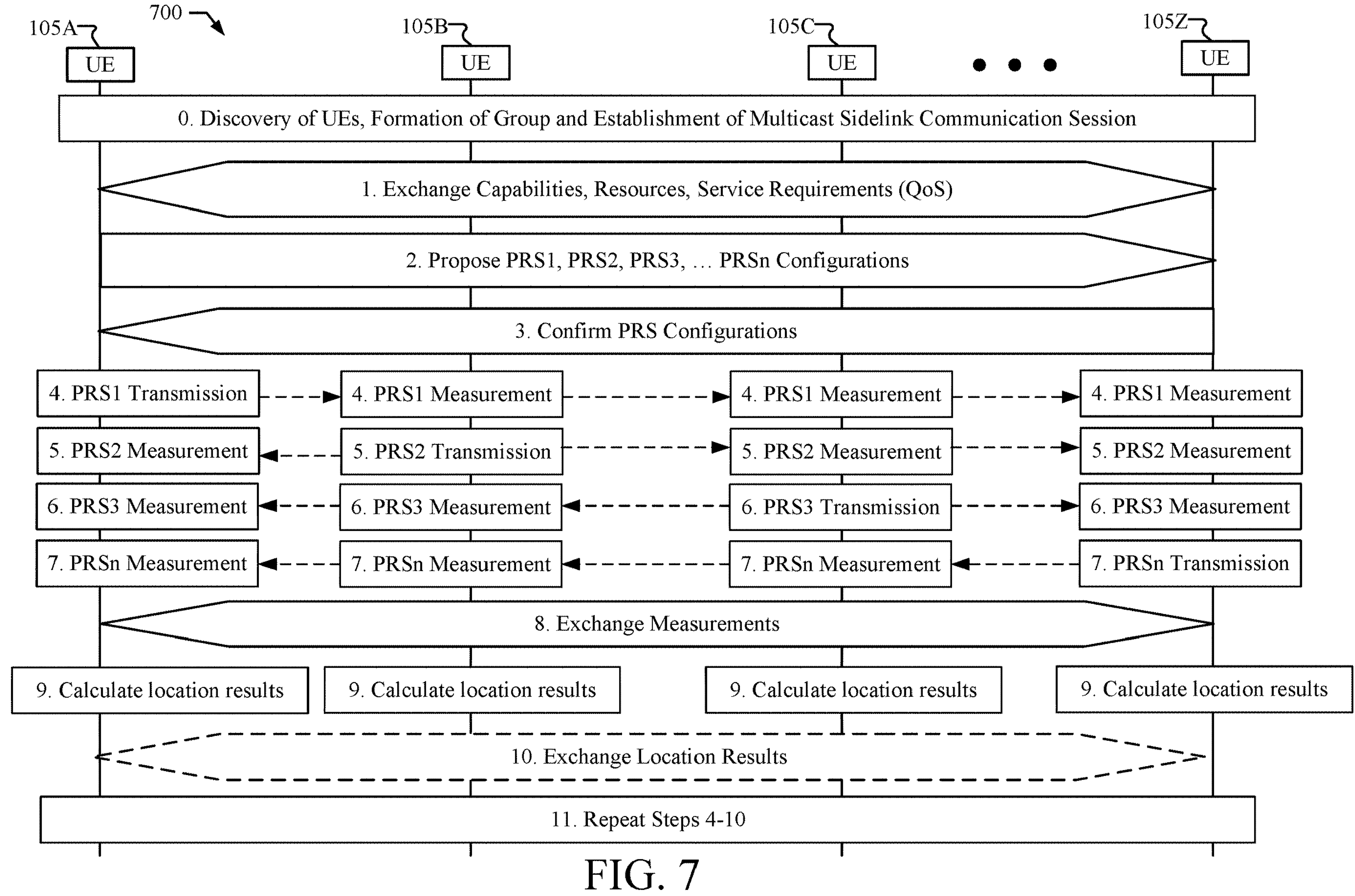
FIG. 7 is a signal flow illustrating the signaling for group operation of sidelink positioning for a plurality of UEs.

FIG. 7 by way of example, is a signal flow 700 illustrating the signaling for group operation of sidelink positioning for a plurality of UEs, illustrated as UE 105A, 105B, 105C, . . . 105Z, sometimes collectively referred to as UEs 105. The group of UEs may comprise a small number of UEs (e.g., up to 20) for which direct discovery and direct SL signaling are possible. The UEs 105, may be, e.g., the UEs illustrated in FIG. 1 or any of the UEs illustrated in group 210 shown in FIG. 2. The sidelink positioning illustrated in FIG. 7 is independent of a network and thus, the UEs shown in FIG. 7 may be the out of coverage UEs in subgroup 216 in FIG. 2. The signaling performed in signal flow 700 may be similar to or the same as the SLPP signaling discussed above in reference to FIG. 2 and as illustrated in signal flow 500 in FIG. 5, except that the SLPP signaling can involve a larger number of UEs. If desired, the signaling may be performed directly, as illustrated or via relays and/or via a network. It is noted that the number of UEs in signal flow 700 is typically more than two though in a limiting case might be two (in which case two of the UEs shown in FIG. 7 are not present).

At stage 0 of FIG. 7, discovery of UEs, formation of the group, and establishment of a multicast sidelink communication session is performed. The discovery process may be request-response or announcement based. The discovery phase, for example, may be implemented by one or more UEs 105 to detect other UEs 105 that are available for sidelink positioning and are suitable for joining the group. For example, discovery messages may be exchanged between the UEs 105 to determine nearby UEs 105 that are available to participate in sidelink positioning. For example, UE 105A may broadcast a discovery based message using sidelink signaling which UEs 105B, 105C and 105Z may each receive and respond to by each transmitting a similar discovery based response message back to UE 105A using sidelink signaling. The UEs 105 may also exchange (or may be pre-configured with) one or more group criteria parameters for group formation, such as an approximate maximum distance between pairs of UEs (to help ensure UEs 105 can communicate directly with one another), a minimum period of time that any UE 105 is likely to be in communication with other UEs 105 (to help ensure that UEs 105 can communicate directly with one another for some minimum time period), and/or a common direction and/or common range of speed of the UEs 105 (to help ensure that UEs 105 will remain nearby to one another). Based on the group criteria parameters, the UEs 105 may determine whether to form a group, which UEs 105 should or should not belong to the group or whether and when to add additional UEs 105 later to the group and/or to remove an existing UEs 105 from the group. For example, the UEs 105 may determine a group status indication for each UE 105 indicating inclusion in the group or exclusion from the group. In FIG. 7, for example, it is assumed that all UEs 105A, 105B, 105C, . . . 105Z meet the one or more group criteria and are included in the group. Additional messages may be exchanged between the UEs 105 to establish a sidelink communication or positioning session between the UEs 105. For example, UE 105A may multicast a single request (e.g. an SLPP request) to UEs 105B, 105C and 105Z to start an SLPP positioning session and UEs 105B, 105C and 105Z may each return a response (e.g. an SLPP response) to UE 105A agreeing to start the SLPP positioning session.

At stage 1, the UEs 105 may exchange SLPP capabilities, resources, and service requirements, which may include QoS, for example, using SLPP Request Capabilities and Resources and SLPP Provide Capabilities and Resources messages as discussed above. The exchange of capabilities, resources, and service requirements, which may include QoS, may be similar to the signal flow 600 illustrated in FIG. 6A, but with additional UEs. For example, the UEs 105 may initially exchange capabilities by each sending a single groupcast SLPP message from each UE 105 to all the other UEs 105. The capabilities that are exchanged may define what each of the UEs 105 is implemented to support. The resources that are exchanged may define what capabilities each of the UEs 105 is permitted to support and/or is not permitted to support. The sidelink positioning capabilities that a UE is permitted to support or not permitted to support may include permission or restrictions on one or more of a sidelink PRS transmission time, sidelink PRS measurement time, sidelink PRS transmission duration, sidelink PRS measurement duration, bandwidth of sidelink PRS that can be transmitted, bandwidth of sidelink PRS that can be measured, RF frequency of sidelink PRS that can be transmitted, RF frequency of sidelink PRS that can be measured, signal coding of sidelink PRS that can be transmitted, signal coding of sidelink PRS that can be measured, periodicity of sidelink PRS transmissions, periodicity of sidelink PRS that is measured, transmission power for sidelink PRS transmission, transmission power for sidelink PRS that is measured, or any combination thereof. Sidelink positioning capabilities may be fixed and static as discussed for stage 1 of FIG. 5. Sidelink positioning resources may depend on available spectrum for SL PRS and/or on pre-existing positioning sessions and/or positioning procedures that a UE 105 may already be supporting or part of as discussed for stage 1 of FIG. 5. The service requirements of each of the UEs 105 may be as described for stage 1 of FIG. 5.

At stage 2, the UE 105A may send the other UEs 105 a proposed positioning signal configuration, e.g., PRS1, PRS2, PRS3, . . . PRSn configuration, e.g., using an SLPP Provide Positioning Signal Configuration message or SLPP Provide Assistance Data message, as discussed above. The PRS1 configuration (in this example) may define SL PRS to be transmitted later by UE 105A, the PRS2 configuration (in this example) may define SL PRS to be transmitted later by UE 105B, the PRS3 configuration (in this example) may define SL PRS to be transmitted later by UE 105C, and the PRSn configuration (in this example) may define SL PRS to be transmitted later by UE 105Z, The PRS1, PRS2, PRS3 and PRSn configurations, for example, may be defined and proposed by UE 105A based on the capabilities, resources and service requirements exchanged at stage 1 which may include QoS of each of the UEs 105. The PRS1, PRS2, PRS3 and PRSn configurations, for example, may each be as described for PRS1 and PRS2 for stage 2 of FIG. 5.

At stage 3, each of the UEs 105B, 105C, . . . 105Z may send a message to the UE 105A to confirm the proposed positioning signal configuration, e.g., the PRS1, PRS2, PRS3, . . . PRSn configurations, e.g., using an SLPP Confirm Positioning Signal Configuration or SLPP Provide Assistance Data Confirm, as discussed above. In some implementations, a UE 105 (e.g. UE 105B) may instead reject the proposed positioning signal configuration at stage 3 and may further indicate which PRS configuration(s) are being rejected. and UE 105A may then propose a different positioning signal configuration (or just different PRS configurations for the PRS configuration(s) which are being rejected) until each of the other UEs 105 confirms the positioning signal configuration. In some implementations, a UE 105 (e.g. UE 105B) may send to the UE 105A and to other UEs 105 in the group a modified proposed positioning signal configuration and the UE 105A and the other UEs 105 may confirm the modified positioning signal configuration or may send another modified proposed positioning signal configuration to other UEs 105. In some implementations, stage 3 may be omitted when the PRS1, PRS2. PRS3, . . . PRSn configurations sent at stage 2 are acceptable to each of the UEs 105B, 105C, . . . 105Z which may reduce signaling.

At stage 4, the UE 105A transmits SL positioning signals corresponding to the PRS1 configuration and UEs 105B, 105C, . . . 105Z each measure these positioning signals (e.g. based on UE 105B, UE 105C, . . . UE 105Z already each knowing the PRS1 configuration). The UEs 105B, 105C, . . . 105Z, for example, may each measure one or more of RTT, Rx-Tx, RSRP, RSRQ, AOA, AOD, TOA of the PRS1 transmitted by UE 105A.

At stage 5, the UE 105B transmits positioning signals PRS2 and the remaining UEs 105 each measure the positioning signals PRS2, similar to PRS1 measurement at stage 4.

At stage 6, the UE 105C transmits positioning signals PRS3 and the remaining UEs 105 measure the positioning signals PRS3, similar to PRS1 measurement at stage 4.

At stage 7, the UE 105Z transmits positioning signals PRSn and the remaining UEs 105 measure the positioning signals PRSn. similar to PRS1 measurement at stage 4.

At stage 8, the UEs 105 exchange measurements. The exchange of measurements may be similar to the signal flow 660 illustrated in FIG. 6C, but with additional UEs, and with the measurements, for example, exchanged via a single groupcast SLPP message sent by each UE 105 to all the other UEs 105 in the group. The exchange of measurements, for example, may indicate an exact or corrected SL PRS configuration used by a UE 105 for transmission of SL PRS (e.g. as discussed for stage 6 of FIG. 5), and may further provide the measurements obtained by the UE 105—e.g. at one of stages 4, 5, 6 or 7.

At stage 9, each UE 105 determines location results, e.g., range and/or direction between the UE 105 and each of one or more other UEs 105 in the group, relative locations of one or more of the UEs 105, absolute locations, velocities, relative velocities, or any combination thereof, based on the measurements generated at stages 4-7 and received at stage 8. In some embodiments, only one UE 105 (e.g. UE 105A) may determine location results.

The location result(s) determined at stage 9 may then be exchanged, at stage 10. Exchanging location results at stage 10 may include each of UEs 105A, 105B, 105C . . . 195Z sending its location results to all the other UEs 105 in the group or just one UE 105 (e.g. UE 105A) sending its location results to the other UEs 105. In the latter case, just the UE 105 which sends its location results to the other UEs 105 may calculate its location results at stage 9.

As illustrated at stage 11, stages 4-10 may be repeated as desired by the UEs 105. For example, stages 4-10 may be repeated at stage 11 to enable periodic or triggered location results for the UEs 105 to be obtained.

Thus, as shown in FIG. 7 when a UE 105, such as UE 105A, belongs to a group of UEs that contains two or more UEs, the UE 105A may send a sidelink positioning message to all other UEs in the group of UEs, e.g., UEs 105B, 105C, . . . 105Z, e.g., based on sidelink multicasting, so that the sidelink positioning message is broadcast or multicast once using SL signaling to all recipients UEs. For example, as discussed in stage 1 of FIG. 7, as well as discussed in stage 1 shown in FIG. 6A, the sidelink positioning message sent by the UE 105A may include sidelink positioning capabilities and sidelink positioning resources of the UE 105A. The sidelink positioning message may further include the sidelink positioning Service Requirement of the UE 105A as discussed in stage 1 of FIG. 7 and FIG. 6A.

Moreover, as further discussed in stage 1 of FIG. 7, the UE 105A may receive a second sidelink positioning message from each of the other UEs in the group of UEs, e.g., UEs 105B, 105C, . . . 105Z, e.g., based on sidelink multicasting. For example, as discussed in stage 1 of FIG. 7, as well as discussed in stage 2 shown in FIG. 6A, the second sidelink positioning message received from each of the other UEs may include sidelink positioning capabilities and sidelink positioning resources of the each UE. The second sidelink positioning message received from each UE may further include the sidelink positioning Service Requirement of the each UE as discussed in stage 1 of FIG. 7 and FIG. 6A.

As illustrated by stages 2-8 of stage 7, the UE 105A may exchange additional sidelink positioning messages with at least some UEs in the group of UEs, e.g., UEs 105B, 105C, . . . 105Z, e.g., based on sidelink multicasting. The additional sidelink positioning messages, for example, may be based on the sidelink positioning capabilities and the sidelink positioning resources of each of the at least some UEs. Each of the additional sidelink positioning messages may be further based on the sidelink positioning Service Requirements of each UE. For example, as discussed in stages 2-8 of FIG. 7, as well as discussed in signal flows 620 and 660 of FIGS. 6B and 6C, the additional sidelink positioning messages exchanged with at least some UEs may include proposed positioning signal configurations, may confirm (or reject or modify) the proposed positioning signal configurations, and/or may request measurements or provide measurements of SL PRS.

As illustrated by stage 9, the UE 105A may determine location results regarding the at least some of the UEs based on the additional sidelink positioning messages.

For group operation of sidelink positioning, such as illustrated in FIG. 7, the group of UEs should be initially determined and optionally formed, e.g., based on one or more criteria. Moreover, modification of the group UEs may be necessary as UEs leave or enter the group area.

Group determination and formation for sidelink positioning may use Proximity-based Services (ProSe) or V2X services, e.g., for discovery and establishment of the group as illustrated in stage 0 of FIGS. 5 and 7. Various criteria may be used for including UEs in the same group. For example, for inclusion within a group, one criteria may be the ability for discovery via ProSe or V2X and the ability to communicate directly (via sidelink signaling) with other UEs in the group. Other criteria may include a maximum distance restriction, e.g., exclude from the group any UEs that are generally more distant from other UEs in the group than a maximum distance threshold; a time restriction, e.g., exclude from the group any UEs that are (or are likely to be) in communication with other UEs in the group for less than a minimum time duration threshold; and a direction or speed restriction, e.g., exclude from the group any UEs that are moving in a different direction than other UEs in the group or are moving at a speed that differs from the speeds of other UEs in the group by more than a maximum speed difference threshold. The criteria, e.g., thresholds to determine whether a UE meets various requirements to join the group, may be dependent on an environment and application. By way of example, the distance, time, and direction or speed criteria used in group formation for V2X highway, V2X local road, or V2X carpark applications may differ. Once a group is established, periodic ProSe or V2X signaling may be used to determine when a UE should leave the group and when new UEs should join the group, e.g., based on whether the group criteria are met. Within a group, the UEs may be assigned member IDs (e.g., 1, 2, 3 etc.) for identification within the group and in SLPP messages. The group member IDs, for example, may be used to determine which UE will lead, coordinate and/or initiate an SLPP positioning session, a position method or a position method type, e.g. which UE will propose PRS configurations to other UEs, such as illustrated at stage 2 of FIGS. 5 and 7. A group may be restricted to one position method type only (e.g., SL NR PRS), while other position method types (e.g., SL LTE PRS or RTK) may be used by a different group. Restricting a group to one position method type may avoid scenarios where not all UEs in a group support the same position method types and may simplify procedures and messaging. Alternatively, to maximize signaling efficiency, the same group of UEs may employ multiple position method types and/or multiple position methods, where not all UEs in the group necessarily support exactly the same position method types or exactly the same position methods.

Figure 8:
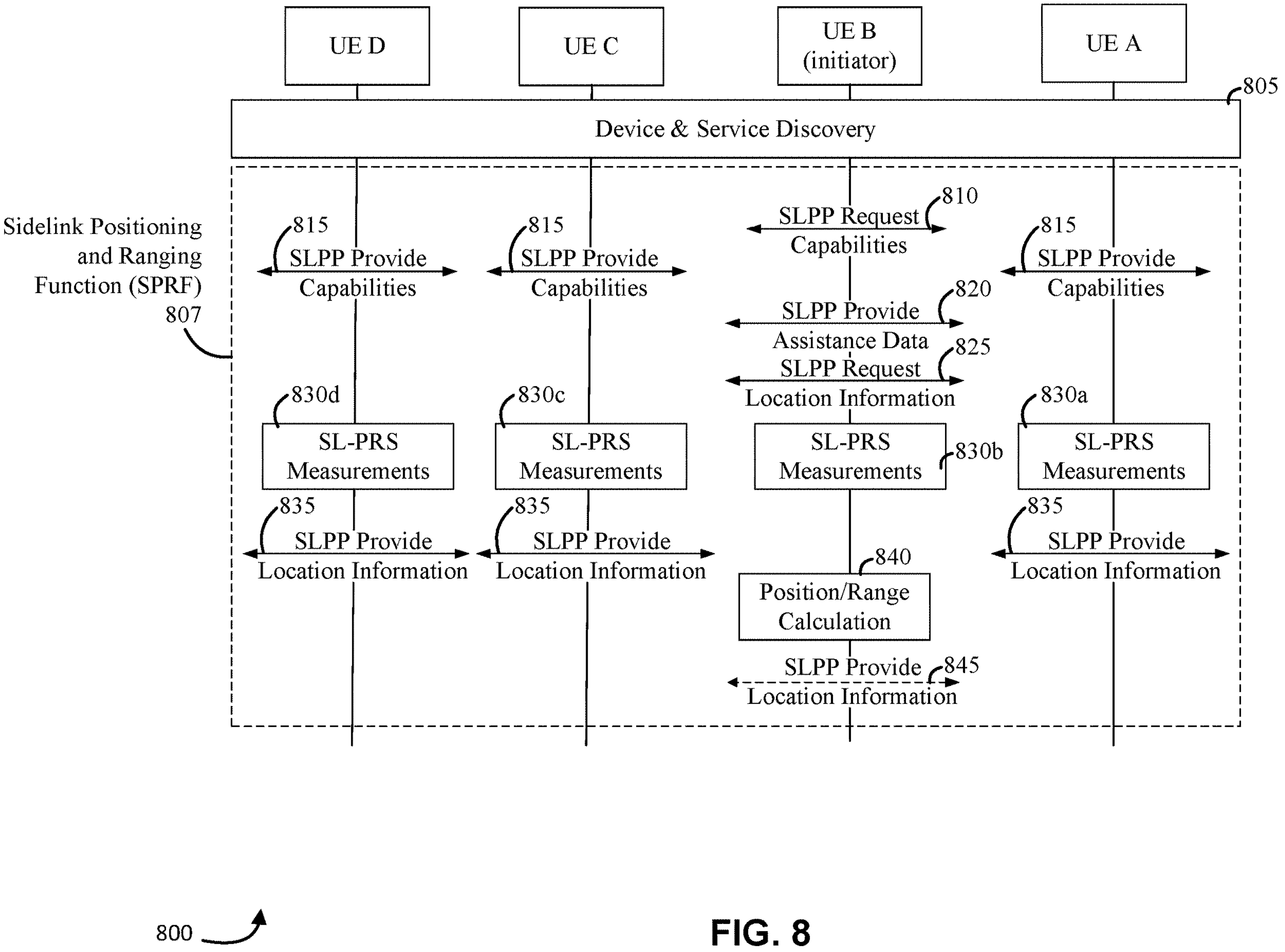
FIGS. 8 and 9 are signal flow diagrams of embodiments of an SLPP positioning session between UEs in a UE-based or "autonomous" mode.

FIG. 8 is a signal flow diagram that shows four UEs (UEs A, B, C, and D) engaged in an SLPP positioning session 800 without support by a location server, such as an LMF. As with other figures provided herein, FIG. 8 is provided as a non-limiting example, and other embodiments may add, omit, and/or rearrange some of the illustrated operations. Here, a device and service discovery process may be conducted, as indicated at block 805, in which UEs may discover each other and/or each UE may determine whether it has network service. In some embodiments, a device and service discovery process (in any of FIGS. 8-12) may be followed by a potential SLPP session establishment (not shown).

After the device and service discovery process, a sidelink positioning and ranging function (SPRF) process 807 may begin in which the initiating UE (UE B in the example of FIG. 8, which may act as a coordinating UE) may broadcast or multicast an SLPP Request Capabilities message, shown by arrow 810, to request the UE positioning capabilities from UEs A, C, and D. As used in the figures herein, double-sided arrows, such as arrow 810) may signify transmissions to a plurality of receiving devices (e.g., from one UE to all other UEs), including broadcast or multicast transmissions. That said, it can be noted that alternative embodiments may similarly transmit messages to each of the plurality of receiving devices using unicast transmissions (e.g., a separate unicast transmission for each receiving device). It is noted that the UE B may be referred to as an "initiating UE", a "coordinating UE", an "anchor UE", a "target UE", or a "server UE".

The addressed UEs may then respond by each multicasting (or possibly broadcasting or unicasting) an SLPP Provide Capabilities message including the UE positioning capabilities, as indicated at arrows 815. The UE positioning capabilities of each UE may include details of the supported SL-PRS configurations and supported SL-PRS measurements of the UE. Taking the received UE capabilities into account, UE B may then (in this example) determine SL-PRS configurations that can be broadcast and measured by all the UEs, and multicast an SLPP Provide Assistance Data message, as indicated with arrow 820, distributing the determined SL-PRS configurations to the participating UEs in this session. This may then be followed by UE B sending an SLPP Request Location Information message, as shown by arrow 825, requesting the specific SL-PRS measurement(s) from UEs A, C, and D. Each of the participating UEs (including the initiating UE B in FIG. 8) may then broadcast SL-PRS in accordance with its own SL-PRS configuration (e.g. at different times than SL-PRS transmitted by other UEs) and perform the requested measurements of SL PRS broadcast by other participating UEs, as indicated at blocks 830. For example, at block 830*a*, UE A may transmit SL-PRS in accordance with its SL-PRS configuration, as well as measure SL-PRS transmitted by UEs B, C, and D, which are transmitted at blocks 830*b*, 830*c*, and 830*d*, respectively. (The other UEs have similar functionality at blocks 830.)

Once the measurements are completed, all UEs (apart from the initiating UE B) may then each multicast (or possibly broadcast or unicast) an SLPP Provide Location Information message, as shown by arrows 835, which the initiating UE B would use to determine ranges and/or positions for the group of UEs, shown at block 840. For example, the position/range calculation at block 840 may include obtaining location results (e.g. relative locations, directions and/or ranges) for the UEs A, B, C and D. In some instances, the initiating UE B may optionally distribute the obtained UE ranges/locations to the other UEs in this group, as shown by dashed arrow 845. (As used herein, dashed arrows may represent optional functionality.) The sending of the final SLPP Provide Location Information message by UE B may be unsolicited by other UEs but may still be allowable according to applicable transaction rules for SLPP.

The procedure in FIG. 8 may be referred to as a centralized UE location or as a "UE-assisted" UE location because one UE (UE B) obtains locations or location information for the other UEs and may then send this to the other UEs.

Figure 9:
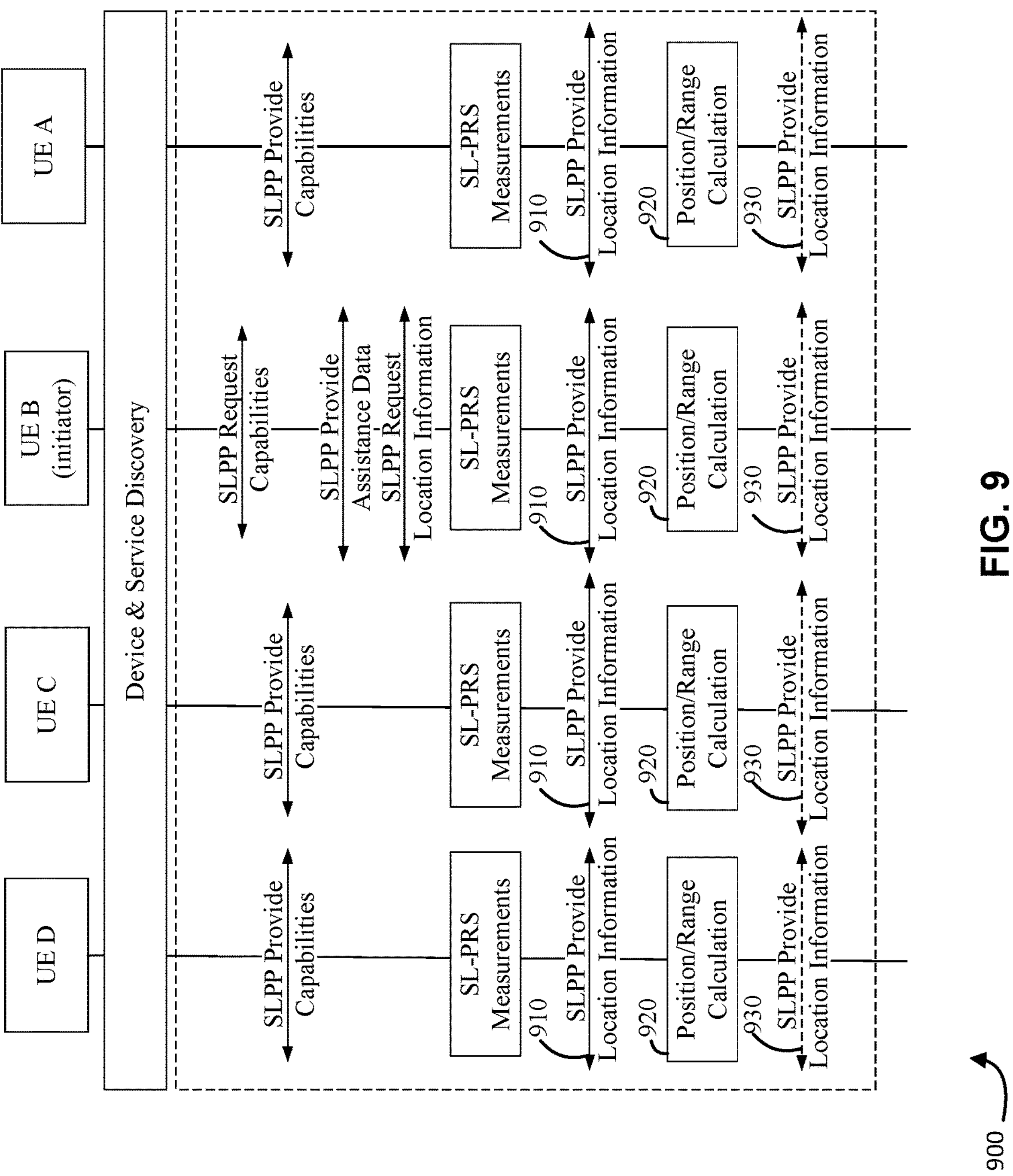

FIG. 9 is a signal flow diagram that shows another example SLPP positioning session 900. Similar to the SLPP positioning session 800 of FIG. 8, UE B is the initiator, and many of the initial operations are the same. In FIG. 9, however, each UE in the group, including initiating UE B, may distribute (e.g., via multicast) its SL-PRS measurements to all other UEs in the group using an SLPP Provide Location Information message, at arrows 910. This can allow each UE in the group to perform the range or position calculation, as indicated at blocks 920. As indicated at arrows 930, each UE then may optionally send the range or position calculation that the UE determined at block 920 to the other UEs in the group.

The procedure in FIG. 9 may be referred to as distributed or decentralized UE location or as "UE-based" UE-location because each UE obtains locations or location information for both itself and for the other UEs and may then send this to the other UEs.

Figure 10:
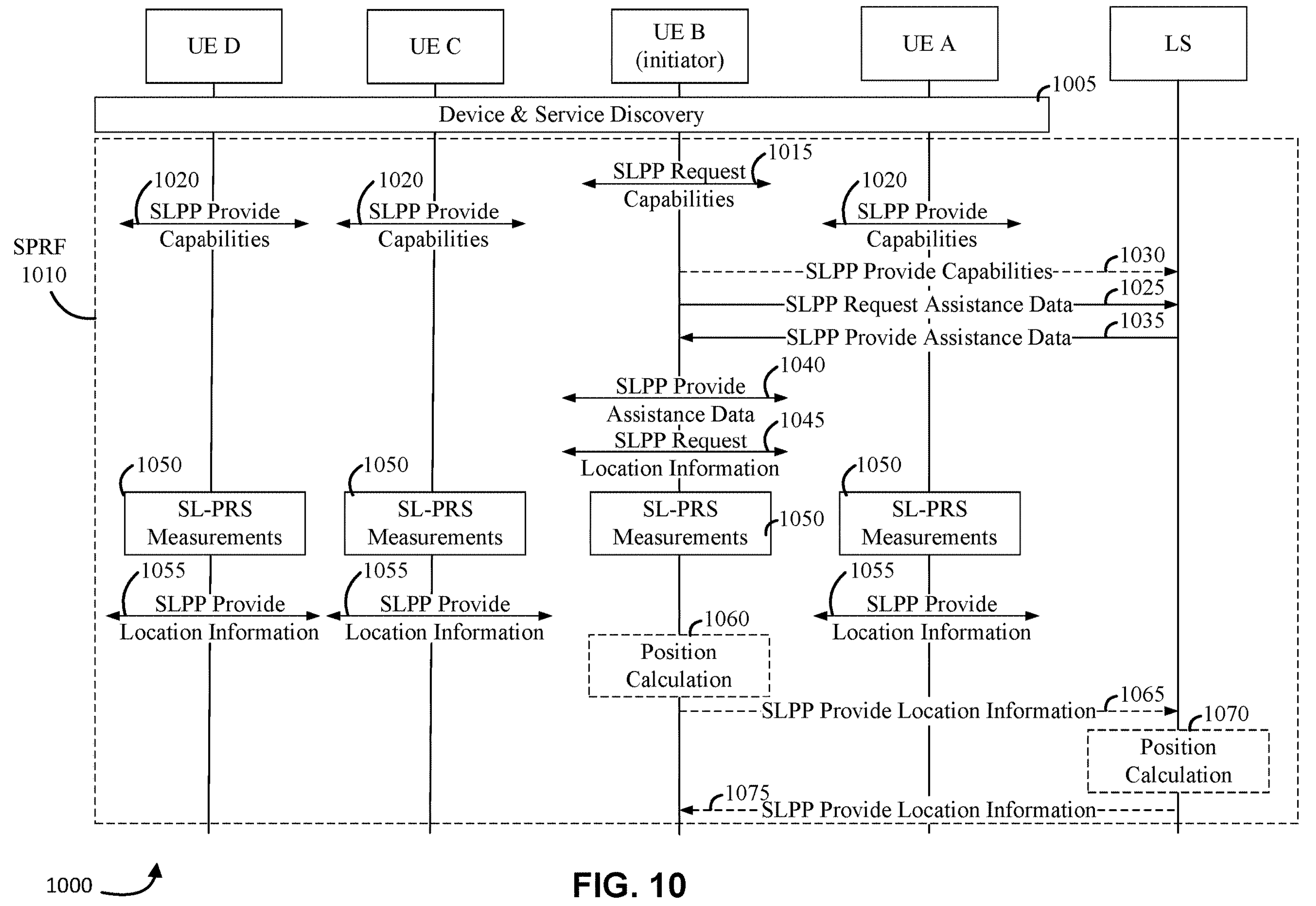
FIGS. 10-12 are signal flow diagrams of a embodiments of an SLPP positioning session in a network assisted mode.
Figure 11:
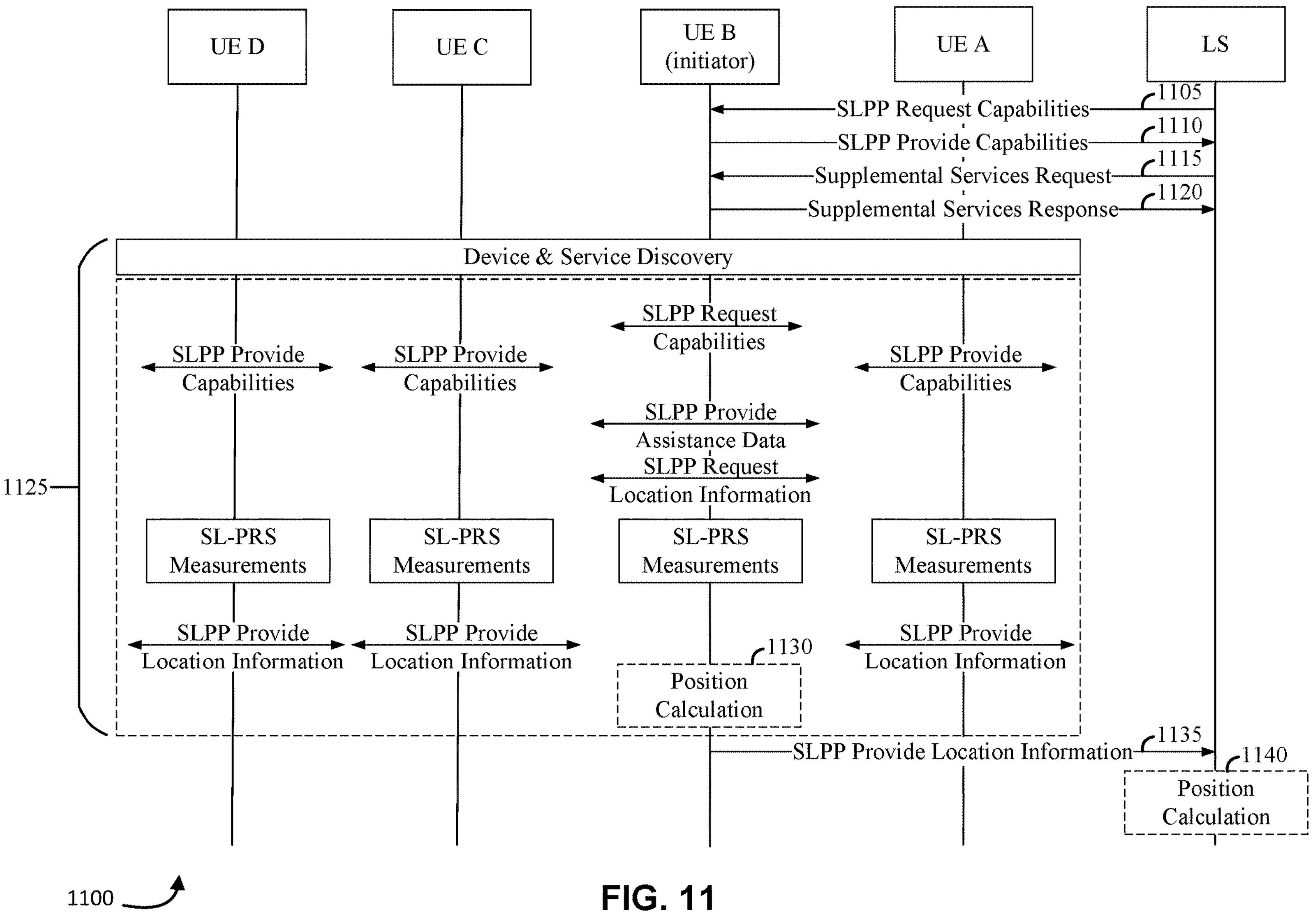
Figure 12:
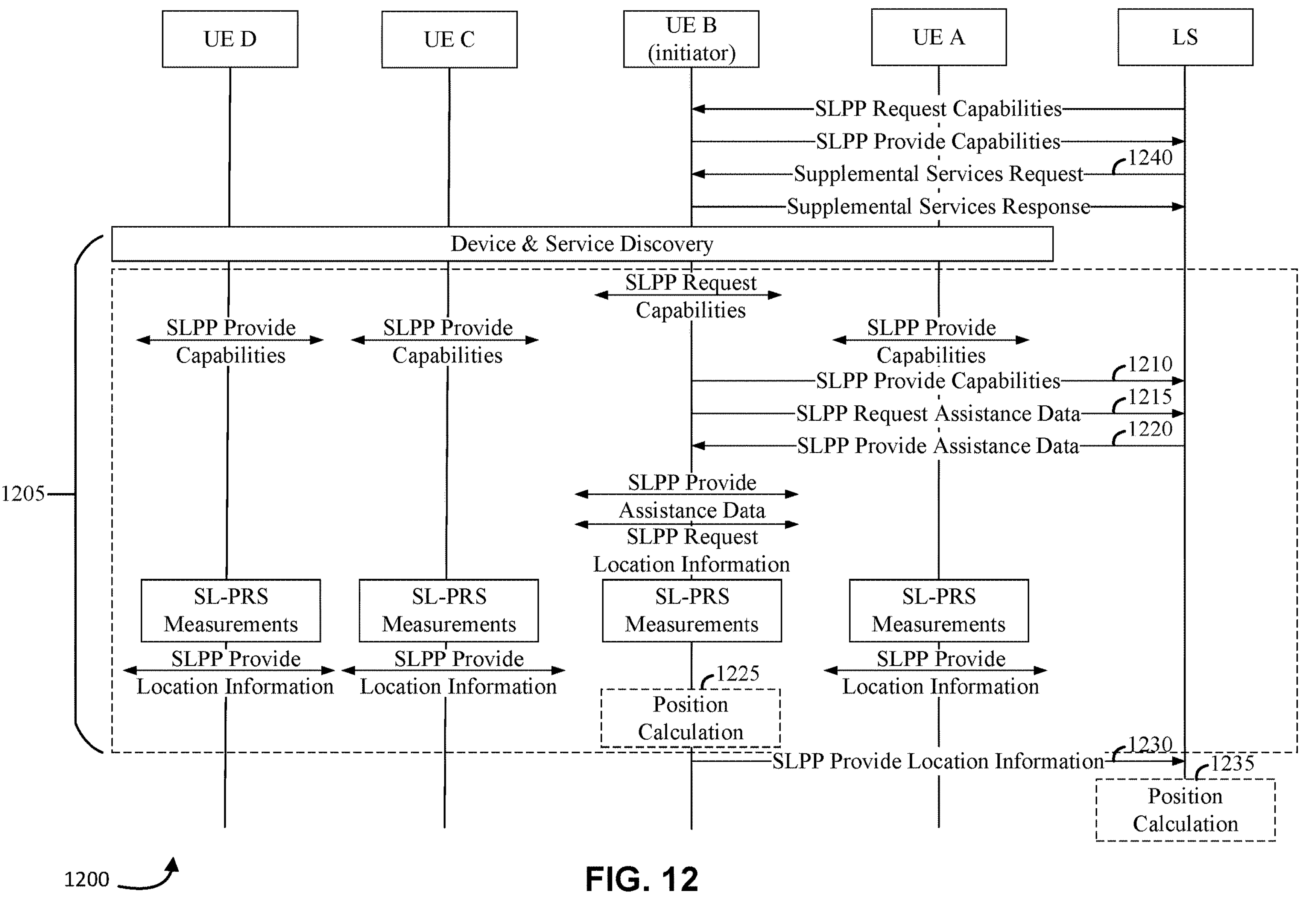

According to some embodiments, two or more UEs may use SLPP with location server support to support ranging and positioning in a network assisted mode. For example, this may be possible when at least one UE is in network coverage and enabled via a subscription to access a PLMN. In this mode, UEs with PLMN access may be assisted to use SLPP by a location server (e.g. an LMF) or may be requested by a location server to employ SLPP to obtain mobile terminal location request (MT-LR) location results. In some instances of this network assisted mode, not all UEs may have PLMN access and be supported by, or provide support to, a location server—e.g. if some UEs are out of coverage. Thus, location server support may be restricted to just some UEs in a group of UEs participating in an SLPP positioning session. FIGS. 10-12, described in more detail hereafter, illustrate methods of how positioning in such a network assisted mode may be performed.

FIG. 10 shows an example SLPP positioning session 1000 where the location server (LS) (e.g., LMF) acts as an adjunct to the initiating UE B to assist the UE B to perform sidelink positioning. Similar to the processes in FIGS. 8 and 9, there may be a device and service discovery process, shown at block 1005, followed by an SPRF 1010. The SPRF 1010 may begin with the initiating UE (UE B) multicasting (or broadcasting) an SLPP Request Capabilities message, shown by arrow 1015, to request the sidelink positioning capabilities from the other participating UEs, which each respond to the initiating UE (UE B) with an SLPP Provide Capabilities message, shown at arrows 1020. The initiating UE B may then request SL-PRS configuration information from an LS via an SLPP Request Assistance Data, indicated by arrow 1025, to which the LS may respond with an SLPP Provide Assistance Data message, shown by arrow 1035, which may have the SL-PRS configurations for all UEs. In some embodiments, to enable the LS to determine suitable SL-PRS configurations for all UEs, UE B may also provide the obtained SL-PRS capabilities of all UEs in the group to the LS in a SLPP Provide Capabilities message, indicated by optional arrow 1030. (As indicated in FIG. 10, this message may precede the SLPP request assistance data message of arrow 1025).

The SLPP positioning session 1000 may then proceed in a manner similar to the SLPP positioning method 800 of FIG. 8, to distribute assistance data, perform SL-PRS measurements, and distribute location information. In particular, UE B may send the SL-PRS configurations received from the LS to the other UEs in the group within SLPP Provide Assistance Data message, shown by arrow 1040, followed by an SLPP Request Location Information message, shown at arrow 1045. The transmitting and measuring of SL-PRS measurements at blocks 1050 and the sending of the measurement result in SLPP Provide Location Information messages at arrows 1055 may be similar to corresponding operations in FIG. 8, previously described. As indicated by the dashed block 1060, UE B may perform the range/position calculation using the measurement results received from the other UEs. Alternatively, UE B may provide the obtained location measurements from all UEs in the group to the LS in an SLPP Provide Location Information message, shown at arrow 1065, for range/position calculation performed at the LS, shown by block 1070. In instances in which the LS performs the range/position calculation, the LS may then provide the computed ranges/positions back to the initiating UE B in an SLPP Provide Location Information message, as shown by arrow 1075. The UE B initiated SLPP transactions towards the LS might be part of a location session between UE B and the LS (e.g. imitated by a mobile originated location request (MO-LR) or a new supplementary services operation).

FIG. 11 shows another example SLPP positioning session 1100 in network-assisted mode. In this example, the LS initiates a sidelink positioning operation with a coordinating UE (UE B) to obtain mobile terminated location request (MT-LR) location results. In this example, the coordinating UE (UE B) is the UE that coordinates obtaining SL-PRS configurations and reporting measurement results for the group of UEs participating in the SLPP positioning session 1100. The LS may request the position of the coordinating UE and/or the position of any UEs (or all UEs) in the group. In some embodiments, the MT-LR that triggers the request from the location server to the coordinating UE may be instigated by an external client or application function (AF) (e.g., external client 130 of FIG. 1) which may provide all necessary information for the MT-LR to the LS (e.g. to the LMF via a GMLC and AMF). The LS may first request the sidelink positioning capabilities of UE B and possibly of other UEs (e.g. UEs A, C, D) from the UE B via SLPP Request Capabilities message, shown by arrow 1105, to which the coordinating UE may respond with an SLPP Provide Capabilities message, as shown by arrow 1110. The LS may then request location results from the UE B using a supplementary services operation request, indicated by arrow 1115. According to some embodiments, the supplementary services operation request may, for example, indicate the type of location results requested (e.g. location of the coordinating UE and/or of one or more of the other UEs), identities and/or addresses of specific other UEs to be involved (e.g. UEs A, C, D) or whether any UEs can be used, whether a single set of location results is requested (immediate location) or whether deferred (e.g. periodic or triggered) location results are requested, or any combination thereof. The supplementary services request may also include an embedded SLPP Request Location Information message indicating specific SLPP location results or measurements to be provided by the coordinating UE and/or an embedded SLPP Provide Assistance Data message to provide assistance data for the SLPP positioning to the coordinating UE (e.g. SL PRS configurations).

According to some embodiments, the reason for using a supplementary services request (at arrow 1115) may be to allow inclusion of information like UE addresses and identities and use of immediate versus deferred location which might not be suitable for inclusion in an SLPP message. However, according to some embodiments, it is possible that an SLPP message (e.g. an SLPP Request Location Information) might be used instead. The target UE may then confirm or acknowledge the supplementary services request with a supplementary services response, shown by arrow 1120—e.g. which may indicate whether any requested UEs are available (e.g. whether UEs A, C, D have been discovered by the target UE B). The coordinating UE then performs SLPP positioning using the operations of process 1125 to obtain measurements and location results without further LS assistance. As can be seen, the operations of the process 1125 reflect those in the SLPP positioning session 800 of FIG. 8, as previously described. Alternatively, the coordinating UE may initiate a process that echoes the operations in SLPP positioning session 900 of FIG. 9, as previously described. At the end of the process 1125, the coordinating UE may optionally perform the position calculation (shown at block 1130), in which case the coordinating UE may then provide the calculation results in an SLPP Provide Location Information message, shown by arrow 1135. Otherwise, the coordinating UE can return the measurements to the LS in the SLPP Provide Location Information message at arrow 1135, in which case the LS may then determine a location (or range and/or bearing) for the coordinating UE and/or other UEs, as indicated at block 1140. In either case, the LS may then provide the location determination to the external client or AF (not shown). For deferred (periodic or triggered) location, the SLPP positioning by the coordinating UE and return of location results to the LS might be repeated.

FIG. 12 shows an SLPP positioning session 1200 similar to FIG. 11. In FIG. 12, however, the LS actively assists with the SLPP positioning of the four UEs as in FIG. 10. That is, the SLPP positioning session 1200 of FIG. 12 may proceed in a manner similar to that of FIG. 11, as previously described. However, in FIG. 12, the process 1205 may comprise operations shown by arrows 1210, 1215, and 1220, which may be similar to operations shown by arrows 1025, 1030, and 1035 of FIG. 10, as described above. The position calculation at block 1225, SLPP provide Location Information at arrow 1230, and/or position calculation at block 1235 may be implemented in a manner similar to corresponding steps of FIG. 11, as previously described.

In some embodiments, the LS may indicate to the coordinating UE whether to use the LS for such active assistance. For example, according to some embodiments, the LS might indicate in the supplementary services request (at arrow 1240) whether no LS assistance is preferred as in FIG. 11 or whether assistance is preferred (or required) as in FIG. 12.

It can be noted that, although the procedures shown in FIGS. 8-12 are described herein as SLPP positioning "sessions," embodiments are not so limited. In alternative embodiments, the procedures illustrated in FIGS. 8-12 may not necessarily be conducted within an SLPP positioning session (e.g., with an established session ID, etc.). In some embodiments, some operations of the procedures (e.g., communications between and initiating/coordinating UE and an LS) may be conducted outside an SLPP positioning session, while other operations may be conducted within an SLPP positioning session (e.g., communications between UEs, such as operations within an SPRF).

Depending on desired functionality, embodiments may utilize SL positioning in conjunction with Uu positioning (e.g., with one or more base stations) to provide hybrid Uu and SL positioning. An example of such a hybrid positioning method is described with regard to FIG. 20, described below.

Figure 13:
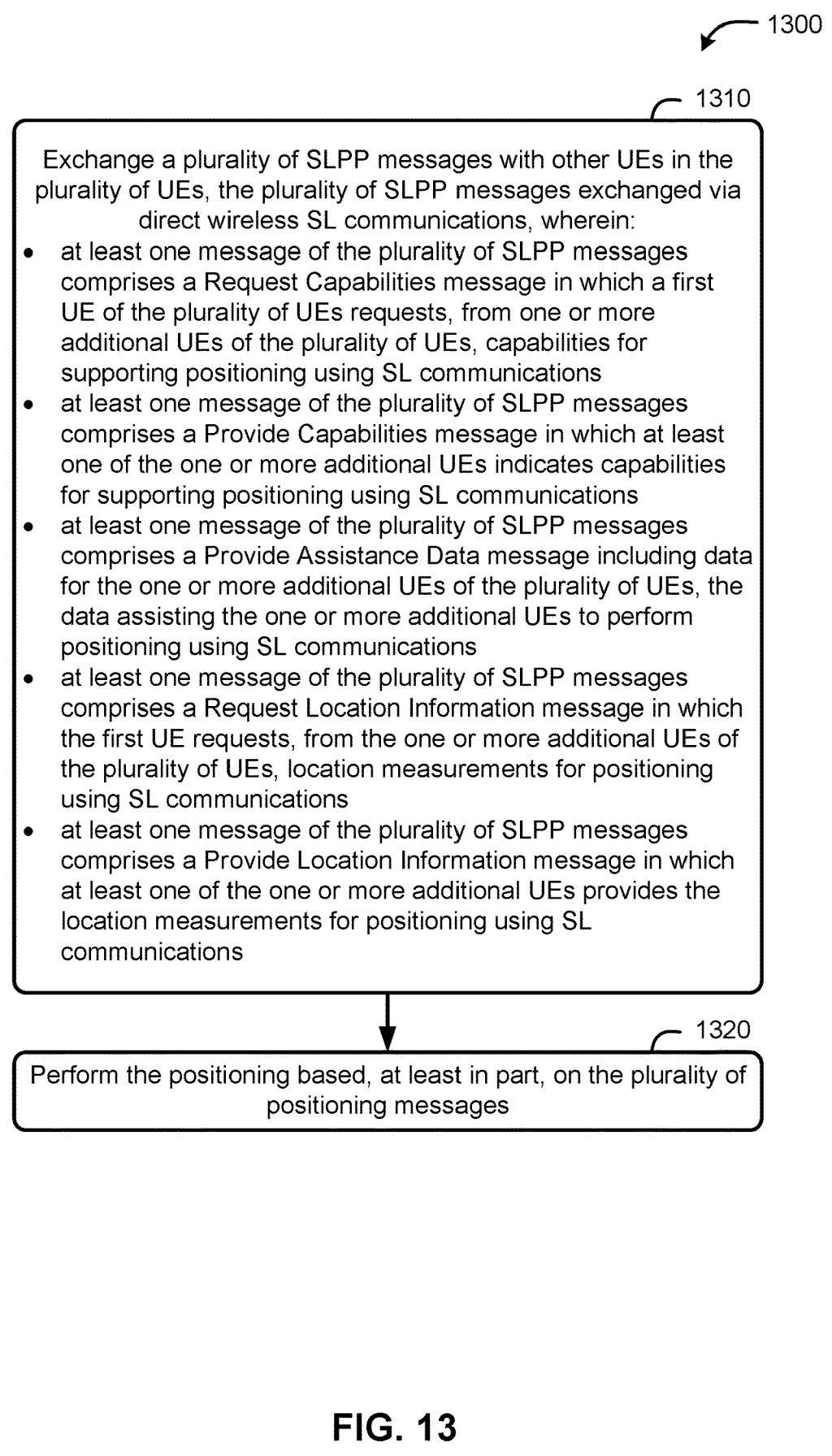

FIG. 13 is a flow diagram of a method 1300 of positioning a plurality of UEs using SL communications, according to an embodiment. The functions illustrated in the blocks of method 1300 may be performed, for example, by a UE in the plurality of UEs. Example software and/or hardware components of a UE that may be used to perform these functions are provided in FIG. 16, which is described hereafter.

At block 1310, the functionality comprises exchanging a plurality of SLPP messages with other UEs in the plurality of UEs, the plurality of SLPP messages exchanged via direct wireless SL communications, wherein: at least one message of the plurality of SLPP messages comprises a Request Capabilities message in which a first UE of the plurality of UEs requests, from one or more additional UEs of the plurality of UEs, capabilities for supporting positioning using SL communications, at least one message of the plurality of SLPP messages comprises a Provide Capabilities message in which at least one of the one or more additional UEs indicates capabilities for supporting positioning using SL communications, at least one message of the plurality of SLPP messages comprises a Provide Assistance Data message including data for the one or more additional UEs of the plurality of UEs, the data assisting the one or more additional UEs to perform positioning using SL communications, at least one message of the plurality of SLPP messages comprises a Request Location Information message in which the first UE requests, from the one or more additional UEs of the plurality of UEs, location measurements for positioning using SL communications, and at least one message of the plurality of SLPP messages comprises a Provide Location Information message in which at least one of the one or more additional UEs provides the location measurements for positioning using SL communications. Examples of how the plurality of SLPP messages may be exchanged—including a Request Capabilities message, a Provide Capabilities message, a Provide Assistance Data message, a Request Location Information message, and/or a Provide Location Information message—are described above with respect to FIGS. 8-12.

According to some embodiments, the exchanging of the plurality of SLPP messages and the performing of the positioning occur within an SLPP positioning session, and/or may be part of a positioning procedure or transaction separate from an SLPP positioning session. In some embodiments of the method 1300, the first UE may send the Provide Assistance Data message to the one or more additional UEs of the plurality of UEs. In such embodiments, the content of the Provide Assistance Data may be based, at least in part, on configuration information received by the first UE from a server. The configuration information received by the first UE from the server may be based, at least in part, on capability information provided by the first UE to the server, the capability information based, at least in part, on the Provide Capabilities message. According to some embodiments, prior to the exchange of the plurality of SLPP messages with the other UEs in the plurality of UEs, the first UE may exchange a plurality of preliminary SLPP messages with the server, wherein the exchange of the plurality of SLPP messages with the other UEs in the plurality of UEs is based on the exchange of the plurality of preliminary SLPP messages. In such embodiments, the plurality of preliminary SLPP messages may comprise a Request Capabilities message from the server. Additionally or alternatively, the plurality of preliminary SLPP messages pay comprise a Request Location Information message from the server. In such embodiments, the location request may be included in a Supplementary Services Request message.

Figure 16:
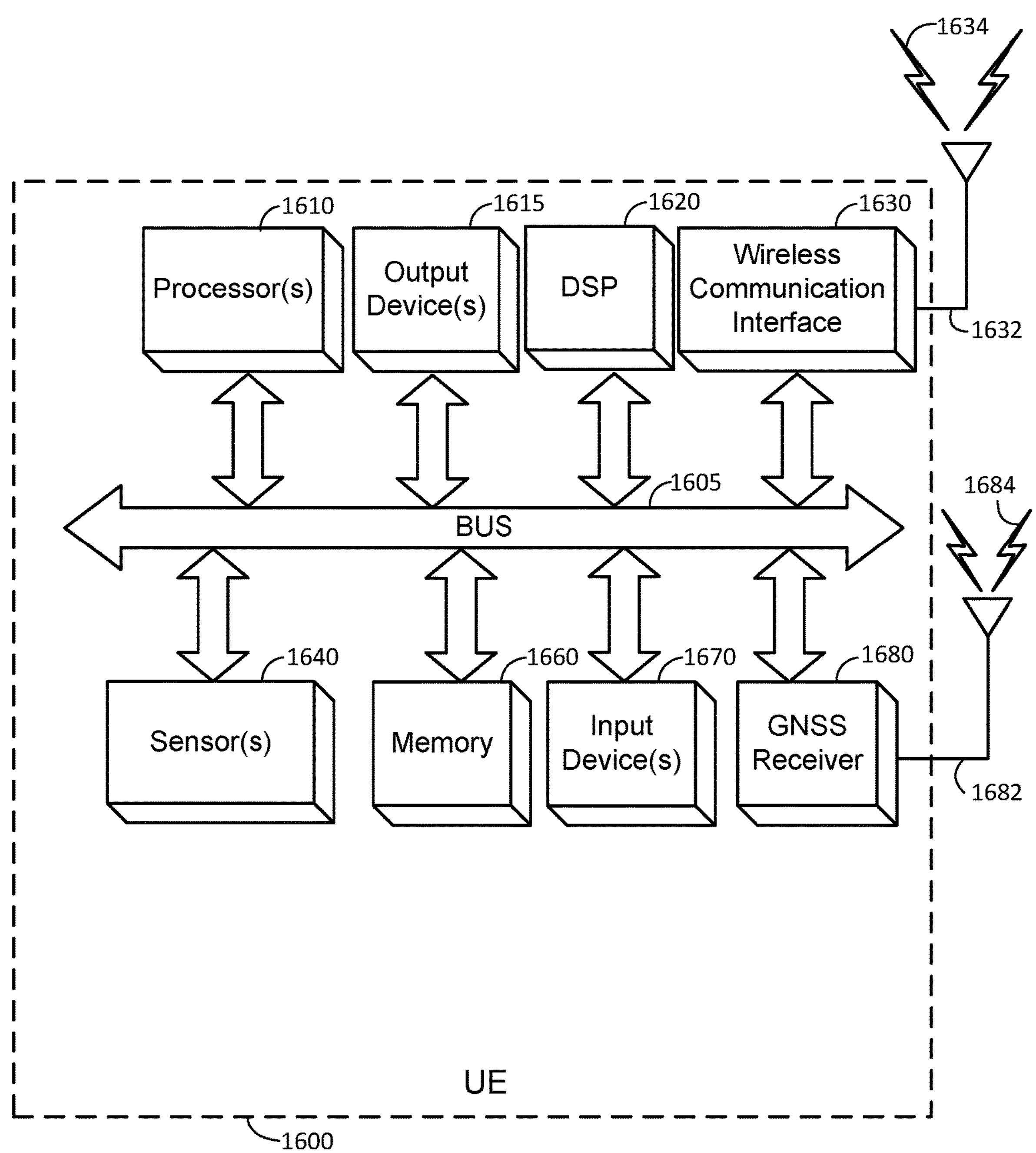
FIG. 16 is a block diagram of an embodiment of a UE.

Means for performing functionality at block 1310 may comprise a bus 1605, processor(s) 1610, digital signal processor (DSP) 1620, wireless communication interface 1630 (e.g., transceiver), memory 1660, and/or other components of a UE 1600, as illustrated in FIG. 16, which is described hereafter.

The functionality at block 1320 comprises performing the positioning based, at least in part, on the plurality of positioning messages. As previously described herein with respect to FIGS. 8-12, an initiating or coordinating UE may perform one or more position calculations based on measurements taken during a positioning session. As explained with regard to these figures, these measurements may be coordinated by and provided to such an initiating or coordinating UE by other UEs using the various messages described in block 1310.

Means for performing functionality at block 1320 may comprise a bus 1605, processor(s) 1610, DSP 1620, wireless communication interface 1630 (e.g., transceiver), memory 1660, and/or other components of a UE 1600, as illustrated in FIG. 16, which is described hereafter.

As indicated in the embodiments described above, one or more of the following features may be included, based on desired functionality. According to some embodiments, the direct wireless SL communications use user plane signaling or control plane signaling. According to some embodiments, the method 1300 may include, prior to exchanging the plurality of SLPP messages, engaging in a discovery process (e.g., as illustrated in FIGS. 8-12) to determine one or more of the other UEs to participate in the positioning. According to some embodiments of the method 1300, the plurality of SLPP messages may comprise a unicast message sent to one UE in the plurality of UEs, a multicast message sent by one UE in the plurality of UEs to all other UEs in the plurality of UEs, a broadcast message sent to UEs in the plurality of UEs and to UEs not in the plurality of UEs, or any combination thereof. Additionally or alternatively, the UE (e.g., performing the method 1300) may comprise the first UE or a UE in the one or more additional UEs.

Figure 14:
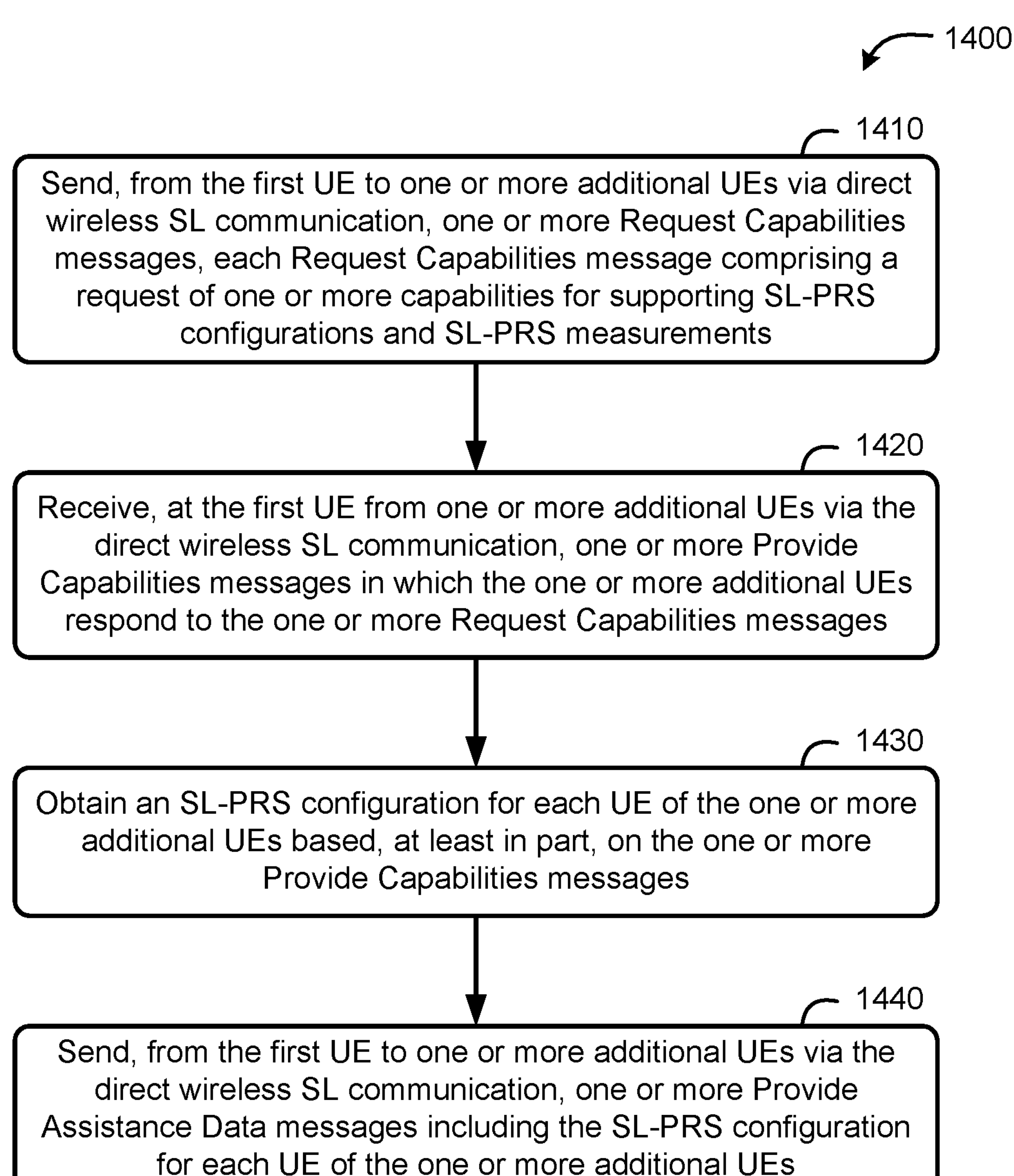
FIG. 14 is a flow diagram of a method of positioning using SL communications at a first UE, according to an embodiment.

FIG. 14 is a flow diagram of a method 1400 of positioning using SL communications at a first UE, according to an embodiment. Here, the first UE may comprise an initiating or coordinating UE, as described in embodiments herein. The functions illustrated in the blocks of method 1400 may be performed by software and/or hardware components of a UE, such as those illustrated in FIG. 16, which is described hereafter. Any direct wireless SL communications used to perform one or more of the functions of the method 1400 may use user plane signaling and/or control plane signaling. Further, one or more of the functions of the method 1400 may be performed in an SLPP positioning session.

At block 1410, the functionality comprises sending, from the first UE to one or more additional UEs via direct wireless SL communication, one or more Request Capabilities messages, each Request Capabilities message comprising a request of one or more capabilities for supporting SL-PRS configurations and SL-PRS measurements. As previously described with respect to FIG. 8-12 the Request Capabilities message(s) may be sent after a device and service discovery and/or after the initiation of an SLPP positioning session. As such, some embodiments of the method 1400 may comprise, prior to sending the one or more Request Capabilities messages, performing a discovery process by the first UE to identify the one or more additional UEs. As noted, the Request Capabilities message may be communicated via unicast to each of the one or more additional UEs or, where the one or more additional UEs comprise a plurality of additional UEs, multicast (or broadcast) to the plurality of additional UEs.

Means for performing functionality at block 1410 may comprise a bus 1605, processor(s) 1610, DSP 1620, wireless communication interface 1630 (e.g., transceiver), memory 1660, and/or other components of a UE 1600, as illustrated in FIG. 16, which is described hereafter.

At block 1420, the functionality comprises receiving, at the first UE from one or more additional UEs via the direct wireless SL communication, one or more Provide Capabilities messages in which the one or more additional UEs respond to the one or more Request Capabilities messages. Again, this capabilities exchange may be part of an SLPP positioning session, such as those illustrated in FIGS. 8-12, as previously described.

Means for performing functionality at block 1420 may comprise a bus 1605, processor(s) 1610, DSP 1620, wireless communication interface 1630 (e.g., transceiver), memory 1660, and/or other components of a UE 1600, as illustrated in FIG. 16, which is described hereafter.

At block 1430, the functionality comprises obtaining an SL-PRS configuration for each UE of the one or more additional UEs based, at least in part, on the one or more Provide Capabilities messages. As previously noted in the embodiments described herein, obtaining the SL-PRS configuration for each UE of the one or more additional UEs may comprise either (i) determining the SL-PRS configuration for each UE of the one or more additional UEs with the first UE, or (ii) sending the data from the one or more Provide Capabilities messages from the first UE to a location server (e.g. an LMF) and receiving, at the first UE from the location server, the SL-PRS configuration for each UE of the one or more additional UEs.

Means for performing functionality at block 1430 may comprise a bus 1605, processor(s) 1610, DSP 1620, wireless communication interface 1630 (e.g., transceiver), memory 1660, and/or other components of a UE 1600, as illustrated in FIG. 16, which is described hereafter.

At block 1440, the functionality comprises sending, from the first UE to one or more additional UEs via the direct wireless SL communication, one or more Provide Assistance Data messages including the SL-PRS configuration for each UE of the one or more additional UEs. As described elsewhere herein, according to some embodiments of the method 1400, prior to the sending the one or more Request Capabilities messages, the method may comprise exchanging a plurality of preliminary messages between the first UE and a location server (e.g. LMF), wherein sending the one or more Request Capabilities messages is responsive to the exchanging of the plurality of preliminary messages. In such embodiments, the exchanging the plurality of preliminary messages may comprise receiving, by the first UE from the location server, a Request Capabilities message. Additionally or alternatively, the exchanging the plurality of preliminary messages may comprise receiving, by the first UE from the location server, a location request. In such embodiments, the location request may be included in a Supplementary Services Request message.

Means for performing functionality at block 1440 may comprise a bus 1605, processor(s) 1610, DSP 1620, wireless communication interface 1630 (e.g., transceiver), memory 1660, and/or other components of a UE 1600, as illustrated in FIG. 16, which is described hereafter.

Some embodiments of the method 1400 may further comprise one or more additional features, as described in other embodiments detailed herein. For example, some embodiments of the method 1400 may further comprise sending, from the first UE to one or more additional UEs via the direct wireless SL communication, one or more Request Location Information messages, each Request Location Information message comprising a request for positioning measurement data, and receiving, at the first UE from one or more additional UEs via the direct wireless SL communication, one or more Provide Location Information messages in which the one or more additional UEs provide the positioning measurement data. In such embodiments, the method 1400 may further comprise performing, with the first UE, SL-PRS measurements in accordance with the SL-PRS configurations for each UE of the one or more additional UEs. Additionally or alternatively, the method 1400 may further comprise performing a position calculation and obtaining location results (e.g. relative locations, directions and/or ranges) for the first UE and the one or more additional UEs based at least in part on the positioning measurement data of the one or more Provide Location Information messages. In such embodiments, the method 1400 may further comprise sending, from the first UE to one or more additional UEs via the direct wireless SL communication, one or more additional Provide Location Information messages comprising the location results. Additionally or alternatively, the obtaining the position calculation may comprise either (i) determining the position calculation with the first UE, or (ii) sending the positioning measurement data from the first UE to a location server (e.g. LMF) and receiving the position calculation location results at the first UE from the location server. In some embodiments, the method 1400 may further comprise sending, from the first UE to a location server (e.g. LMF), a Provide Location Information message comprising either (i) the positioning measurement data, or (ii) a position calculation location results determined by the first UE.

Additional or alternative features may be included in the method 1400. For example, according to some embodiments, the sending the one or more Request Capabilities messages, the receiving the one or more Provide Capabilities messages, the obtaining the SL-PRS configuration for each UE of the one or more additional UEs, and the sending the one or more Provide Assistance Data messages occur within an S LPP positioning session. Additionally or alternatively, the one or more additional UEs comprise a plurality of UEs. In such embodiments, the one or more Request Capabilities messages, the one or more Provide Capabilities messages, or the one or more Provide Assistance Data messages, or any combination thereof, comprise multicast or broadcast messages.

Figure 15:
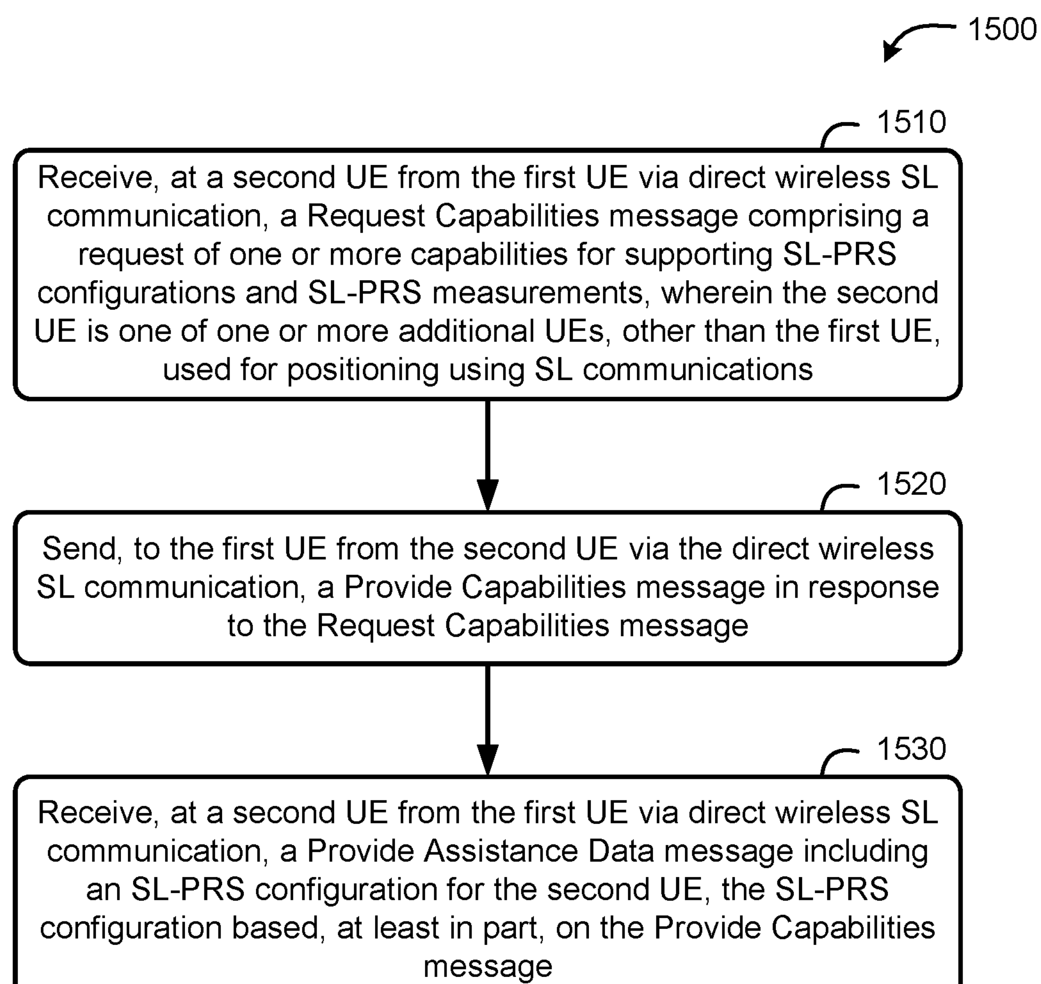
FIG. 15 is a flow diagram of a method of enabling a first UE to coordinate positioning using SL communications, according to an embodiment.

FIG. 15 is a flow diagram of a method 1500 of enabling a first UE to coordinate positioning using SL communications, according to an embodiment. Some or all of the functionality illustrated in method 1500 may be performed by a second UE (e.g., UEs A, C, and/or D in FIGS. 8-12) in communication with a first UE (e.g., an initiating or coordinating UE, such as UE B in FIGS. 8-12). The functions illustrated in the blocks of method 1500 may be performed by software and/or hardware components of a UE, such as those illustrated in FIG. 16, which is described hereafter. Again, any direct wireless SL communications used to perform one or more of the functions of the method 1500 may use user plane signaling and/or control plane signaling. Further, one or more of the functions of the method 1500 may be performed in an SLPP positioning session.

At block 1510, the functionality comprises receiving, at the second UE from the first UE via direct wireless SL communication, a Request Capabilities message comprising a request of one or more capabilities for supporting SL-PRS configurations and SL-PRS measurements, wherein the second UE is one of one or more additional UEs, other than the first UE, used for positioning using SL communications. Means for performing functionality at block 1510 may comprise a bus 1605, processor(s) 1610, DSP 1620, wireless communication interface 1630 (e.g., transceiver), memory 1660, and/or other components of a UE 1600, as illustrated in FIG. 16, which is described hereafter.

At block 1520, the functionality comprises sending, to the first UE from the second UE via the direct wireless SL communication, a Provide Capabilities message in response to the Request Capabilities message. As noted in the embodiments described previously, the Provide Capabilities message may include capabilities with respect to supporting SL positioning, transmitting and/or measuring SL-PRS, or the like. Means for performing functionality at block 1520 may comprise a bus 1605, processor(s) 1610, DSP 1620, wireless communication interface 1630 (e.g., transceiver), memory 1660, and/or other components of a UE 1600, as illustrated in FIG. 16, which is described hereafter.

At block 1530, the functionality comprises receiving, at the second UE from the first UE via direct wireless SL communication, a Provide Assistance Data message including an SL-PRS configuration for the second UE, the SL-PRS configuration based, at least in part, on the Provide Capabilities message. Means for performing functionality at block 1530 may comprise a bus 1605, processor(s) 1610, DSP 1620, wireless communication interface 1630 (e.g., transceiver), memory 1660, and/or other components of a UE 1600, as illustrated in FIG. 16, which is described hereafter.

Embodiments of the method 1500 may include one or more additional functions, depending on desired functionality. For example, some embodiments of the method 1500 may comprise receiving, at the second UE from the first UE via direct wireless SL communication, a Request Location Information message; performing one or more measurements of SL-PRS, in accordance with the SL-PRS configuration for the second UE; and sending, to the first UE from the second UE via the direct wireless SL communication, a Provide Location Information message, wherein content of the Provide Location Information message is based on the one or more measurements. In such embodiments, the Provide Location Information message may comprise a multicast message or a broadcast message. Additionally or alternatively, the method 1500 may comprise performing a position calculation based on the one or more measurements and obtaining location results (e.g. relative locations, directions and/or ranges) for the first UE, the second UE and/or others of the one or more additional UEs, wherein the Provide Location Information message comprises the location results. The Provide Location Information message may comprise data indicative of the one or more measurements.

FIG. 16 is a block diagram of an embodiment of a UE 1600, which can be utilized as described herein above (e.g., in association with the previously-described figures, with respect to a UE, mobile device, etc.). It should be noted that FIG. 16 is meant only to provide a generalized illustration of various components, any or all of which may be utilized as appropriate. Furthermore, the functionality of the UE discussed herein may be executed by one or more of the hardware and/or software components illustrated in FIG. 16.

The UE 1600 is shown comprising hardware elements that can be electrically coupled via a bus 1605 (or may otherwise be in communication, as appropriate). The hardware elements may include a processor(s) 1610 which can include without limitation one or more general-purpose processors (e.g., an application processor), one or more special-purpose processors (such as DSP chips, graphics acceleration processors, application specific integrated circuits (ASICs), and/or the like), and/or other processing structures or means. Processor(s) 1610 may comprise one or more processing units, which may be housed in a single integrated circuit (IC) or multiple ICs. As shown in FIG. 16, some embodiments may have a separate DSP 1620, depending on desired functionality. Location determination and/or other determinations based on wireless communication may be provided in the processor(s) 1610 and/or wireless communication interface 1630 (discussed below). The UE 1600 also can include one or more input devices 1670, which can include without limitation one or more keyboards, touch screens, touch pads, microphones, buttons, dials, switches, and/or the like; and one or more output devices 1615, which can include without limitation one or more displays (e.g., touch screens), light emitting diodes (LEDs), speakers, and/or the like.

The UE 1600 may also include a wireless communication interface 1630, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 1600 to communicate with other devices as described in the embodiments above. The wireless communication interface 1630 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1632 that send and/or receive wireless signals 1634. According to some embodiments, the wireless communication antenna(s) 1632 may comprise a plurality of discrete antennas, antenna arrays, or any combination thereof. The antenna(s) 1632 may be capable of transmitting and receiving wireless signals using beams (e.g., Tx beams and Rx beams). Beam formation may be performed using digital and/or analog beam formation techniques, with respective digital and/or analog circuitry. The wireless communication interface 1630 may include such circuitry.

Depending on desired functionality, the wireless communication interface 1630 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 1600 may communicate with different data networks that may comprise various network types. For example, one such network type may comprise a wireless wide area network (WWAN), which may be a code-division multiple access (CDMA) network, a time division multiple access (TDMA) network, a frequency division multiple access (FDMA) network, an orthogonal frequency division multiple access (OFDMA) network, a single-carrier frequency division multiple access (SC-FDMA) network, a WiMAX (IEEE 802.16) network, and so on. A CDMA network may implement one or more radio access technologies (RATs) such as CDMA2000®, wideband code division multiple access (WCDMA), and so on. CDMA2000® includes IS-95, IS-2000 and/or IS-856 standards. A TDMA network may implement global system for mobile communications (GSM), digital advanced mobile phone system (D-AMPS), or some other RAT. An OFDMA network may employ long-term evolution (LTE), LTE Advanced, fifth-generation (5G) new radio (NR), and so on. 5G NR, LTE, LTE Advanced, GSM, and WCDMA are described in documents from 3rd Generation Partnership Project (3GPP). CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 1600 can further include sensor(s) 1640. Sensor(s) 1640 may comprise, without limitation, one or more inertial sensors and/or other sensors (e.g., accelerometer(s), gyro scope(s), camera(s), magnetometer(s), altimeter(s), microphone(s), proximity sensor(s), light sensor(s), barometer(s), and the like), some of which may be used to obtain position-related measurements and/or other information.

Embodiments of the UE 1600 may also include a Global Navigation Satellite System (GNSS) receiver 1680 capable of receiving signals 1684 from one or more GNSS satellites using an antenna 1682 (which could be the same as antenna 1632). Positioning based on GNSS signal measurement can be utilized to complement and/or incorporate the techniques described herein. The GNSS receiver 1680 can extract a position of the UE 1600, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1680 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1680 is illustrated in FIG. 16 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1610, DSP 1620, and/or a processor within the wireless communication interface 1630 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 1610 or DSP 1620.

The UE 1600 may further include and/or be in communication with a memory 1660. The memory 1660 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like.

Such storage devices may be configured to implement any appropriate data stores, including without limitation, various file systems, database structures, and/or the like.

The memory 1660 of the UE 1600 also can comprise software elements (not shown in FIG. 16), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1660 that are executable by the UE 1600 (and/or processor(s) 1610 or DSP 1620 within UE 1600). In some embodiments, then, such code and/or instructions can be used to configure and/or adapt a general-purpose computer (or other device) to perform one or more operations in accordance with the described methods.

Figure 17:
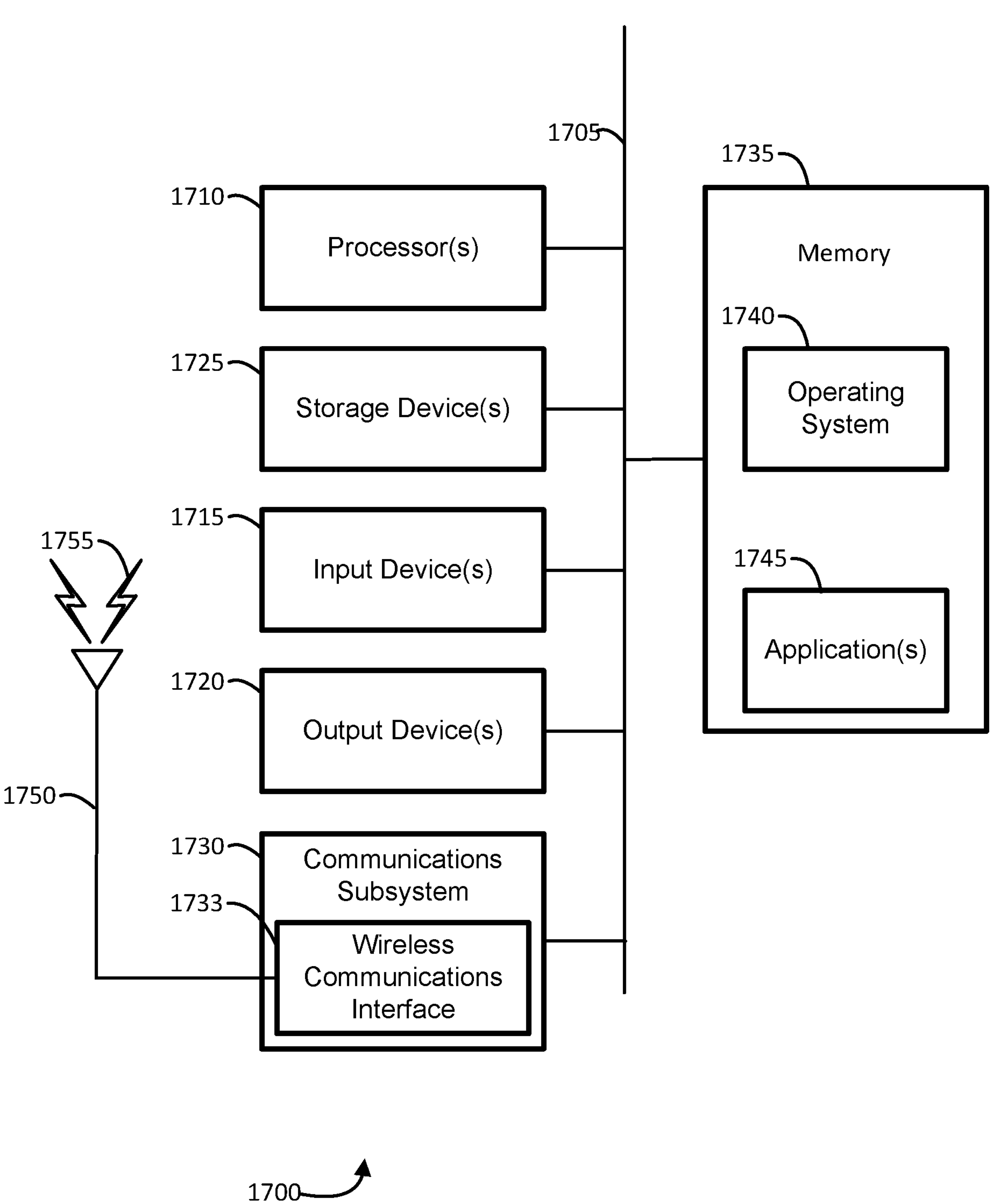
FIG. 17 is a block diagram of an embodiment of a computer system.

FIG. 17 is a block diagram of an embodiment of a computer system 1700, which may be used, in whole or in part, to provide the functions of one or more components and/or devices as described in the embodiments herein (including a location server, such as an LMF). This may include, for example, a computer server, personal computer, personal electronic device, or the like. It should be noted that FIG. 17 is meant only to provide a generalized illustration of various components, any or all of which may be utilized as appropriate. FIG. 17, therefore, broadly illustrates how individual system elements may be implemented in a relatively separated or relatively more integrated manner. In addition, it can be noted that components illustrated by FIG. 17 can be localized to a single device and/or distributed among various networked devices, which may be disposed at different geographical locations.

The computer system 1700 is shown comprising hardware elements that can be electrically coupled via a bus 1705 (or may otherwise be in communication, as appropriate). The hardware elements may include processor(s) 1710, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1700 also may comprise one or more input devices 1715, which may comprise without limitation a mouse, a keyboard, a camera, a microphone, and/or the like; and one or more output devices 1720, which may comprise without limitation a display device, a printer, and/or the like.

The computer system 1700 may further include (and/or be in communication with) one or more non-transitory storage devices 1725, which can comprise, without limitation, local and/or network accessible storage, and/or may comprise, without limitation, a disk drive, a drive array, an optical storage device, a solid-state storage device, such as a random-access memory (RAM) and/or read-only memory (ROM), which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1700 may also include a communications subsystem 1730, which may comprise wireless communication technologies managed and controlled by a wireless communication interface 1733, as well as wired technologies (such as Ethernet, coaxial communications, universal serial bus (USB), and the like). The wireless communication interface 1733 may comprise one or more wireless transceivers that may send and receive wireless signals 1755 (e.g., signals according to 5G NR or LTE) via wireless antenna(s) 1750. Thus the communications subsystem 1730 may comprise a modem, a network card (wireless or wired), an infrared communication device, a wireless communication device, and/or a chipset, and/or the like, which may enable the computer system 1700 to communicate on any or all of the communication networks described herein to any device on the respective network, including a User Equipment (UE), base stations and/or other transmission reception points (TRPs), and/or any other electronic devices described herein. Hence, the communications subsystem 1730 may be used to receive and send data as described in the embodiments herein.

In many embodiments, the computer system 1700 will further comprise a working memory 1735, which may comprise a RAM or ROM device, as described above. Software elements, shown as being located within the working memory 1735, may comprise an operating system 1740, device drivers, executable libraries, and/or other code, such as one or more applications 1745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1725 described above. In some cases, the storage medium might be incorporated within a computer system, such as computer system 1700. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1700 and/or might take the form of source and/or installable code, which, upon compilation and/or installation on the computer system 1700 (e.g., using any of a variety of generally available compilers, installation programs, compression/decompression utilities, etc.), then takes the form of executable code.

One limitation of sidelink (PC5) user plane with broadcast and groupcast is that Automatic Repeat Request (ARQ) procedures may not be supported at the Radio Link Control (RLC) level which may lead to the loss of SLPP messages—e.g. when the distance between a sending UE and receiving UE increases above some threshold (e.g. 1 kilometer) or if some obstacle (e.g. a building, vehicle, trees or hill) between a sending UE and receiving UE obstructs the transmission. This may also occur with either PC5 user plane signaling (PC5-U) or PC5 control plane signaling (PC5-S) if RLC is not used in Acknowledged Mode (with ARQ) or if ARQ is used but is unable to successfully resend a lost RLC level packet. Such possible loss of messages at a transport level is not unprecedented as loss of LPP messages is also possible with Uu operation when an LPP message is not successfully forwarded by an MME or AMF and consequently LPP itself contains an acknowledgment and retransmission capability. According to some embodiments, such an acknowledgment and retransmission capability could be supported by SLPP (for either PC5-U or PC5-S SLPP message transport) and used, for example, when a small number of UEs are communicating. In this case, if the original SLPP messages are sent using broadcast or groupcast, the SLPP acknowledgments and possibly the retransmissions might be sent using unicast and possible with ARQ support at an RLC level for higher reliability. An example of such acknowledgment and retransmission capability for SLPP messages is provided in FIG. 18.

Figure 18:
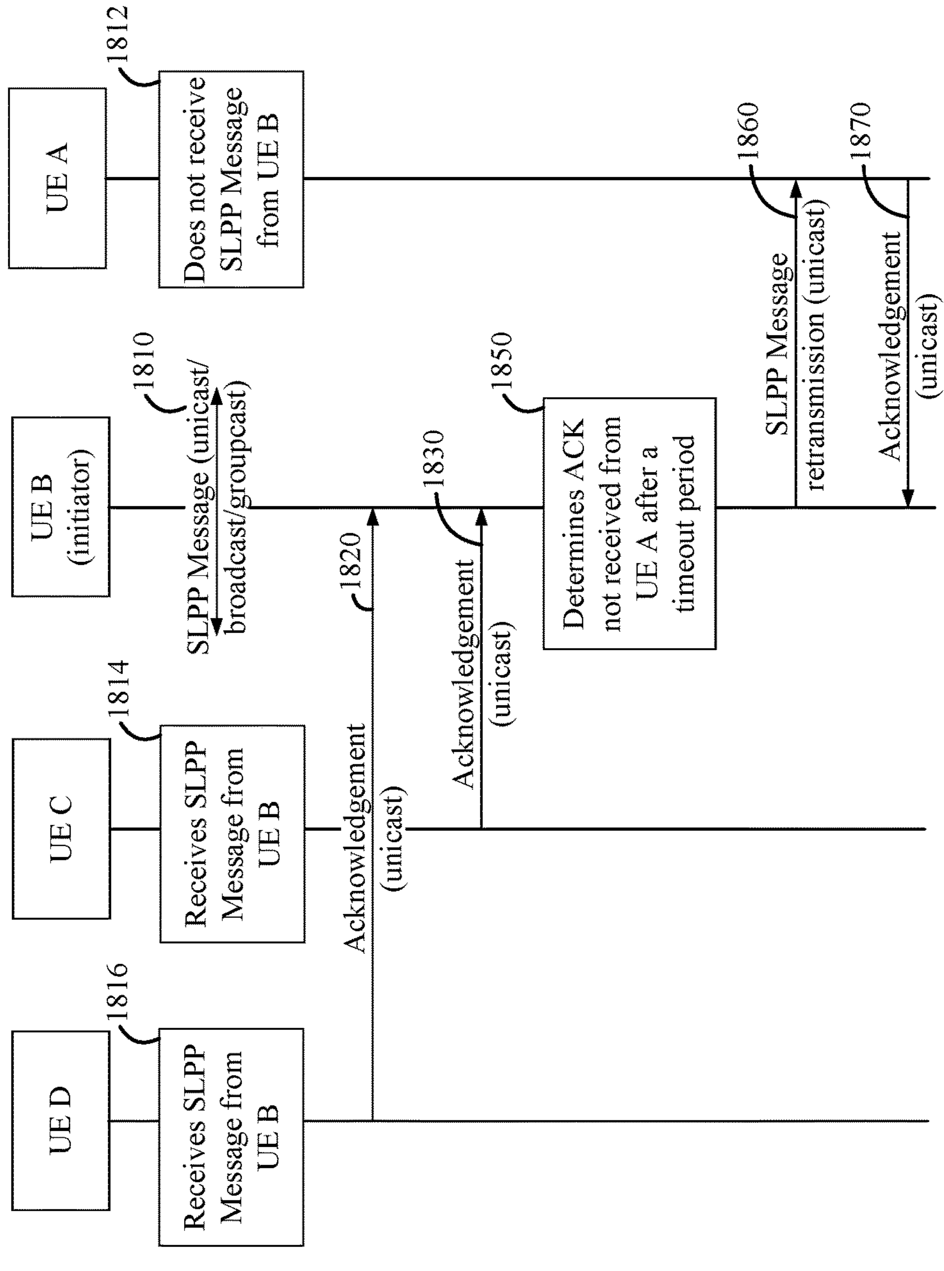
FIG. 18 is a signal flow diagram of an example of an acknowledgment and retransmission capability for SLPP messages, which may be utilized according to some embodiments.

FIG. 18 is a signal flow diagram 1800 that shows an example of an acknowledgment and retransmission capability for SLPP messages which may be utilized according to some embodiments. In FIG. 18 there are four UEs (UEs A, B, C, and D) in a scenario, similar to FIGS. 8 and 9, in which UE B is an initiator UE that transmits messages to UEs A, C, and D. As with other figures, however, FIG. 18 is provided as a non-limiting example. Other scenarios may have a larger or smaller number of UEs, and may implement variations to the process illustrated in FIG. 18.

The process may begin with the operation shown at arrow 1810, where UE B transmits an SLPP message using unicast, broadcast or groupcast (also referred to as multicast). In case unicast is used, UE B would transmit the SLPP message separately to UEs A, C and D, so there would be three separate transmissions of the SLPP message. In case broadcast or groupcast is used, UE B would transmit the SLPP message once only to UEs A, C and D, so there would be only one transmission of the SLPP message. In this example, the SLPP message may comprise any SLPP message (e.g., as described herein) sent from UE B to a plurality of other UEs to enable SLPP positioning. UE B may be aware of the UEs for which the SLPP message is intended (UEs A, C, and D), and may therefore know the UEs from which it can expect an acknowledgment. As illustrated at block 1812, however, UE A does not receive the SLPP message sent by UE B. UEs C and D, on the other hand, receive the SLPP message, as shown by blocks 1814 and 1816, respectively. As a result, both UE D and UE C may provide an acknowledgment to UE B, as illustrated at arrows 1820 and 1830, respectively. According to some embodiments, the acknowledgment may be sent using unicast messaging and possibly with error correction (e.g. using Automatic Repeat Request (ARQ) at a Radio Link Control (RLC) protocol level), which can help ensure UE B receives the acknowledgment (e.g., in view of retransmission procedures for unicast messaging).

The remaining operations in the flow diagram 1800 illustrate how retransmission may occur, according to some embodiments. At block 1850, UE B determines (e.g., after a timeout period) that it has not received an acknowledgment (ACK) from UE A. Based on this, UE B can retransmit the SLPP message sent at arrow 1810. Although, in some embodiments, UE B may retransmit using broadcast or groupcast (e.g., if multiple UEs failed to provide an acknowledgment), unicast retransmission, and possibly with error correction (e.g. using ARQ at an RLC protocol level), can help ensure the SLPP message is received by UE A. Thus, as illustrated, UE B performs a retransmission of the SLPP message, as shown at arrow 1860, and UE A provides an acknowledgment of receiving the SLPP message, as indicated at arrow 1870. More broadly, in scenarios where one or more UEs fail to provide an acknowledgment for an SLPP message by a sender, the sender may send either a unicast retransmission of the SLPP message to each of the one or more UEs or a broadcast or groupcast retransmission of the SLPP message to all of the one or more UEs.

For a large group of UEs such as with V2X, acknowledgement and retransmission may not be so efficient. For these cases, SLPP procedures can be designed with redundancy and (e.g., optionally) tolerance to transport failure. With redundancy, a UE can send an SLPP request or information message containing SLPP information to a group of UEs with each UE in the group of UEs then responding—e.g. to acknowledge receipt of the information or acknowledge having performed or being able to later perform some requested operation (e.g. such transmitting and/or measuring sidelink reference signals). If each response also carries the original information from the SLPP request message and is returned using groupcast or broadcast, then any UE that did not receive the SLPP request message but receives at least one response message will be able to infer and reconstruct the original SLPP request and thereby overcome the original SLPP message loss.

Figure 19:
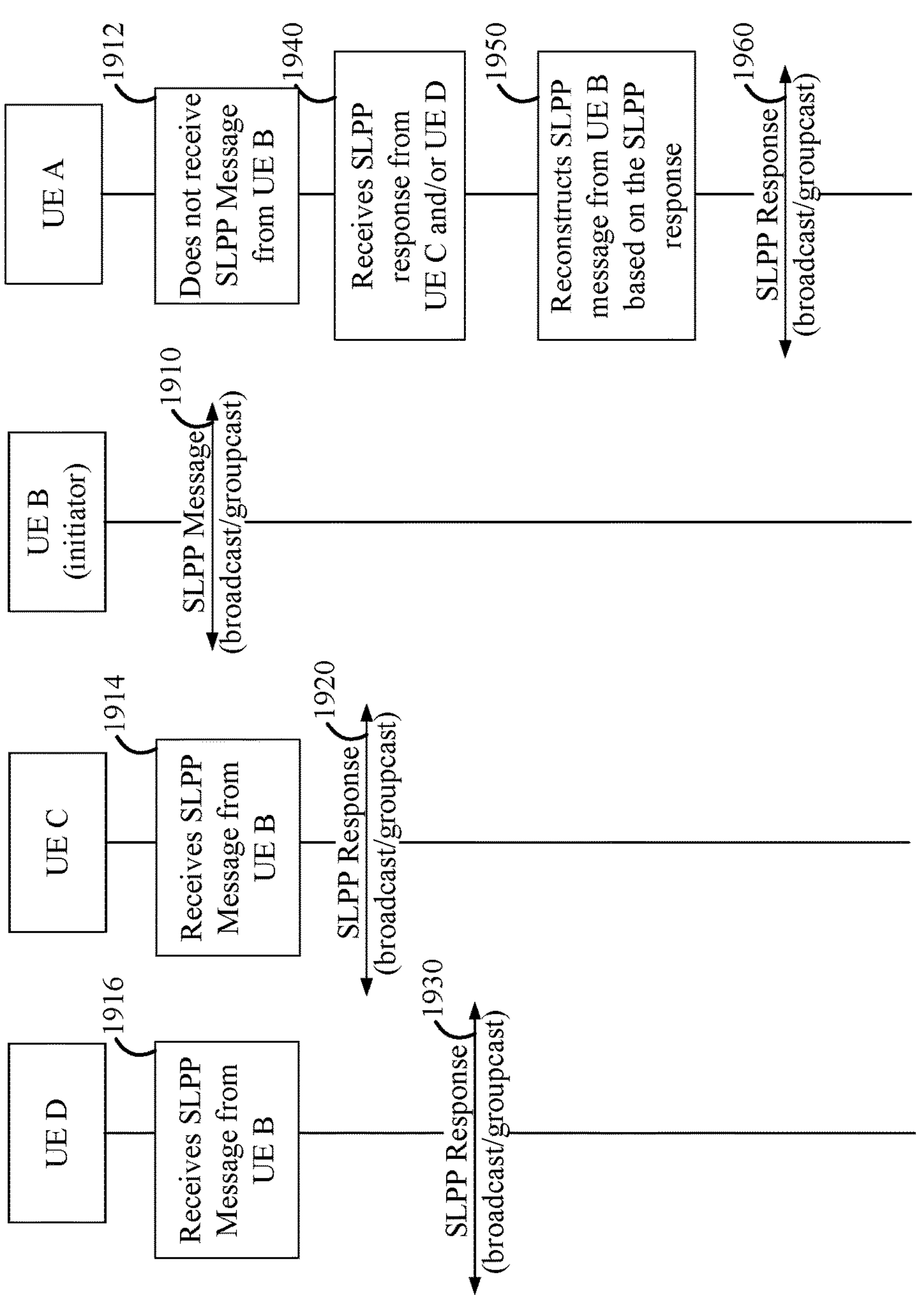
FIG. 19 is a signal flow diagram of example SLPP procedures that may include redundancy for SLPP messages, which may be utilized according to some embodiments.

FIG. 19 is a signal flow diagram 1900 that shows an example of how SLPP procedures may include redundancy for SLPP messages, which may be utilized according to some embodiments. The scenario in FIG. 19 again uses the (nonlimiting) scenario having four UEs (UEs A, B, C, and D) in which UE B is an initiator UE that transmits messages to UEs A, C, and D. Other scenarios may have a larger or smaller number of UEs, and may implement variations to the process illustrated in FIG. 19.

The process may begin in a manner similar to the example of FIG. 18, where UE B transmits an SLPP message using broadcast or groupcast, as shown at arrow 1910. Again, UE A does not receive the SLPP message from UE B, as indicated at block 1912, but UEs C and D both receive the SLPP message, as indicated at blocks 1914 and 1916. In contrast with FIG. 18, however, both the UE C and UE D provide a SLPP response (e.g., an acknowledgment or other message) using broadcast or groupcast. Each SLPP response can include information that is redundant with (i.e. included within) the SLPP message (e.g., information for transmitting and/or measuring sidelink reference signals) that can enable UE A to reconstruct the SLPP message sent by UE B. Thus, as further shown in FIG. 19, UE A receives the SLPP response from UE C and/or UE D, as indicated at block 1940, and further reconstructs the SLPP message from UE B based on the SLPP response, as indicated at block 1950. With the reconstructed SLPP message, UE A can then send an SLPP response via broadcast/groupcast (similar to UEs C and D), as indicated at arrow 1960.

As previously noted, some embodiments may utilize such redundancy together with tolerance to transport failure. With regard to tolerance to transport failure, the sender of an SLPP request message to a group of UEs (e.g. using unicast, broadcast or groupcast and either PC5-U or PC5-S) can expect that not all of the UEs may receive the request message (or successfully return a response) and thus when an SLPP response message is not received from all the UEs, the sender can take appropriate actions such as resending the SLPP request message at a later time or not expecting the UEs from which a response was not received to take any requested actions. The support of acknowledgment with retransmission, redundancy and/or tolerance to transport failure may add some signaling and procedural overhead that would not be needed if all signaling was based on reliable unicast (e.g. using ARQ). However, the greater efficiency and lower latency (e.g., for V2X) otherwise may more than compensate for this. It is also noted that if preferred (e.g. for a pair of UEs), sidelink/PC5 user plane (PC5-U) can still be used in unicast mode with the extra ARQ supported transport reliability.

Figure 20:
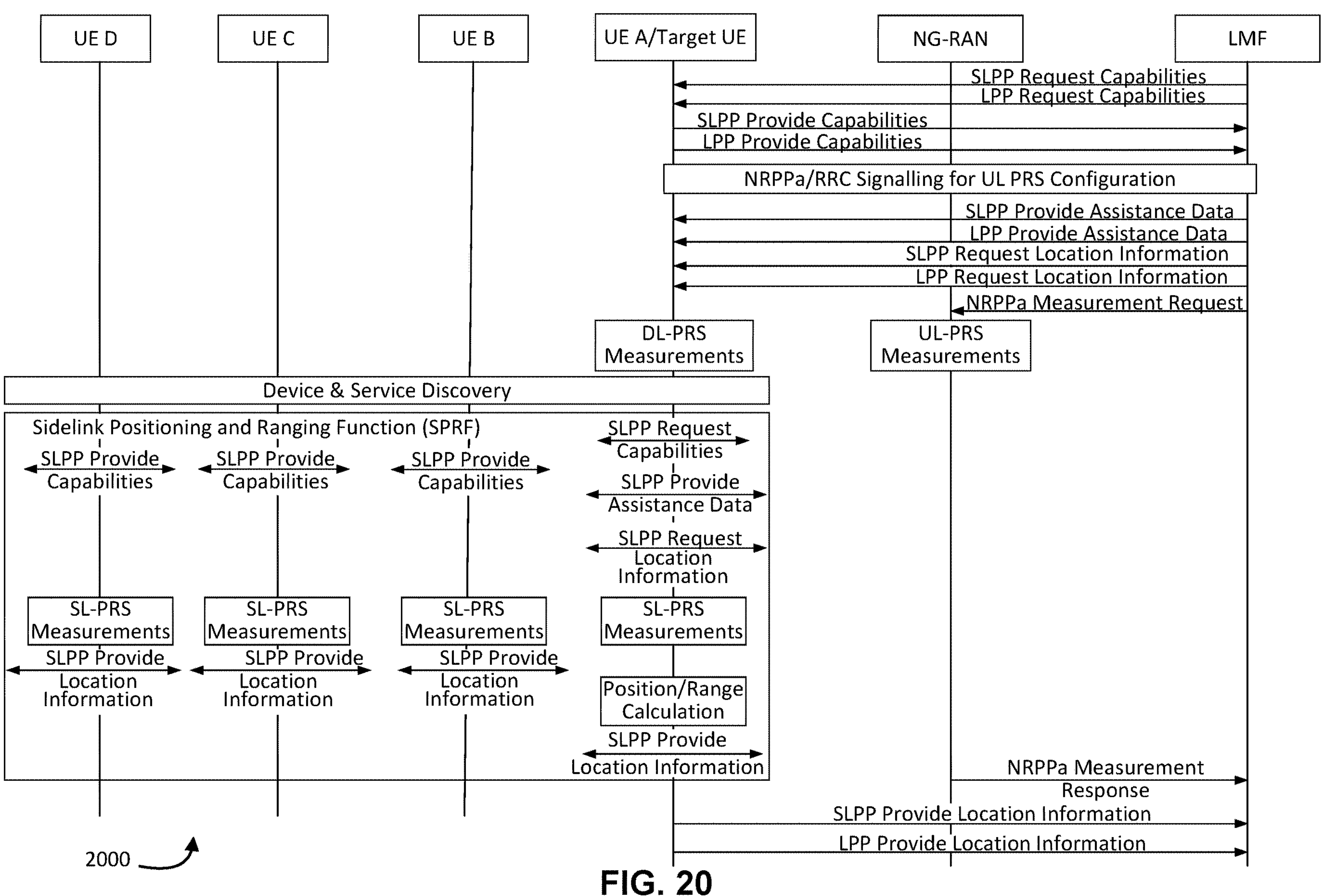
FIG. 20 is a signal flow diagram of an example hybrid positioning method that utilizes SL positioning in conjunction with Uu positioning to provide hybrid (or "joint") Uu and SL positioning of a group of UEs, according to some embodiments.

FIG. 20 is a signal flow diagram 2000 that shows an example hybrid positioning method that utilizes SL positioning in conjunction with Uu positioning (e.g., with one or more base stations) to provide hybrid (or "joint") Uu and SL positioning of a group of UEs (UEs A, B, C, D in this example). The basic SLPP transaction types (capability transfer, assistance data transfer, location information transfer) suitable for supporting in-coverage, partial coverage, and out-of-coverage sidelink positioning and ranging scenarios may also be applied to support joint sidelink-Uu positioning. This could simply be achieved by jointly performing the SLPP, LPP, and NRPPa procedures for the desired positioning methods as shown in FIG. 20. For Uu positioning, LPP and/or NRPPa are used for UE positioning operations (e.g., for Multi-RTT) for UE A, though Uu positioning using LPP and/or NRPPa could also or instead be used for any of UE B, UE C and UE D if the LS in FIG. 20 is able to access each of these UEs. For SL positioning, UE A in FIG. 20 is the UE with which the LS in FIG. 20 interacts, e.g. similarly to interaction between the LS and UE B described for FIGS. 10-12. For joint Uu and SL positioning, any combination of LPP, SLPP, and NRPPa may be used, dependent on the desired positioning method(s) (UL, DL, SL positioning).

In some implementations, it may be useful for a first UE to inform another UE, a group of UEs or a location server (e.g. an LMF) of some transient or semi-permanent status or condition of the first UE to enable positioning procedures (e.g. using SLPP and/or LPP) to be supported more accurately, more reliably, more efficiently, more securely or with some other benefit in performance or outcome. Examples of a transient or semi-permanent status or condition for a UE may include any of the following:

(a) use by the UE of another relay UE to send signaling (e.g. SLPP or LPP messages and/or other messages) to another entity such as another UE, a network or an LMF (e.g. where the relay UE forwards signaling from the UE to the other entity and forwards signaling from the other entity to the UE);

(b) use by the UE of a satellite (or satellite access) to send signaling (e.g. SLPP or LPP messages and/or other messages) to another entity such as another UE, a network or an LMF;

(c) use by the UE of a WiFi access point to send signaling (e.g. SLPP or LPP messages and/or other messages) to another entity such as another UE, a network, or an LMF;

(d) a high level of interference at the UE or some other radio condition that may impede signaling, location measurements, and/or transmission of reference signals; and (e) no access to a network by a UE (e.g. the UE is out of network coverage or has no subscription to access a network).

One or more status items or conditions may be indicated using a bit string in some embodiments where a bit is set to (e.g.) a binary one to indicate that a particular status or condition is present and is set to (e.g.) a binary zero to indicate that a particular status or condition is absent. An indication of one or more status items or conditions (e.g. a bit string) may then be included in an SLPP or LPP message transmitted by the UE such as an SLPP or LPP Provide capabilities message, an SLPP or LPP Request Assistance Data message and/or an SLPP or LPP Request Location Information message. For example, any of the SLPP messages and LPP messages described herein for FIGS. 8-12 may include additional status items or conditions (e.g. represented by a bit string) indicating a particular transient or semi-permanent status or condition of the sending UE for that SLPP or LPP message. The UE may first include the additional status items or conditions in an LPP message or SLPP message transmitted to some recipient entity or entities if any of the status items or conditions is present when the UE sends the LPP message or SLPP message or if any of status items or conditions has changed since last sending an LPP or SLPP message to the recipient entity or entities that contained status items or conditions. The recipient entity or entities may take appropriate actions based on the received status items or conditions. For example, if a status item or condition indicates that a UE is using a satellite or WiFi AP to send signaling to another entity, the other entity may invoke position methods that are suitable for such signaling (e.g. such as GPS or GNSS for satellite access or WiFi positioning for WiFi access). If a status item or condition indicates that a UE is using a relay UE to send signaling to another entity, the other entity may not invoke positioning methods that rely on the UE having direct access to a network or to the other entity.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of positioning a plurality of user equipments (UEs) using sidelink (SL) communications, the method performed by a UE in the plurality of UEs, the method comprising: exchanging a plurality of SL positioning protocol (SLPP) messages with other UEs in the plurality of UEs, the plurality of SLPP messages exchanged via direct wireless SL communications, wherein: at least one message of the plurality of SLPP messages comprises a Request Capabilities message in which a first UE of the plurality of UEs requests, from one or more additional UEs of the plurality of UEs, capabilities for supporting positioning using SL communications; at least one message of the plurality of SLPP messages comprises a Provide Capabilities message in which at least one of the one or more additional UEs indicates capabilities for supporting positioning using SL communications; at least one message of the plurality of SLPP messages comprises a Provide Assistance Data message including data for the one or more additional UEs of the plurality of UEs, the data assisting the one or more additional UEs to perform positioning using SL communications; at least one message of the plurality of SLPP messages comprises a Request Location Information message in which the first UE requests, from the one or more additional UEs of the plurality of UEs, location measurements for positioning using SL communications; and at least one message of the plurality of SLPP messages comprises a Provide Location Information message in which at least one of the one or more additional UEs provides the location measurements for positioning using SL communications; and performing the positioning based, at least in part, on the plurality of positioning messages.

Clause 2. The method of clause 1, wherein the direct wireless SL communications uses user plane signaling or control plane signaling.

Clause 3. The method of any one of clauses 1-2 further comprising, prior to exchanging the plurality of SLPP messages, engaging in a discovery process to determine one or more of the other UEs to participate in the positioning.

Clause 4. The method of any one of clauses 1-3 wherein the exchanging of the plurality of SLPP messages and the performing of the positioning occur within an SLPP positioning session.

Clause 5. The method of any one of clauses 1-4 wherein the Provide Assistance Data message is sent from the first UE to the one or more additional UEs of the plurality of UEs.

Clause 6. The method of clause 5 wherein content of the Provide Assistance Data is based, at least in part, on configuration information received by the first UE from a server.

Clause 7. The method of clause 6 wherein the configuration information received by the first UE from the server is based, at least in part, on capability information provided by the first UE to the server, the capability information based, at least in part, on the Provide Capabilities message.

Clause 8. The method of any one of clauses 5-7 wherein, prior to the exchange of the plurality of SLPP messages with the other UEs in the plurality of UEs, a plurality of preliminary SLPP messages is exchanged between the first UE and the server, wherein the exchange of the plurality of SLPP messages with the other UEs in the plurality of UEs is based on the exchange of the plurality of preliminary SLPP messages.

Clause 9. The method of clause 8 wherein the plurality of preliminary SLPP messages comprises a Request Capabilities message from the server.

Clause 10. The method of any one of clauses 8-9 wherein the plurality of preliminary SLPP messages comprises a Request Location Information message from the server.

Clause 11. The method of clause 10 wherein the Request Location Information message is included in a Supplementary Services Request message.

Clause 12. The method of any one of clauses 1-11 wherein the plurality of SLPP messages comprises: a unicast message sent to one UE in the plurality of UEs, a multicast message sent by one UE in the plurality of UEs to all other UEs in the plurality of UEs, a broadcast message sent to UEs in the plurality of UEs and to UEs not in the plurality of UEs, or any combination thereof.

Clause 13. The method of any one of clauses 1-12 wherein the UE comprises the first UE.

Clause 14. The method of any one of clauses 1-12 wherein the UE comprises a UE in the one or more additional UEs.

Clause 15. The method of any one of clauses 1-12, wherein at least one message of the plurality of SLPP messages comprises an SLPP message sent from the first UE to two or more additional UEs of the plurality of UEs using unicast, groupcast or broadcast messaging without lower layer error correction; and an acknowledgement to the SLPP message is received by the first UE, the acknowledgement sent from at least one of the two or more additional UEs using unicast messaging with lower layer error correction.

Clause 16. The method of clause 15, wherein: the first UE determines a certain UE of the two or more additional UEs from which an acknowledgement to the SLPP message was not received; and responsive to determining that an acknowledgement to the SLPP message was not received from the certain UE, a retransmission of the SLPP message is sent from the first UE to the certain UE using unicast messaging with lower layer error correction.

Clause 17. The method of any one of clauses 1-16, wherein: at least one message of the plurality of SLPP messages comprises an SLPP message sent from the first UE to two or more additional UEs of the plurality of UEs using groupcast or broadcast messaging without lower layer error correction, the SLPP message having SLPP information for performing an SLPP procedure; and a response message sent from at least one of the two or more additional UEs is received by the first UE, wherein: the response message is sent using groupcast or broadcast messaging, and the response message comprises the SLPP information.

Clause 18. The method of clause 17, wherein, a second UE of the two or more additional UEs sends the response message to the first UE in response to receiving the SLPP message sent from the first UE; and a third UE of the two or more additional UEs sends a second response message to the first UE in response to receiving the response message sent from the second UE, wherein the SLPP message sent from the first UE is not received by the third UE.

Clause 19. The method of any one of clauses 1-18, wherein: at least one message of the plurality of SLPP messages comprises an SLPP message sent from the first UE to two or more additional UEs of the plurality of UEs using unicast, groupcast or broadcast messaging without lower layer error correction, the SLPP message related to performing an SLPP procedure; a set of one or more responses to the SLPP message is received by the first UE, wherein: the set of one or more responses to the SLPP message is received from each UE in a first portion of the two or more additional UEs, and no responses to the SLPP message are received from a second portion of the two or more additional UEs; and proceeding to perform the SLPP procedure based on the set of one or more responses to the SLPP message received from each UE in the first portion of the two or more additional UEs.

Clause 20. The method of clause 19, wherein a number of UEs in the first portion of the two or more additional UEs exceeds a minimum threshold number of UEs for performing the SLPP procedure.

Clause 21. A method of positioning using sidelink (SL) communications at a first user equipment (UE), the method comprising: sending, from the first UE to one or more additional UEs via direct wireless SL communication, one or more Request Capabilities messages, each Request Capabilities message comprising a request of one or more capabilities for supporting SL position reference signal (SL-PRS) configurations and SL-PRS measurements; receiving, at the first UE from one or more additional UEs via the direct wireless SL communication, one or more Provide Capabilities messages in which the one or more additional UEs respond to the one or more Request Capabilities messages; obtaining an SL-PRS configuration for each UE of the one or more additional UEs based, at least in part, on the one or more Provide Capabilities messages; and sending, from the first UE to one or more additional UEs via the direct wireless SL communication, one or more Provide Assistance Data messages including the SL-PRS configuration for each UE of the one or more additional UEs.

Clause 22. The method of clause 21, further comprising: sending, from the first UE to one or more additional UEs via the direct wireless SL communication, one or more Request Location Information messages, each Request Location Information message comprising a request for positioning measurement data; and receiving, at the first UE from one or more additional UEs via the direct wireless SL communication, one or more Provide Location Information messages in which the one or more additional UEs provide the positioning measurement data.

Clause 23. The method of clause 22 further comprising performing, with the first UE, SL-PRS measurements in accordance with and SL-PRS configuration for the first UE.

Clause 24. The method of any one of clauses 22-23 further comprising obtaining a position calculation based at least in part on the positioning measurement data of the one or more Provide Location Information messages.

Clause 25. The method of clause 18 further comprising sending, from the first UE to one or more additional UEs via the direct wireless SL communication, one or more additional Provide Location Information messages comprising the position calculation.

Clause 26. The method of any one of clauses 24-25 wherein the obtaining the position calculation comprises either (i) determining the position calculation with the first UE, or (ii) sending the positioning measurement data from the first UE to a server and receiving the position calculation at the first UE from the server.

Clause 27. The method of any one of clauses 22-26 further comprising sending, from the first UE to a server, a Provide Location Information message comprising either (i) the positioning measurement data, or (ii) a position calculation determined by the first UE.

Clause 28. The method of any one of clauses 21-27 wherein the obtaining the SL-PRS configuration for each UE of the one or more additional UEs comprises either (i) determining the SL-PRS configuration for each UE of the one or more additional UEs with the first UE, or (ii) sending the data from the one or more Provide Capabilities messages from the first UE to a server and receiving, at the first UE from the server, the SL-PRS configuration for each UE of the one or more additional UEs.

Clause 29. The method of any one of clauses 21-28 wherein the direct wireless SL communications uses user plane signaling or control plane signaling.

Clause 30. The method of any one of clauses 21-29 further comprising, prior to sending the one or more Request Capabilities messages, performing a discovery process with the first UE to identify the one or more additional UEs.

Clause 31. The method of any one of clauses 21-30 wherein the sending the one or more Request Capabilities messages, the receiving the one or more Provide Capabilities messages, the obtaining the SL-PRS configuration for each UE of the one or more additional UEs, and the sending the one or more Provide Assistance Data messages occur within an SL positioning protocol (SLPP) positioning session.

Clause 32. The method of any one of clauses 21-31 wherein the one or more additional UEs comprise a plurality of UEs.

Clause 33. The method of clause 32 wherein the one or more Request Capabilities messages, the one or more Provide Capabilities messages, or the one or more Provide Assistance Data messages, or any combination thereof, comprise multicast or broadcast messages.

Clause 34. The method of any one of clauses 21-33 further comprising, prior to the sending the one or more Request Capabilities messages, exchanging a plurality of preliminary messages between the first UE and a server, wherein sending the one or more Request Capabilities messages is responsive to the exchanging of the plurality of preliminary messages.

Clause 35. The method of clause 34 wherein the exchanging the plurality of preliminary messages comprises receiving, by the first UE from the server, a Request Capabilities message.

Clause 36. The method of any one of clauses 34-35 wherein the exchanging the plurality of preliminary messages comprises receiving, by the first UE from the server, a location request.

Clause 37. The method of clause 36 wherein the location request is included in a Supplementary Services Request message.

Clause 38. A method of enabling a first user equipment (UE) to coordinate positioning using sidelink (SL) communications, the method comprising: receiving, at a second UE from the first UE via direct wireless SL communication, a Request Capabilities message comprising a request of one or more capabilities for supporting SL position reference signal (SL-PRS) configurations and SL-PRS measurements, wherein the second UE is one of one or more additional UEs, other than the first UE, used for positioning using SL communications; sending, to the first UE from the second UE via the direct wireless SL communication, a Provide Capabilities message in response to the Request Capabilities message; and receiving, at a second UE from the first UE via direct wireless SL communication, a Provide Assistance Data message including an SL-PRS configuration for the second UE, the SL-PRS configuration based, at least in part, on the Provide Capabilities message.

Clause 39. The method of clause 38, further comprising: receiving, at a second UE from the first UE via direct wireless SL communication, a Request Location Information message; performing one or more measurements of SL-PRS, in accordance with the SL-PRS configuration for the second UE; and sending, to the first UE from the second UE via the direct wireless SL communication, a Provide Location Information message, wherein content of the Provide Location Information message is based on the one or more measurements.

Clause 40. The method of clause 39 wherein the Provide Location Information message comprises a multicast message or a broadcast message.

Clause 41. The method of any one of clauses 39-40 further comprising determining a position calculation based on the one or more measurements, wherein the Provide Location Information message comprises the position calculation.

Clause 42. The method of any one of clauses 39-41 wherein the Provide Location Information message comprises data indicative of the one or more measurements.

Clause 43. The method of any one of clauses 39-42 wherein the direct wireless SL communications uses user plane signaling or control plane signaling.

Clause 44. A user equipment (UE) comprising: one or more transceivers; one or more memories; and one or more processors communicatively coupled with the one or more transceivers and the one or more memories, wherein the one or more processors are configured to: exchange a plurality of sidelink (SL) positioning protocol (SLPP) messages, via the one or more transceivers, with other UEs in a plurality of UEs, the plurality of SLPP messages exchanged via direct wireless SL communications, wherein: at least one message of the plurality of SLPP messages comprises a Request Capabilities message in which a first UE of the plurality of UEs requests, from one or more additional UEs of the plurality of UEs, capabilities for supporting positioning using SL communications; at least one message of the plurality of SLPP messages comprises a Provide Capabilities message in which at least one of the one or more additional UEs indicates capabilities for supporting positioning using SL communications; at least one message of the plurality of SLPP messages comprises a Provide Assistance Data message including data for the one or more additional UEs of the plurality of UEs, the data assisting the one or more additional UEs to perform positioning using SL communications; at least one message of the plurality of SLPP messages comprises a Request Location Information message in which the first UE requests, from the one or more additional UEs of the plurality of UEs, location measurements for positioning using SL communications; and at least one message of the plurality of SLPP messages comprises a Provide Location Information message in which at least one of the one or more additional UEs provides the location measurements for positioning using SL communications; and perform the positioning based, at least in part, on the plurality of positioning messages.

Clause 45. The UE of clause 44, wherein the one or more processors are configured to use user plane signaling or control plane signaling in the direct wireless SL communications.

Clause 46. The UE of any one of clauses 44-45, wherein the one or more processors are further configured to, prior to exchanging the plurality of SLPP messages, engage in a discovery process to determine one or more of the other UEs to participate in the positioning.

Clause 47. The UE of any one of clauses 44-46, wherein the one or more processors are configured to exchange the plurality of SLPP messages and perform the positioning within an SLPP positioning session.

Clause 48. The UE of any one of clauses 44-47, wherein the UE comprises the first UE, and wherein the one or more processors are configured to send the Provide Assistance Data message to the one or more additional UEs of the plurality of UEs.

Clause 49. The UE of clause 48, wherein the one or more processors are configured to base content of the Provide Assistance Data, at least in part, on configuration information received via the one or more transceivers from a server.

Clause 50. The UE of clause 49, wherein the one or more processors are configured to, prior to the exchange of the plurality of SLPP messages with the other UEs in the plurality of UEs, exchange a plurality of preliminary SLPP messages with the server, wherein the exchange of the plurality of SLPP messages with the other UEs in the plurality of UEs is based on the exchange of the plurality of preliminary SLPP messages.

Clause 51. The UE of clause 50, wherein, to exchange the plurality of preliminary SLPP messages with the server, the one or more processors are configured to receive a Request Capabilities message from the server.

Clause 52. The UE of any one of clauses 50-51, wherein, to exchange the plurality of preliminary SLPP messages with the server, the one or more processors are configured to receive a Request Location Information message from the server.

Clause 53. The UE of clause 52, wherein the one or more processors are configured to receive the Request Location Information message in a Supplementary Services Request message.

Clause 54. The UE of any one of clauses 44-53, wherein, to exchange the plurality of SLPP messages, the one or more processors are configured to receive: a unicast message, a multicast message sent by one UE in the plurality of UEs to all other UEs in the plurality of UEs, a broadcast message sent to UEs in the plurality of UEs and to UEs not in the plurality of UEs, or any combination thereof.

Clause 55. The UE of any one of clauses 44-54, wherein the UE comprises a UE of the one or more additional UEs.

Clause 56. The UE of any one of clauses 44-54, wherein the UE comprises the first UE, and wherein: to exchange the plurality of SLPP messages with a server, the one or more processors are configured to send at least one message comprising an SLPP message, via the one or more transceivers, to two or more additional UEs of the plurality of UEs using unicast, groupcast or broadcast messaging without lower layer error correction; and the one or more processors are configured to receive an acknowledgement to the SLPP message, the acknowledgement sent from at least one of the two or more additional UEs using unicast messaging with lower layer error correction.

Clause 57. The UE of clause 56, wherein the one or more processors are further configured to: determine a certain UE of the two or more additional UEs from which an acknowledgement to the SLPP message was not received; and responsive to determining that an acknowledgement to the SLPP message was not received from the certain UE, send a retransmission of the SLPP message to the certain UE using unicast messaging with lower layer error correction.

Clause 58. The UE any one of clauses 44-54 or 56-57, wherein the UE comprises the first UE, and wherein: to exchange the plurality of SLPP messages with a server, the one or more processors are configured to send at least one message comprising an SLPP message, via the one or more transceivers, to two or more additional UEs of the plurality of UEs using groupcast or broadcast messaging without lower layer error correction, the SLPP message related to performing an SLPP procedure; the one or more processors are configured to receive a set of one or more responses to the SLPP message, wherein: the set of one or more responses to the SLPP message is received from each UE in a first portion of the two or more additional UEs, and no responses to the SLPP message are received from a second portion of the two or more additional UEs; and the one or more processors are configured to proceed to perform the SLPP procedure based on the set of one or more responses to the SLPP message received from each UE in the first portion of the two or more additional UEs.

Clause 59. A first UE for positioning using sidelink (SL) communications at a first user equipment (UE), the first UE comprising: one or more transceivers; one or more memories; and one or more processors communicatively coupled with the one or more transceivers and the one or more memories, wherein the one or more processors are configured to: send, via the one or more transceivers to one or more additional UEs via direct wireless SL communication, one or more Request Capabilities messages, each Request Capabilities message comprising a request of one or more capabilities for supporting SL position reference signal (SL-PRS) configurations and SL-PRS measurements; receive, via the one or more transceivers from one or more additional UEs via the direct wireless SL communication, one or more Provide Capabilities messages in which the one or more additional UEs respond to the one or more Request Capabilities messages; obtain an SL-PRS configuration for each UE of the one or more additional UEs based, at least in part, on the one or more Provide Capabilities messages; and send, via the one or more transceivers to one or more additional UEs via the direct wireless SL communication, one or more Provide Assistance Data messages including the SL-PRS configuration for each UE of the one or more additional UEs.

Clause 60. The first UE of clause 59, wherein the one or more processors are further configured to: send, via the one or more transceivers to one or more additional UEs via the direct wireless SL communication, one or more Request Location Information messages, each Request Location Information message comprising a request for positioning measurement data; and receive, via the one or more transceivers from one or more additional UEs via the direct wireless SL communication, one or more Provide Location Information messages in which the one or more additional UEs provide the positioning measurement data.

Clause 61. The first UE of clause 60, wherein the one or more processors are further configured to perform, via the one or more transceivers, SL-PRS measurements in accordance with and SL-PRS configuration for the first UE.

Clause 62. The first UE of any one of clauses 60-61, wherein the one or more processors are further configured to obtain a position calculation based at least in part on positioning measurement data of the one or more Provide Location Information messages.

Clause 63. The first UE of clause 62, wherein the one or more processors are further configured to send, via the one or more transceivers to one or more additional UEs via the direct wireless SL communication, one or more additional Provide Location Information messages comprising the position calculation.

Clause 64. The first UE of any one of clauses 62-63, wherein, to obtain the position calculation, the one or more processors are configured to either (i) determine the position calculation, or (ii) send the positioning measurement data via the one or more transceivers to a server and receive the position calculation via the one or more transceivers from the server.

Clause 65. The first UE of any one of clauses 60-64, wherein the one or more processors are further configured to send, via the one or more transceivers to a server, a Provide Location Information message comprising either (i) the positioning measurement data, or (ii) a position calculation determined by the first UE.

Clause 66. The first UE of any one of clauses 59-65, wherein to obtain the SL-PRS configuration for each UE of the one or more additional UEs, the one or more processors are configured to either (i) determine the SL-PRS configuration for each UE of the one or more additional UEs, or (ii) send the data from the one or more Provide Capabilities messages via the one or more transceivers to a server and receive, via the one or more transceivers from the server, the SL-PRS configuration for each UE of the one or more additional UEs.

Clause 67. The first UE of any one of clauses 59-66, wherein the one or more processors are configured to use user plane signaling or control plane signaling in the direct wireless SL communications.

Clause 68. The first UE of any one of clauses 59-67, wherein the one or more processors are further configured to, prior to sending the one or more Request Capabilities messages, perform a discovery process to identify the one or more additional UEs.

Clause 69. The first UE of any one of clauses 59-68, wherein the one or more processors are configured to send the one or more Request Capabilities messages, receive the one or more Provide Capabilities messages, obtain the SL-PRS configuration for each UE of the one or more additional UEs, and send the one or more Provide Assistance Data messages within an SL positioning protocol (SLPP) positioning session.

Clause 70. The first UE of any one of clauses 59-69, wherein the one or more processors are further configured to, prior to the sending the one or more Request Capabilities messages, exchange a plurality of preliminary messages between the first UE and a server, wherein the one or more processors are configured to send the one or more Request Capabilities messages responsive to the exchanging of the plurality of preliminary messages.

Clause 71. The first UE of clause 70, wherein, to exchange the plurality of preliminary messages, the one or more processors are configured to receive, via the one or more transceivers from the server, a Request Capabilities message or a location request.

Clause 72. The first UE of clause 71, wherein the one or more processors are configured to receive the location request in a Supplementary Services Request message.

Clause 73. A second UE for enabling a first user equipment (UE) to coordinate positioning using sidelink (SL) communications, the second UE comprising: one or more transceivers; one or more memories; and one or more processors communicatively coupled with the one or more transceivers and the one or more memories, wherein the one or more processors are configured to: receive, via the one or more transceivers from the first UE via direct wireless SL communication, a Request Capabilities message comprising a request of one or more capabilities for supporting SL position reference signal (SL-PRS) configurations and SL-PRS measurements, wherein the second UE is one of one or more additional UEs, other than the first UE, used for positioning using SL communications; send, to the first UE via the one or more transceivers via the direct wireless SL communication, a Provide Capabilities message in response to the Request Capabilities message; and receive, via the one or more transceivers from the first UE via direct wireless SL communication, a Provide Assistance Data message including an SL-PRS configuration for the second UE, the SL-PRS configuration based, at least in part, on the Provide Capabilities message.

Clause 74. The second UE of clause 73, wherein the one or more processors are further configured to: receive, via the one or more transceivers from the first UE via direct wireless SL communication, a Request Location Information message; perform one or more measurements of SL-PRS, in accordance with the SL-PRS configuration for the second UE; and send, to the first UE via the one or more transceivers via the direct wireless SL communication, a Provide Location Information message, wherein content of the Provide Location Information message is based on the one or more measurements.

Clause 75. The second UE of clause 74, wherein the one or more processors are further configured to determine a position calculation based on the one or more measurements, wherein the Provide Location Information message comprises the position calculation.

Clause 76. The second UE of any one of clauses 74-75, wherein the one or more processors are further configured to include, in the Provide Location Information message, data indicative of the one or more measurements.

Clause 77. The second UE of any one of clauses 73-76, wherein the one or more processors are configured to use user plane signaling or control plane signaling in the direct wireless SL communications.

Clause 78. A device comprising one or more transceivers, one or more memories, and one or more processors communicatively linked with the one or more transceivers and the one or more memories, wherein the one or more processors are configured to perform the method of any of clauses 1-43.

Clause 79. An apparatus having means for performing the method of any one of clauses 1-43.

Clause 80. A non-transitory computer-readable medium storing instructions, the instructions comprising code for performing the method of any one of clauses 1-43.

What is claimed is:

What is claimed is:

1. A method of positioning a plurality of user equipments (UEs) using sidelink (SL) communications, the method performed by a UE in the plurality of UEs, the method comprising:

exchanging a plurality of SL positioning protocol (SLPP) messages with other UEs in the plurality of UEs, the plurality of SLPP messages exchanged via direct wireless SL communications, wherein:

at least one message of the plurality of SLPP messages comprises a Request Capabilities message in which a first UE of the plurality of UEs requests, from one or more additional UEs of the plurality of UEs, capabilities for supporting positioning using SL communications;

at least one message of the plurality of SLPP messages comprises a Provide Capabilities message in which at least one of the one or more additional UEs indicates capabilities for supporting positioning using SL communications;

at least one message of the plurality of SLPP messages comprises a Provide Assistance Data message including data for the one or more additional UEs of the plurality of UEs, the data assisting the one or more additional UEs to perform positioning using SL communications, wherein the Provide Assistance Data message is sent from the first UE to the one or more additional UEs of the plurality of UEs and content of the Provide Assistance Data is based, at least in part, on configuration information received by the first UE from a server, wherein the configuration information received by the first UE from the server is based, at least in part, on capability information provided by the first UE to the server, wherein the configuration information comprises an SL position reference signal (SL-PRS) configuration for each UE of the one or more additional UEs, and wherein the SL-PRS configuration for each UE of the one or more additional UEs is determined by the server based, at least in part, on capability information for each UE of the one or more additional UEs provided to the server;

at least one message of the plurality of SLPP messages comprises a Request Location Information message in which the first UE requests, from the one or more additional UEs of the plurality of UEs, location measurements for positioning using SL communications; and at least one message of the plurality of SLPP messages comprises a Provide Location Information message in which at least one of the one or more additional UEs provides the location measurements for positioning using SL communications; and performing the positioning based, at least in part, on the plurality of SLPP messages.

2. The method of claim 1, wherein the direct wireless SL communications uses user plane signaling or control plane signaling.

3. The method of claim 1, further comprising, prior to exchanging the plurality of SLPP messages, engaging in a discovery process to determine one or more of the other UEs to participate in the positioning.

4. The method of claim 1, wherein the exchanging of the plurality of SLPP messages and the performing of the positioning occur within an SLPP positioning session.

5. The method of claim 1, wherein the capability information for each UE of the one or more additional UEs provided to the server is based, at least in part, on the Provide Capabilities message.

6. The method of claim 1, wherein, prior to the exchange of the plurality of SLPP messages with the other UEs in the plurality of UEs, a plurality of preliminary SLPP messages is exchanged between the first UE and the server, wherein the exchange of the plurality of SLPP messages with the other UEs in the plurality of UEs is based on the exchange of the plurality of preliminary SLPP messages.

7. The method of claim 6, wherein the plurality of preliminary SLPP messages comprises a Request Capabilities message from the server.

8. The method of claim 6, wherein the plurality of preliminary SLPP messages comprises a Request Location Information message from the server.

9. The method of claim 8, wherein the Request Location Information message from the server is included in a Supplementary Services Request message.

10. The method of claim 1, wherein the plurality of SLPP messages comprises:

a unicast message sent to one UE in the plurality of UEs, a multicast message sent by one UE in the plurality of UEs to all other UEs in the plurality of UEs, a broadcast message sent to UEs in the plurality of UEs and to UEs not in the plurality of UEs, or any combination thereof.

11. The method of claim 1, wherein the UE comprises the first UE.

12. The method of claim 1, wherein the UE comprises a UE of the one or more additional UEs.

13. The method of claim 1, wherein:

at least one message of the plurality of SLPP messages comprises an SLPP message sent from the first UE to two or more additional UEs of the plurality of UEs using unicast, groupcast or broadcast messaging without lower layer error correction; and an acknowledgement to the SLPP message is received by the first UE, the acknowledgement sent from at least one of the two or more additional UEs using unicast messaging with lower layer error correction.

14. The method of claim 13, wherein:

the first UE determines a certain UE of the two or more additional UEs from which an acknowledgement to the SLPP message was not received; and responsive to determining that an acknowledgement to the SLPP message was not received from the certain UE, a retransmission of the SLPP message is sent from the first UE to the certain UE using unicast messaging with lower layer error correction.

15. The method of claim 1, wherein:

at least one message of the plurality of SLPP messages comprises an SLPP message sent from the first UE to two or more additional UEs of the plurality of UEs using unicast, groupcast or broadcast messaging without lower layer error correction, the SLPP message having SLPP information for performing an SLPP procedure; and a response message sent from at least one of the two or more additional UEs is received by the first UE, wherein:

the response message is sent using groupcast or broadcast messaging, and the response message comprises the SLPP information.

16. The method of claim 15, wherein, a second UE of the two or more additional UEs sends the response message to the first UE in response to receiving the SLPP message sent from the first UE; and a third UE of the two or more additional UEs sends a second response message to the first UE in response to receiving the response message sent from the second UE, wherein the SLPP message sent from the first UE is not received by the third UE.

17. The method of claim 1, wherein:

at least one message of the plurality of SLPP messages comprises an SLPP message sent from the first UE to two or more additional UEs of the plurality of UEs using groupcast or broadcast messaging without lower layer error correction, the SLPP message related to performing an SLPP procedure;

a set of one or more responses to the SLPP message is received by the first UE, wherein:

the set of one or more responses to the SLPP message is received from each UE in a first portion of the two or more additional UEs, and no responses to the SLPP message are received from a second portion of the two or more additional UEs; and proceeding to perform the SLPP procedure based on the set of one or more responses to the SLPP message received from each UE in the first portion of the two or more additional UEs.

18. The method of claim 17, wherein a number of UEs in the first portion of the two or more additional UEs exceeds a minimum threshold number of UEs for performing the SLPP procedure.

19. A method of positioning using sidelink (SL) communications at a first user equipment (UE), the method comprising:

sending, from the first UE to one or more additional UEs via direct wireless SL communication, one or more Request Capabilities messages, each Request Capabilities message comprising a request of one or more capabilities for supporting SL position reference signal (SL-PRS) configurations and SL-PRS measurements;

receiving, at the first UE from one or more additional UEs via the direct wireless SL communication, one or more Provide Capabilities messages in which the one or more additional UEs respond to the one or more Request Capabilities messages;

obtaining an SL-PRS configuration for each UE of the one or more additional UEs based, at least in part, on the one or more Provide Capabilities messages; and sending, from the first UE to one or more additional UEs via the direct wireless SL communication, one or more Provide Assistance Data messages including the SL-PRS configuration for each UE of the one or more additional UEs, wherein content of the Provide Assistance Data is based, at least in part, on configuration information received by the first UE from a server, wherein the configuration information comprises an SL-PRS configuration for each UE of the one or more additional UEs, and wherein the SL-PRS configuration for each UE of the one or more additional UEs is determined by the server based, at least in part, on capability information for each UE of the one or more additional UEs provided to the server.

20. The method of claim 19, further comprising:

sending, from the first UE to one or more additional UEs via the direct wireless SL communication, one or more Request Location Information messages, each Request Location Information message comprising a request for positioning measurement data; and receiving, at the first UE from one or more additional UEs via the direct wireless SL communication, one or more Provide Location Information messages in which the one or more additional UEs provide the positioning measurement data.

21. The method of claim 20, further comprising performing, with the first UE, SL-PRS measurements in accordance with and SL-PRS configuration for the first UE.

22. The method of claim 20, further comprising obtaining a position calculation based at least in part on positioning measurement data of the one or more Provide Location Information messages.

23. The method of claim 22, further comprising sending, from the first UE to one or more additional UEs via the direct wireless SL communication, one or more additional Provide Location Information messages comprising the position calculation.

24. The method of claim 22, wherein the obtaining the position calculation comprises either (i) determining the position calculation with the first UE, or (ii) sending the positioning measurement data from the first UE to a server and receiving the position calculation at the first UE from the server.

25. The method of claim 20, further comprising sending, from the first UE to a server, a Provide Location Information message comprising either (i) the positioning measurement data, or (ii) a position calculation determined by the first UE.

26. The method of claim 19, wherein the obtaining the SL-PRS configuration for each UE of the one or more additional UEs comprises either (i) determining the SL-PRS configuration for each UE of the one or more additional UEs with the first UE, or (ii) sending the data from the one or more Provide Capabilities messages from the first UE to a server and receiving, at the first UE from the server, the SL-PRS configuration for each UE of the one or more additional UEs.

27. The method of claim 19, wherein the direct wireless SL communications uses user plane signaling or control plane signaling.

28. The method of claim 19, further comprising, prior to sending the one or more Request Capabilities messages, performing a discovery process with the first UE to identify the one or more additional UEs.

29. The method of claim 19, wherein the sending the one or more Request Capabilities messages, the receiving the one or more Provide Capabilities messages, the obtaining the SL-PRS configuration for each UE of the one or more additional UEs, and the sending the one or more Provide Assistance Data messages occur within an SL positioning protocol (SLPP) positioning session.

30. The method of claim 19, wherein the one or more additional UEs comprise a plurality of UEs.

31. The method of claim 30, wherein the one or more Request Capabilities messages, the one or more Provide Capabilities messages, or the one or more Provide Assistance Data messages, or any combination thereof, comprise multicast or broadcast messages.

32. The method of claim 19, further comprising, prior to the sending the one or more Request Capabilities messages, exchanging a plurality of preliminary messages between the first UE and a server, wherein sending the one or more Request Capabilities messages is responsive to the exchanging of the plurality of preliminary messages.

33. The method of claim 32, wherein the exchanging the plurality of preliminary messages comprises receiving, by the first UE from the server, a Request Capabilities message.

34. The method of claim 32, wherein the exchanging the plurality of preliminary messages comprises receiving, by the first UE from the server, a location request.

35. The method of claim 34, wherein the location request is included in a Supplementary Services Request message.

36. A method of enabling a first user equipment (UE) to coordinate positioning using sidelink (SL) communications, the method comprising:

receiving, at a second UE from the first UE via direct wireless SL communication, a Request Capabilities message comprising a request of one or more capabilities for supporting SL position reference signal (SL-PRS) configurations and SL-PRS measurements, wherein the second UE is one of one or more additional UEs, other than the first UE, used for positioning using SL communications;

sending, to the first UE from the second UE via the direct wireless SL communication, a Provide Capabilities message in response to the Request Capabilities message; and receiving, at a second UE from the first UE via direct wireless SL communication, a Provide Assistance Data message including an SL-PRS configuration for the second UE, the SL-PRS configuration based, at least in part, on the Provide Capabilities message, wherein content of the Provide Assistance Data is based, at least in part, on configuration information received by the first UE from a server, wherein the configuration information comprises an SL-PRS configuration for each UE of the one or more additional UEs, and wherein the SL-PRS configuration for each UE of the one or more additional UEs is determined by the server based, at least in part, on capability information for each UE of the one or more additional UEs provided to the server.

37. The method of claim 36, further comprising:

receiving, at a second UE from the first UE via direct wireless SL communication, a Request Location Information message;

performing one or more measurements of SL-PRS, in accordance with the SL-PRS configuration for the second UE; and sending, to the first UE from the second UE via the direct wireless SL communication, a Provide Location Information message, wherein content of the Provide Location Information message is based on the one or more measurements.

38. The method of claim 37, wherein the Provide Location Information message comprises a multicast message or a broadcast message.

39. The method of claim 37, further comprising determining a position calculation based on the one or more measurements, wherein the Provide Location Information message comprises the position calculation.

40. The method of claim 37, wherein the Provide Location Information message comprises data indicative of the one or more measurements.

41. The method of claim 36, wherein the direct wireless SL communications uses user plane signaling or control plane signaling.

42. A user equipment (UE) comprising:

one or more transceivers;

one or more memories; and one or more processors communicatively coupled with the one or more transceivers and the one or more memories, wherein the one or more processors are configured to:

exchange a plurality of sidelink (SL) positioning protocol (SLPP) messages, via the one or more transceivers, with other UEs in a plurality of UEs, the plurality of SLPP messages exchanged via direct wireless SL communications, wherein:

at least one message of the plurality of SLPP messages comprises a Request Capabilities message in which a first UE of the plurality of UEs requests, from one or more additional UEs of the plurality of UEs, capabilities for supporting positioning using SL communications;

at least one message of the plurality of SLPP messages comprises a Provide Capabilities message in which at least one of the one or more additional UEs indicates capabilities for supporting positioning using SL communications;

at least one message of the plurality of SLPP messages comprises a Provide Assistance Data message including data for the one or more additional UEs of the plurality of UEs, the data assisting the one or more additional UEs to perform positioning using SL communications;

at least one message of the plurality of SLPP messages comprises a Request Location Information message in which the first UE requests, from the one or more additional UEs of the plurality of UEs, location measurements for positioning using SL communications; and at least one message of the plurality of SLPP messages comprises a Provide Location Information message in which at least one of the one or more additional UEs provides the location measurements for positioning using SL communications; and perform the positioning based, at least in part, on the plurality of SLPP messages, wherein the UE comprises the first UE, and wherein the one or more processors are configured to send the Provide Assistance Data message to the one or more additional UEs of the plurality of UEs and the one or more processors are configured to base content of the Provide Assistance Data, at least in part, on configuration information received via the one or more transceivers from a server, wherein the configuration information comprises an SL position reference signal (SL-PRS) configuration for each UE of the one or more additional UEs, and wherein the SL-PRS configuration for each UE of the one or more additional UEs is determined by the server based, at least in part, on capability information for each UE of the one or more additional UEs provided to the server.

43. The UE of claim 42, wherein the one or more processors are configured to use user plane signaling or control plane signaling in the direct wireless SL communications.

44. The UE of claim 42, wherein the one or more processors are further configured to, prior to exchanging the plurality of SLPP messages, engage in a discovery process to determine one or more of the other UEs to participate in the positioning.

45. The UE of claim 42, wherein the one or more processors are configured to exchange the plurality of SLPP messages and perform the positioning within an SLPP positioning session.

46. The UE of claim 42, wherein the one or more processors are configured to, prior to the exchange of the plurality of SLPP messages with the other UEs in the plurality of UEs, exchange a plurality of preliminary SLPP messages with the server, wherein the exchange of the plurality of SLPP messages with the other UEs in the plurality of UEs is based on the exchange of the plurality of preliminary SLPP messages.

47. The UE of claim 46, wherein, to exchange the plurality of preliminary SLPP messages with the server, the one or more processors are configured to receive a Request Capabilities message from the server.

48. The UE of claim 46, wherein, to exchange the plurality of preliminary SLPP messages with the server, the one or more processors are configured to receive a Request Location Information message from the server.

49. The UE of claim 48, wherein the one or more processors are configured to receive the Request Location Information message from the server in a Supplementary Services Request message.

50. The UE of claim 42, wherein, to exchange the plurality of SLPP messages, the one or more processors are configured to receive:

a unicast message, a multicast message sent by one UE in the plurality of UEs to all other UEs in the plurality of UEs, a broadcast message sent to UEs in the plurality of UEs and to UEs not in the plurality of UEs, or any combination thereof.

51. The UE of claim 42, wherein the UE comprises a UE of the one or more additional UEs.

52. The UE of claim 42, wherein the UE comprises the first UE, and wherein:

to exchange the plurality of SLPP messages with a server, the one or more processors are configured to send at least one message comprising an SLPP message, via the one or more transceivers, to two or more additional UEs of the plurality of UEs using unicast, groupcast or broadcast messaging without lower layer error correction; and the one or more processors are configured to receive an acknowledgement to the SLPP message, the acknowledgement sent from at least one of the two or more additional UEs using unicast messaging with lower layer error correction.

53. The UE of claim 52, wherein the one or more processors are further configured to:

determine a certain UE of the two or more additional UEs from which an acknowledgement to the SLPP message was not received; and responsive to determining that an acknowledgement to the SLPP message was not received from the certain UE, send a retransmission of the SLPP message to the certain UE using unicast messaging with lower layer error correction.

54. The UE of claim 42, wherein the UE comprises the first UE, and wherein:

to exchange the plurality of SLPP messages with a server, the one or more processors are configured to send at least one message comprising an SLPP message, via the one or more transceivers, to two or more additional UEs of the plurality of UEs using groupcast or broadcast messaging without lower layer error correction, the SLPP message related to performing an SLPP procedure;

the one or more processors are configured to receive a set of one or more responses to the SLPP message, wherein:

the set of one or more responses to the SLPP message is received from each UE in a first portion of the two or more additional UEs, and no responses to the SLPP message are received from a second portion of the two or more additional UEs; and the one or more processors are configured to proceed to perform the SLPP procedure based on the set of one or more responses to the SLPP message received from each UE in the first portion of the two or more additional UEs.

55. A first user equipment (UE) comprising:

one or more transceivers;

one or more memories; and one or more processors communicatively coupled with the one or more transceivers and the one or more memories, wherein the one or more processors are configured to:

send, via the one or more transceivers to one or more additional UEs via direct wireless sidelink (SL) communication, one or more Request Capabilities messages, each Request Capabilities message comprising a request of one or more capabilities for supporting SL position reference signal (SL-PRS) configurations and SL-PRS measurements;

receive, via the one or more transceivers from one or more additional UEs via the direct wireless SL communication, one or more Provide Capabilities messages in which the one or more additional UEs respond to the one or more Request Capabilities messages;

obtain an SL-PRS configuration for each UE of the one or more additional UEs based, at least in part, on the one or more Provide Capabilities messages; and send, via the one or more transceivers to one or more additional UEs via the direct wireless SL communication, one or more Provide Assistance Data messages including the SL-PRS configuration for each UE of the one or more additional UEs, wherein content of the Provide Assistance Data is based, at least in part, on configuration information received by the first UE from a server, wherein the configuration information comprises an SL-PRS configuration for each UE of the one or more additional UEs, and wherein the SL-PRS configuration for each UE of the one or more additional UEs is determined by the server based, at least in part, on capability information for each UE of the one or more additional UEs provided to the server.

56. The first UE of claim 55, wherein the one or more processors are further configured to:

send, via the one or more transceivers to one or more additional UEs via the direct wireless SL communication, one or more Request Location Information messages, each Request Location Information message comprising a request for positioning measurement data; and receive, via the one or more transceivers from one or more additional UEs via the direct wireless SL communication, one or more Provide Location Information messages in which the one or more additional UEs provide the positioning measurement data.

57. The first UE of claim 56, wherein the one or more processors are further configured to perform, via the one or more transceivers, SL-PRS measurements in accordance with and SL-PRS configuration for the first UE.

58. The first UE of claim 56, wherein the one or more processors are further configured to obtain a position calculation based at least in part on positioning measurement data of the one or more Provide Location Information messages.

59. The first UE of claim 58, wherein the one or more processors are further configured to send, via the one or more transceivers to one or more additional UEs via the direct wireless SL communication, one or more additional Provide Location Information messages comprising the position calculation.

60. The first UE of claim 58, wherein, to obtain the position calculation, the one or more processors are configured to either (i) determine the position calculation, or (ii) send the positioning measurement data via the one or more transceivers to a server and receive the position calculation via the one or more transceivers from the server.

61. The first UE of claim 56, wherein the one or more processors are further configured to send, via the one or more transceivers to a server, a Provide Location Information message comprising either (i) the positioning measurement data, or (ii) a position calculation determined by the first UE.

62. The first UE of claim 55, wherein to obtain the SL-PRS configuration for each UE of the one or more additional UEs, the one or more processors are configured to either (i) determine the SL-PRS configuration for each UE of the one or more additional UEs, or (ii) send the data from the one or more Provide Capabilities messages via the one or more transceivers to a server and receive, via the one or more transceivers from the server, the SL-PRS configuration for each UE of the one or more additional UEs.

63. The first UE of claim 55, wherein the one or more processors are configured to use user plane signaling or control plane signaling in the direct wireless SL communications.

64. The first UE of claim 55, wherein the one or more processors are further configured to, prior to sending the one or more Request Capabilities messages, perform a discovery process to identify the one or more additional UEs.

65. The first UE of claim 55, wherein the one or more processors are configured to send the one or more Request Capabilities messages, receive the one or more Provide Capabilities messages, obtain the SL-PRS configuration for each UE of the one or more additional UEs, and send the one or more Provide Assistance Data messages within an SL positioning protocol (SLPP) positioning session.

66. The first UE of claim 55, wherein the one or more processors are further configured to, prior to the sending the one or more Request Capabilities messages, exchange a plurality of preliminary messages between the first UE and a server, wherein the one or more processors are configured to send the one or more Request Capabilities messages responsive to the exchanging of the plurality of preliminary messages.

67. The first UE of claim 66, wherein, to exchange the plurality of preliminary messages, the one or more processors are configured to receive, via the one or more transceivers from the server, a Request Capabilities message or a location request.

68. The first UE of claim 67, wherein the one or more processors are configured to receive the location request in a Supplementary Services Request message.

69. A second user equipment (UE), comprising:

one or more transceivers;

one or more memories; and one or more processors communicatively coupled with the one or more transceivers and the one or more memories, wherein the one or more processors are configured to:

receive, via the one or more transceivers from a first UE via direct wireless sidelink (SL) communication, a Request Capabilities message comprising a request of one or more capabilities for supporting SL position reference signal (SL-PRS) configurations and SL-PRS measurements, wherein the second UE is one of one or more additional UEs, other than the first UE, used for positioning using SL communications;

send, to the first UE via the one or more transceivers via the direct wireless SL communication, a Provide Capabilities message in response to the Request Capabilities message; and receive, via the one or more transceivers from the first UE via direct wireless SL communication, a Provide Assistance Data message including an SL-PRS configuration for the second UE, the SL-PRS configuration based, at least in part, on the Provide Capabilities message, wherein content of the Provide Assistance Data is based, at least in part, on configuration information received by the first UE from a server, wherein the configuration information comprises an SL-PRS configuration for each UE of the one or more additional UEs, and wherein the SL-PRS configuration for each UE of the one or more additional UEs is determined by the server based, at least in part, on capability information for each UE of the one or more additional UEs provided to the server.

70. The second UE of claim 69, wherein the one or more processors are further configured to:

receive, via the one or more transceivers from the first UE via direct wireless SL communication, a Request Location Information message;

perform one or more measurements of SL-PRS, in accordance with the SL-PRS configuration for the second UE; and send, to the first UE via the one or more transceivers via the direct wireless SL communication, a Provide Location Information message, wherein content of the Provide Location Information message is based on the one or more measurements.

71. The second UE of claim 70, wherein the one or more processors are further configured to determine a position calculation based on the one or more measurements, wherein the Provide Location Information message comprises the position calculation.

72. The second UE of claim 70, wherein the one or more processors are further configured to include, in the Provide Location Information message, data indicative of the one or more measurements.

73. The second UE of claim 69, wherein the one or more processors are configured to use user plane signaling or control plane signaling in the direct wireless SL communications.

* * * * *